United States Patent
Kobayashi

(10) Patent No.: US 9,620,044 B2
(45) Date of Patent: Apr. 11, 2017

(54) IMAGE DISPLAY DEVICE AND DRIVE METHOD THEREFOR

(71) Applicant: Sharp Kabushiki Kaisha, Osaka-shi, Osaka (JP)

(72) Inventor: Masamitsu Kobayashi, Osaka (JP)

(73) Assignee: SHARP KABUSHIKI KASIHA, Osaka (JP)

( * ) Notice: Subject to any disclaimer, the term of this patent is extended or adjusted under 35 U.S.C. 154(b) by 0 days.

(21) Appl. No.: 14/433,223

(22) PCT Filed: Sep. 27, 2013

(86) PCT No.: PCT/JP2013/076237
§ 371 (c)(1),
(2) Date: Apr. 2, 2015

(87) PCT Pub. No.: WO2014/054521
PCT Pub. Date: Apr. 10, 2014

(65) Prior Publication Data
US 2015/0279256 A1    Oct. 1, 2015

(30) Foreign Application Priority Data
Oct. 5, 2012  (JP) .................. 2012-223586

(51) Int. Cl.
*G09G 5/02* (2006.01)
*G09G 3/00* (2006.01)
(Continued)

(52) U.S. Cl.
CPC .......... *G09G 3/003* (2013.01); *G02B 6/0068* (2013.01); *G02B 6/0075* (2013.01); (Continued)

(58) Field of Classification Search
CPC ........ G09G 3/36; G09G 3/003; G09G 3/2022; G09G 3/3413; G09G 3/20; G09G 3/2003;
(Continued)

(56) References Cited

U.S. PATENT DOCUMENTS 7,764,334 B2 *  7/2010  Kitagawa ............. G02B 6/0068
                                                    349/65
8,878,757 B2 * 11/2014  Yoshida ............... G09G 3/3406
                                                    345/84
(Continued)

FOREIGN PATENT DOCUMENTS

JP    H6-43478      2/1994
JP    H10-254425 A  9/1998
(Continued)

OTHER PUBLICATIONS

International Search Report PCT/ISA/210 for International Application No. PCT/JP2013/076237 dated Dec. 17, 2013.
(Continued)

*Primary Examiner* — Vijay Shankar
(74) *Attorney, Agent, or Firm* — Harness, Dickey & Pierce, P.L.C.

(57) ABSTRACT

The image display device includes a front CF-less liquid crystal panel, a first light guide plate, a PDLC panel, and a rear CF-less liquid crystal panel that are arranged sequentially, and a light-guide plate light source unit. At an image displaying time, the PDLC panel becomes in a spreading state. At this time, light source light emitted by the light-guide plate light source unit is guided to the first light guide plate, and is applied to the PDLC panel. The light source light spread by the PDLC panel is applied to the front CF-less liquid crystal panel and the rear CF-less liquid
(Continued)

crystal panel. At an image non-displaying time, the PDLC panel becomes in a transmittance state, and transmits background light.

20 Claims, 28 Drawing Sheets

(51) Int. Cl.
*G09G 3/36* (2006.01)
*G09G 3/20* (2006.01)
*G09G 3/34* (2006.01)
*F21V 8/00* (2006.01)

(52) U.S. Cl.
CPC ......... *G09G 3/2003* (2013.01); *G09G 3/2022* (2013.01); *G09G 3/3413* (2013.01); *G09G 3/36* (2013.01); *G02B 6/0063* (2013.01); *G02B 6/0076* (2013.01); *G02B 6/0078* (2013.01); *G09G 2300/023* (2013.01); *G09G 2310/0235* (2013.01); *G09G 2320/0261* (2013.01)

(58) Field of Classification Search
CPC ... G09G 2310/0235; G09G 2320/0261; G09G 2300/023
See application file for complete search history.

(56) References Cited

U.S. PATENT DOCUMENTS

| | | |
|---|---|---|
| 2006/0139289 A1 | 6/2006 | Yoshida et al. |
| 2008/0030650 A1 | 2/2008 | Kitagawa et al. |
| 2008/0068359 A1 | 3/2008 | Yoshida et al. |

FOREIGN PATENT DOCUMENTS

| | | |
|---|---|---|
| JP | 200183498 | 3/2001 |
| JP | 2001-184034 A | 7/2001 |
| JP | 2004-198961 A | 7/2004 |
| JP | 20050160759 | 6/2005 |
| JP | 2005-275184 A | 10/2005 |
| JP | 2006106614 A | 4/2006 |
| JP | 2008-34372 A | 2/2008 |
| JP | 2008-70838 A | 3/2008 |
| JP | 2008-176148 A | 7/2008 |
| JP | 2012-177770 A | 9/2012 |
| JP | 05191726 B2 | 5/2013 |

OTHER PUBLICATIONS

Written Opinion of the International Searching Authority PCT/ISA/237 for International Application No. PCT/JP2013/076237 dated Dec. 17, 2013.

* cited by examiner

IMAGE DISPLAY DEVICE AND DRIVE METHOD THEREFOR

CROSS REFERENCE TO RELATED APPLICATIONS

This is a National Phase Application of PCT/JP2013/0076237 filed Sep. 27, 2013, which is an International Application claiming priority to JP Application No. 2012-223586 filed on Oct. 5, 2012, the entire contents of which are hereby incorporated by reference.

TECHNICAL FIELD

The present invention relates to an image display device, and particularly, relates to an image display device capable of transmitting a background, and a drive method for the image display device.

BACKGROUND ART

In recent years, there have been progressed developments of an image display device capable of transmitting a background as well as performing image display. For example, in Japanese Patent Application Laid-Open No. H5-191726, there is disclosed a presence display device that performs display by merging an image in a background. FIG. 38 is a view showing a configuration of a presence display device 200 disclosed in Japanese Patent Application Laid-Open No. H5-191726. As shown in FIG. 38, the presence display device 200 includes a projector 201, a transmission factor control screen 202, an image extracting device 203, and an image-outline forming device 204. The image extracting device 203 extracts an image to be displayed. The projector 201 projects the extracted image to the transmission factor control screen 202. The image-outline forming device 204 extracts outline information of the image to be displayed, and controls a state of the transmission factor control screen 202, based on the outline information. The transmission factor control screen 202 is specifically a PDLC (Polymer Dispersed Liquid Crystal) panel. The transmission factor control screen 202 is controlled such that only a region in which projection light from the projector 201 is applied becomes in a state of spreading light (hereinafter, referred to as a "spreading state"), and that other regions become in a state of allowing light to be transmitted (hereinafter, referred to as a "transmittance state"). With this configuration, the presence display device 200 can display, to an observer 205, the image to be displayed, by merging the image into the background including an ornamental tree 206 and a wall picture 207, for example.

PRIOR ART DOCUMENTS

Patent Documents

[Patent Document 1] Japanese Patent Application Laid-Open No. H5-191726
[Patent Document 2] Japanese Patent Application Laid-Open No. 2008-34372
[Patent Document 3] Japanese Patent Application Laid-Open No. 2006-106614

SUMMARY OF THE INVENTION

Problems to be Solved by the Invention

In the presence display device 200, on the surface of the transmission factor control screen 202 at the opposite side of the projector 201, an image can be displayed. However, there is displayed the image that is obtained by reversing an image seen from the surface of the transmission factor control screen 202 at the projector 201 side. That is, according to the presence display device 200, it is difficult to perform appropriate image display to observers positioned respectively at both sides sandwiching the panel (the screen) contributing to image display. Further, the PDLC panel can spread light or allow light to be transmitted, but cannot shield the light. Therefore, in the presence display device 200 in which only the PDLC panel is used as the panel contributing to image display, black display cannot be performed. Further, in the presence display device 200, the projector 201 not only functions as a light source unit, but also forms an image itself. Accordingly, in the presence display device 200, in order to appropriately set a focal distance of light applied by the projector 201 and the like, an installation position of the projector 201 is restricted to a relatively narrow range.

Therefore, an object of the present invention is to provide an image display device capable of performing appropriate image display to observers positioned at both sides sandwiching a panel contributing to image display, transmittance of a background, and black display, while relaxing a restriction of an installation position of a light source unit, and a drive method for the image display device.

Means for Solving the Problems

A first aspect of the present invention is directed to an image display device that separates one frame period of a given input signal into a plurality of sub-frame periods, and displays an image corresponding to any of a plurality of colors in each sub-frame period, the image display device comprising:

two first display panels each comprising a plurality of first display elements arranged in a matrix shape; and
a light irradiating unit that applies light of the plurality of colors to the two first display panels, wherein the light irradiating unit comprises:
a light source unit; and
a second display panel capable of switching between a spreading state of spreading incident light and a transmittance state of allowing incident light to be transmitted,
the second display panel becomes in the spreading state at a time when the image is to be displayed, to spread light emitted by the light source unit, and
the two first display panels are arranged at both main surface sides of the second display panel, respectively, and display the image by controlling a transmission factor of light spread by the second display panel.

According to a second aspect of the present invention, in the first aspect of the present invention,
the light irradiating unit further comprises a first light guide plate that guides incident light, and
the light source unit comprises a light-guide plate light source unit comprising light emitting elements having the plurality of colors, and applying light to the first light guide plate.

According to a third aspect of the present invention, in the second aspect of the present invention,
from a side of one of the two first display panels, the first light guide plate, the second display panel, and the other of the two first display panels are sequentially arranged.

According to a fourth aspect of the present invention, in the second aspect of the present invention, the light irradiating unit further comprises a second light guide plate that guides incident light, the light-guide plate light source unit applies light to the first light guide plate and the second light guide plate, and from a side of one of the two first display panels, the first light guide plate, the second display panel, the second light guide plate, and the other of the two first display panels are sequentially arranged.

According to a fifth aspect of the present invention, in the second aspect of the present invention, the first light guide plate is formed into a plurality of blocks, and the light-guide plate light source unit applies light to each block.

According to a sixth aspect of the present invention, in the first aspect of the present invention, the light source unit comprises a first second-display panel light source unit comprising light emitting elements having the plurality of colors, and applying light to the second display panel.

According to a seventh aspect of the present invention, in the sixth aspect of the present invention, the first second-display panel light source unit applies light to one main surface of the second display panel.

According to an eighth aspect of the present invention, in the seventh aspect of the present invention, the light source unit comprises a second second-display panel light source unit comprising light emitting elements having the plurality of colors, and applying light to the second display panel, and the first second-display panel light source unit and the second second-display panel light source unit apply light to both main surfaces of the second display panel, respectively.

According to a ninth aspect of the present invention, in the sixth aspect of the present invention, the first second-display panel light source unit has directivity at a level at which light can be applied to a part of the second display panel.

According to a tenth aspect of the present invention, in the first aspect of the present invention, the second display panel comprises a plurality of second display elements each capable of switching between the spreading state and the transmittance state.

According to an eleventh aspect of the present invention, in the tenth aspect of the present invention, each of the second display elements corresponds to any of the plurality of first display elements, and becomes in a spreading state synchronously with a corresponding first display element, at a time when the image is to be displayed.

According to a twelfth aspect of the present invention, in the first aspect of the present invention, the image display device further comprises a first display drive unit that drives the two first display panels;

a second display drive unit that drives the second display panel;

a light source drive unit that drives the light source unit; and a signal processing unit that controls the first display drive unit, the second display drive unit, and the light source drive unit, respectively, based on the input signal.

According to a thirteenth aspect of the present invention, in the twelfth aspect of the present invention, the signal processing unit comprises:

a field sequential processing unit that generates, based on the input signal, field sequential image data for displaying an image in each sub-frame period;

an image control unit that generates first display data for controlling the first display drive unit, second display data for controlling the second display drive unit, and light source data for controlling the light source drive unit, based on display-image position assigning data for assigning a display position of an image to be displayed and the field sequential image data, each of which is obtained based on the input signal;

a first display control unit that controls the first display drive unit based on the first display data;

a second display control unit that controls the second display drive unit based on the second display data; and a light source control unit that controls the light source drive unit based on the light source data.

According to a fourteenth aspect of the present invention, in the thirteenth aspect of the present invention, the input signal comprises the display-image position assigning data and image data indicating an image to be displayed, and the signal processing unit further comprises a signal separation control unit that separates the input signal into the display-image position assigning data and the image data, and that gives the display-image position assigning data and the image data to the image control unit and the field sequential processing unit, respectively.

According to a fifteenth aspect of the present invention, in the thirteenth aspect of the present invention, the field sequential processing unit further generates the display-image position assigning data based on the input signal.

According to a sixteenth aspect of the present invention, in the twelfth aspect of the present invention, the signal processing unit interpolates, in the sub-frame period, images to be displayed in each of continuous frame periods.

According to a seventeenth aspect of the present invention, in the twelfth aspect of the present invention, each of the first display panels comprises a display area in which the image of a desired color is displayed by being provided with any color data out of the plurality of colors in each sub-frame period, and the signal processing unit generates the color data based on the input signal, obtains light source lighting time for assigning lighting time of a light emitting element having a color indicated by the color data, and a light-source drive timing control signal for controlling at least any of a lighting start time of a light emitting element of the color and a scan start time for giving the color data to the display area, and controls the light source lighting time and the light-source drive timing control signal, in accordance with a period in which color data necessary for displaying an image of the desired color is to be given to the display area, in each sub-frame period.

According to an eighteenth aspect of the present invention, in the seventeenth aspect of the present invention, each of the first display panels comprises a non-display area to which any color data out of the plurality of colors is given in each sub-frame period and in which the image is not displayed, and color data given to the non-display area is the same data for each color and in each pixel of the non-display area.

According to a nineteenth aspect of the present invention, in the eighteenth aspect of the present invention, the signal processing unit further comprises:

a field sequential processing unit that generates, based on the input signal, field sequential image data for displaying an image in each sub-frame period;

an image control unit that generates first display data for controlling the first display drive unit, second display data for controlling the second display drive unit, and light source data for controlling the light source drive unit including the light source lighting time, based on display-image position assigning data for assigning a display position of an image to be displayed and the field sequential image data, each of which is obtained based on the input signal;

a first display control unit that controls the first display drive unit, based on the first display data;

a second display control unit that controls the second display drive unit, based on the second display data; and a light source control unit that controls the light source drive unit, based on the light-source drive timing control signal and the light source data.

A twentieth aspect of the present invention is directed to a drive method for an image display device comprising two first display panels each comprising a plurality of first display elements arranged in a matrix shape, and a light irradiating unit applying light of a plurality of colors to the two first display panels and comprising a second display panel, separating one frame period of a given input signal into a plurality of sub-frame periods, and displaying an image corresponding to any of the plurality of colors in each sub-frame period, the drive method comprising:

a step of switching a state of the second display panel between a spreading state of spreading incident light and a transmittance state of allowing incident light to be transmitted; and a step of making the image displayed in the two first display panels by controlling a transmission factor of light spread by the second display panel, wherein the light irradiating unit further comprises a light source unit, the two first display panels are arranged at both main surface sides of the second display panel, respectively, and the step of switching the state of the second display panel comprises a step of switching the state of the second display panel to the spreading state at a time when the image is to be displayed, and spreading light emitted by the light source unit.

Effects of the Invention

According to the first aspect of the present invention, in the image display device of a field sequential (hereinafter, suitably abbreviated as "FS") system, a second display panel in the spreading state spreads light emitted by the light source unit, and two first display panels which are arranged at both main surface sides of the second display panel control a transmission factor of the spreading light. Therefore, images are formed independently in the two first display panels. Accordingly, appropriate image display can be performed to observers positioned at both sides sandwiching the two first display panels and the second display panel as panels contributing to image display. Further, by shielding the spreading light by the first display panels, black display can be performed. The image to be displayed is formed by not the light source unit, but by the first display panels. Therefore, restriction of the installation position of the light source unit (the projector in Japanese Patent Application Laid-Open No. H5-191726) can be relaxed. Further, when the second display panel is in the transmittance state, background light can be transmitted. It should be noted that, by employing the FS system, color image display in high resolution and in high utilization efficiency of light can be performed.

According to the second aspect of the present invention, the light emitted by the light-guide plate light source unit is applied to the second display panel via the first light guide plate. The two first display panels control the transmission factor of the spreading light. Thus, the two first display panels can respectively independently form images.

According to the third aspect of the present invention, from a side of one of the two first display panels, there are sequentially arranged the first light guide plate, the second display panel, and the other of the two first display panels. Thus, effects similar to those in the second aspect of the present invention can be obtained.

According to the fourth aspect of the present invention, from a side of one of the two first display panels, the first light guide plate, the second display panel, the second light guide plate, and the other of the two first display panels are sequentially arranged. Thus effects similar to those in the second aspect of the present invention can be obtained. Further, the light emitted from each of the first and second light guide plates is spread by the second display panel, and is applied to the first display panels. Accordingly, luminance of the display image can be improved.

According to the fifth aspect of the present invention, because the first light guide plate formed into blocks is used, it is possible to arrange such that light is applied to a part that is set to the spreading state, and light is not applied to a part that is set to the transmittance state in the second display panel. Therefore, it is possible to appropriately mix in one screen a part where image display is performed and a part where background transmittance is performed.

According to the sixth aspect of the present invention, image display can be performed, by applying light from the first second-display panel light source unit to the second display panel, and by controlling the transmission factor of the spreading light by the two first display panels.

According to the seventh aspect of the present invention, by applying light to one main surface of the second display panel, effects similar to those in the sixth aspect of the present invention can be obtained.

According to the eighth aspect of the present invention, because light is applied to both main surfaces of the second display panel, luminance of the display image can be improved.

According to the ninth aspect of the present invention, it is possible to arrange such that light is applied to a part that is set to the spreading state, and light is not applied to a part that is set to the transmittance state in the second display panel. Therefore, it is possible to appropriately mix in one screen a part where image display is performed and a part where background transmittance is performed.

According to the tenth aspect of the present invention, the second display panel includes a plurality of second display elements, and each second display element can be switched between the spreading state and the transmittance state. Therefore, in accordance with the display position of the image, a part to be set to the spreading state and a part to be set to the transmittance state can be set in the second display panel. Accordingly, image display and background transmittance can be performed simultaneously.

According to the eleventh aspect of the present invention, because the second display element is set to the spreading state synchronously with the first display element, a part to be set to the spreading state and a part to be set to the transmittance state in the second display panel are set following the image displayed in the first display panels. Therefore, in the video display and the like, spreading light from the second display panel is securely applied in the first display panels. Accordingly, picture quality at a video displaying time and the like can be improved.

According to the twelfth aspect of the present invention, by using the signal processing unit, and the first display drive unit, the second display drive unit, and the light source drive unit that are controlled by the signal processing unit, it is possible to securely drive the two first display panels, the second display panel, and the light source unit.

According to the thirteenth aspect of the present invention, by using the signal processing unit including the FS processing unit, the image control unit, the first display control unit, the second display control unit, and the light source control unit, it is possible to securely perform the FS system driving.

According to the fourteenth aspect of the present invention, because the display-image position assigning data is included in the input signal, it is possible to securely reflect a display position of the image intended in the generation origin of the input signal.

According to the fifteenth aspect of the present invention, because the display-image position assigning data is generated by the FS processing unit, a display position of the image can be set in real time or at a predetermined position, for example.

According to the sixteenth aspect of the present invention, because frame interpolation is performed by using a sub-frame period, smooth video display can be performed.

According to the seventeenth aspect of the present invention, the light source lighting time and the light-source drive timing control signal are controlled, in accordance with a period in which color data necessary for displaying the image of a desired color is to be given to the display area. Therefore, at a desired position of the first display panels, there can be set a display area on which the image of a desired color having suppressed occurrence of color unevenness is displayed.

According to the eighteenth aspect of the present invention, color data given to the non-display area becomes the same data for each color and for each pixel of the non-display area. Therefore, the non-display area becomes an area in which occurrence of color unevenness is suppressed.

According to the nineteenth aspect of the present invention, by using the signal processing unit including the FS processing unit, the image control unit, the first display control unit, the second display control unit, and the light source control unit, it is possible to securely perform the FS system driving.

According to the twentieth aspect of the present invention, in the drive method for an image display device, effects similar to those in the first aspect of the present invention can be obtained.

MODES FOR CARRYING OUT THE INVENTION

Hereinafter, first to fourth embodiments of the present invention will be described with reference to the appended drawings.

1. First Embodiment

1.1 Overall Configuration

Figure 1:
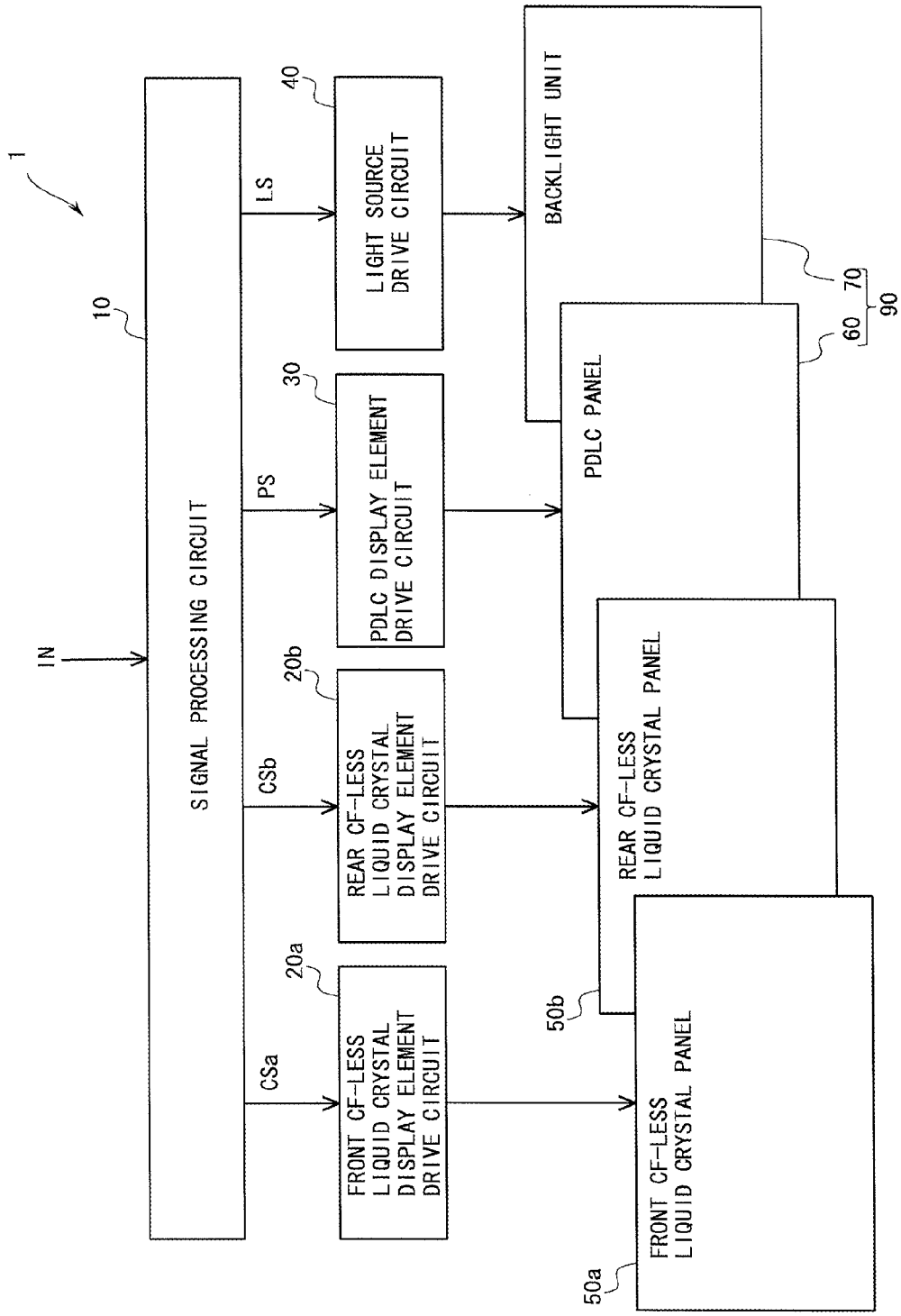
FIG. 1 is a block diagram showing a configuration of an image display device according to a first embodiment of the present invention.

FIG. 1 is a block diagram showing a configuration of the image display device 1 according to the first embodiment of the present invention. In the following, a color filter will be abbreviated as "CF". An image display device 1 includes a signal processing circuit 10, a front CF-less liquid crystal display element drive circuit 20a, a rear CF-less liquid crystal display element drive circuit 20b, a PDLC display element drive circuit 30, a light source drive circuit 40, a front CF-less liquid crystal panel 50a, a rear CF-less liquid crystal panel 50b, a PDLC panel 60, and a backlight unit 70. In the following, when the front CF-less liquid crystal panel 50a and the rear CF-less liquid crystal panel 50b are not distinguished, these will be referred to as "CF-less liquid crystal panels 50". In the present embodiment, the front CF-less liquid crystal display element drive circuit 20a and the rear CF-less liquid crystal display element drive circuit 20b correspond to a first display drive unit, the PDLC display element drive circuit 30 corresponds to a second display drive unit, the front CF-less liquid crystal panel 50a corresponds to one of two first display panels, the rear CF-less liquid crystal panel 50b corresponds to the other of the two first display panels, and the PDLC panel 60 corresponds to a second display panel. In the present embodiment, the PDLC panel 60 and the backlight unit 70 constitute a light irradiating unit 90.

The image display device 1 displays an image in the CF-less liquid crystal panel 50 by an FS system (field sequential system). The FS system is a system for performing additive color mixing on the retina of an observer, by sequentially switching the light emitting elements of an LED (Light Emitting Diode), a CCFL (Cathode Fluorescent Lamp), and the like of a red color (R), a green color (G), and a blue color (B) that become backlight light, and also by sequentially giving to the liquid crystal panel, synchronously with the switching, the data of a color corresponding to the color of each light emitting element to control the transmittance state of the liquid crystal panel. According to the FS system, because color display can be performed without forming a plurality of sub-pixels in one pixel, high resolution can be realized. Further, because light from these light emitting elements can be utilized directly, a CF does not need to be formed in each pixel (CF-less), and utilization efficiency of light of each light emitting element improves.

The signal processing circuit 10 receives an input signal IN from the outside, and controls the front CF-less liquid crystal display element drive circuit 20a, the rear CF-less liquid crystal display element drive circuit 20b, the PDLC display element drive circuit 30, and the light source drive circuit 40, based on the input signal IN. More specifically, the signal processing circuit 10 gives a front CF-less liquid crystal display element signal CSa for controlling the front CF-less liquid crystal display element drive circuit 20a, to the front CF-less liquid crystal display element drive circuit 20a, gives a rear CF-less liquid crystal display element signal CSb for controlling the rear CF-less liquid crystal display element drive circuit 20b, to the rear CF-less liquid crystal display element drive circuit 20b, gives a PDLC display element signal PS for controlling the PDLC display element drive circuit 30, to the PDLC display element drive circuit 30, and gives a light source signal LS for controlling the light source drive circuit 40, to the light source drive circuit 40.

The front CF-less liquid crystal display element drive circuit 20a drives the front CF-less liquid crystal panel 50a, based on the received front CF-less liquid crystal display element signal CSa. The rear CF-less liquid crystal display element drive circuit 20b drives the rear CF-less liquid crystal panel 50b, based on the received rear CF-less liquid crystal display element signal CSb. The PDLC display element drive circuit 30 drives the PDLC panel 60, based on the received PDLC display element signal PS. The light source drive circuit 40 drives the backlight unit 70, based on the received light source signal LS.

Figure 2:
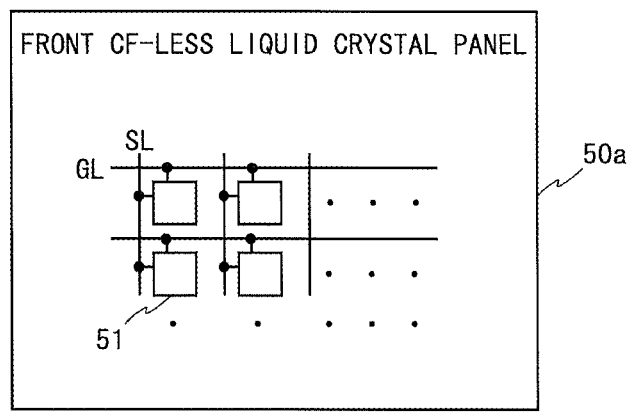
FIG. 2 is a view showing a configuration of a front CF-less liquid crystal panel shown in FIG. 1.

FIG. 2 is a view showing a configuration of the front CF-less liquid crystal panel 50a shown in FIG. 1. The front CF-less liquid crystal panel 50a includes a plurality of signal lines SL, a plurality of scanning lines GL, and a plurality of CF-less liquid crystal display elements 51 arranged in a matrix shape in accordance with the intersection of the plurality of signal lines SL and the plurality of scanning lines GL. The front CF-less liquid crystal panel 50a controls a transmission factor of each of the CF-less liquid crystal display elements 51 by being driven by the front CF-less liquid crystal display element drive circuit 20a. It should be noted that the rear CF-less liquid crystal panel 50b has a configuration similar to that of the front CF-less liquid crystal panel 50a, and controls a transmission factor of each of the CF-less liquid crystal display elements 51 by being driven by the rear CF-less liquid crystal display element drive circuit 20b. However, the number of pixels of the front CF-less liquid crystal panel 50a and the number of pixels of the rear CF-less liquid crystal panel 50b are not necessarily required to be coincident with each other. In the present embodiment, by controlling the transmission factor of the CF-less liquid crystal display element 51, black display is possible in each of the front CF-less liquid crystal panel 50a and the rear CF-less liquid crystal panel 50b. It should be noted that the CF-less liquid crystal panel 50 according to the present embodiment may be any of a normally black system and a normally white system. In the present embodiment, the CF-less liquid crystal display element 51 corresponds to a first display element.

Figure 3:
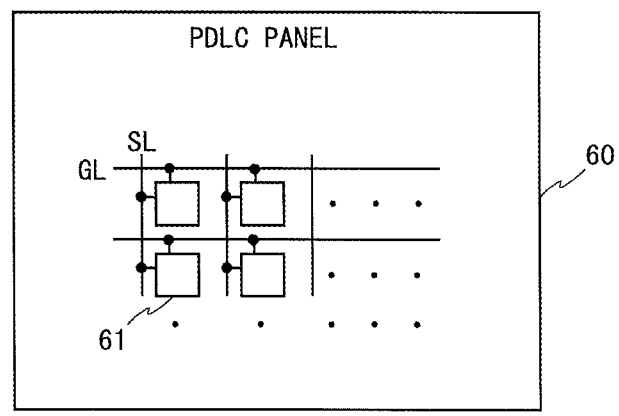
FIG. 3 is a view showing a configuration of a PDLC panel shown in FIG. 1.

FIG. 3 is a view showing a configuration of the PDLC panel 60 shown in FIG. 1. The PDLC panel 60 includes a plurality of signal lines SL, a plurality of scanning lines GL, and a plurality of PDLC display elements 61 arranged in a matrix shape in accordance with the intersection of the plurality of signal lines SL and the plurality of scanning lines GL. Each of the PDLC display elements 61 corresponds to any of the plurality of CF-less liquid crystal display elements 51. It should be noted that the number of the PDLC display elements 61 (the number of pixels of the PDLC panel 60) is not necessarily required to be consistent with the number of the CF-less liquid crystal display elements (the number of pixels of the CF-less liquid crystal panel 50). The PDLC panel 60 includes a PDLC layer. For example, the PDLC layer becomes in the spreading state of spreading incident light when a voltage is not applied, and becomes in the transmittance state of transmitting incident light when a voltage is applied. It should be noted that the PDLC layer may become in the transmittance state when a voltage is not applied, and become in the spreading state when a voltage is applied. The state of the PDLC layer can be controlled in a PDLC display element 61 unit. In the present specification, for convenience of description, the state of the PDLC layer is also described as the state of the PDLC panel 60 or the state of the PDLC display element 61. The PDLC panel 60 controls the state of each of the PDLC display elements 61 by being driven by the PDLC display element drive circuit 30. In the present embodiment, the PDLC display element 61 corresponds to a second display element.

The PDLC panel 60 may be set switchable to an intermediate state of spreading and also transmitting incident light, in addition to the spreading state and the transmittance state. In other words, the PDLC panel 60 may be set switchable to the spreading state with a relatively large spreading rate, the transmittance state with a relatively small spreading rate, and the intermediate state where the spreading rate is an intermediate value between a value in the spreading state and a value in the transmittance state. In the present specification, the "spreading rate" is a value expressing a level of spreading the incident light, and when the value becomes larger, the level of spreading becomes large. The spreading rate of the PDLC panel 60 is controlled by the application voltage. For example, the larger the application voltage is, the smaller the spreading rate of the PDLC panel 60 becomes. Further, the larger the application voltage is, the larger the spreading rate of the PDLC panel 60 may become. It should be noted that there may be a plurality of kinds of the intermediate state. Utilization of the intermediate state of the PDLC panel 60 will be described later.

Figure 4:
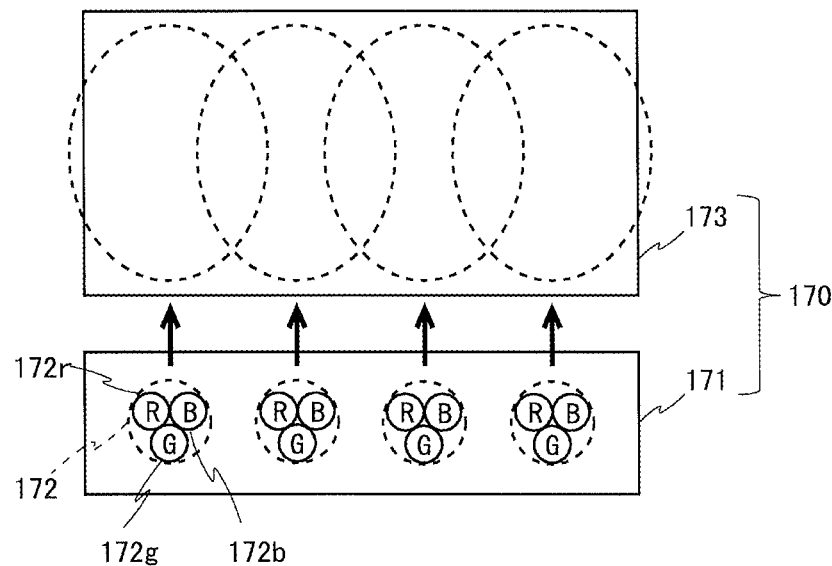
FIG. 4 is a view showing a configuration of a backlight unit including a general light guide plate.

FIG. 4 is a view for explaining the operation of the backlight unit 170 including the general light guide plate 173. The backlight unit 170 includes a light-guide plate light source unit 171 and a light guide plate 173. The light-guide plate light source unit 171 includes a plurality of light sources 172 each including a light emitting element 172r, a light emitting element 172g, and a light emitting element 172b that have a red color, a green color, and a blue color, respectively, for example. The light guide plate 173 guides light source light emitted by the light-guide plate light source unit 171, and emits the guided light source light. Each of the light sources 172 can control light intensity of each color. For example, controlling a turn on state/a turn off state can be performed for each color. The general light guide plate 173 guides incident light source light with no directivity, as shown in FIG. 4. Accordingly, the whole light guide plate 173 emits light.

Figure 5:
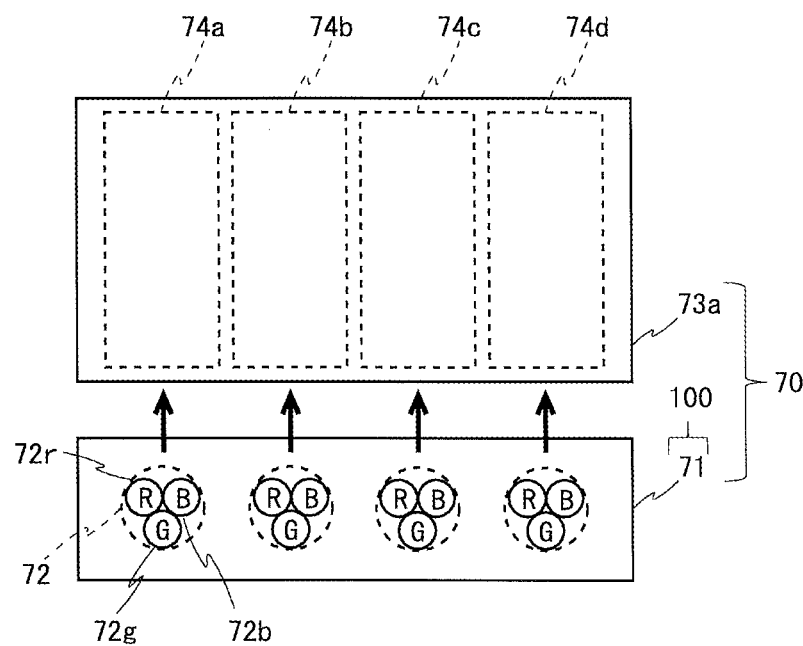
FIG. 5 is a view showing a configuration of the backlight unit shown in FIG. 1.

FIG. 5 is a view showing a configuration of the backlight unit 70 shown in FIG. 1. The backlight unit 70 includes a light-guide plate light source unit 71 and a light guide plate 73a (hereinafter, for the sake of convenience, referred to as a "first light guide plate"). The light-guide plate light source unit 71 includes a plurality of light sources 72 each including one light emitting element 72r, one light emitting element 72g, and one light emitting element 72b that have a red color, a green color, and a blue color, respectively, for example. The arrangement of the plurality of light sources 72 is not particularly limited. In the present embodiment, the light-guide plate light source unit 71 constitutes a light source unit 100, and the PDLC panel 60 and the backlight unit 70 constitute the light irradiating unit 90. Each light emitting element is, for example, an LED, a CCFL, or a laser light source, or an inorganic/organic EL (Electro Luminescence) light source. Each of the light sources 72 can control light intensity of each color. For example, controlling a turn on state/a turn off state can be performed for each color. The light-guide plate light source unit 71 emits red color light, green color light, and blue color light (hereinafter, these are also collectively referred to as "light source light"), by sequentially turning on the light emitting elements 72r, 72g, and 72b that have a red color, a green color, and a blue color, respectively. However, the turning-on order of the light emitting elements of the colors is not particularly limited. For example, the light emitting elements 72r, 72g, 72g, and 72b that have a red color, a green color, a green color, and a blue color, respectively, may be sequentially turned on.

The light source 72 is not limited to include one light emitting element 72r, one light emitting element 72g, and one light emitting element 72b that have a red color, a green color, and a blue color, respectively. For example, there are a case in which the light source 72 includes two light emitting elements 72r having a red color, two light emitting elements 72g having a green color, and one light emitting element 72b having a blue color, and a case in which the light source 72 includes one light emitting element 72r having a red color, two light emitting elements 72g having a green color, and one light emitting element 72b having a blue color. Moreover, the number of the light sources 72 is not limited to plural. The number of the light sources 72 may be one. Further, the configuration may be such that the color of the light emitted by one white color LED is switched by using a phosphor that emits light of a red color, a green color, and a blue color or a CF. It should be noted that the description of the light source 72 will be similarly applied to the above light source 172.

The first light guide plate 73a in the present embodiment is constituted by being formed into a plurality (four in FIG. 5) of blocks 74a to 74d arrayed in a row. Each of the blocks guides the light source light emitted by the corresponding light source 72, and emits the guided light source light. The first light guide plate 73a emits light for each block of the first light guide plate 73a by guiding incident light source light with directivity. Therefore, area active drive can be performed. Such a configuration of the first light guide plate 73a is disclosed in Japanese Patent Application Laid-Open No. 2008-34372, for example. It should be noted that the light-guide plate light source unit 71 may be arranged at least at any of the upper end side (the upper side of the paper surface), the lower end side (the lower side of the paper surface), the left end side (the left side of the paper surface), and the right end side (the right side of the paper surface) of the first light guide plate 73a.

1.2 Signal Control Circuit

Figure 6:
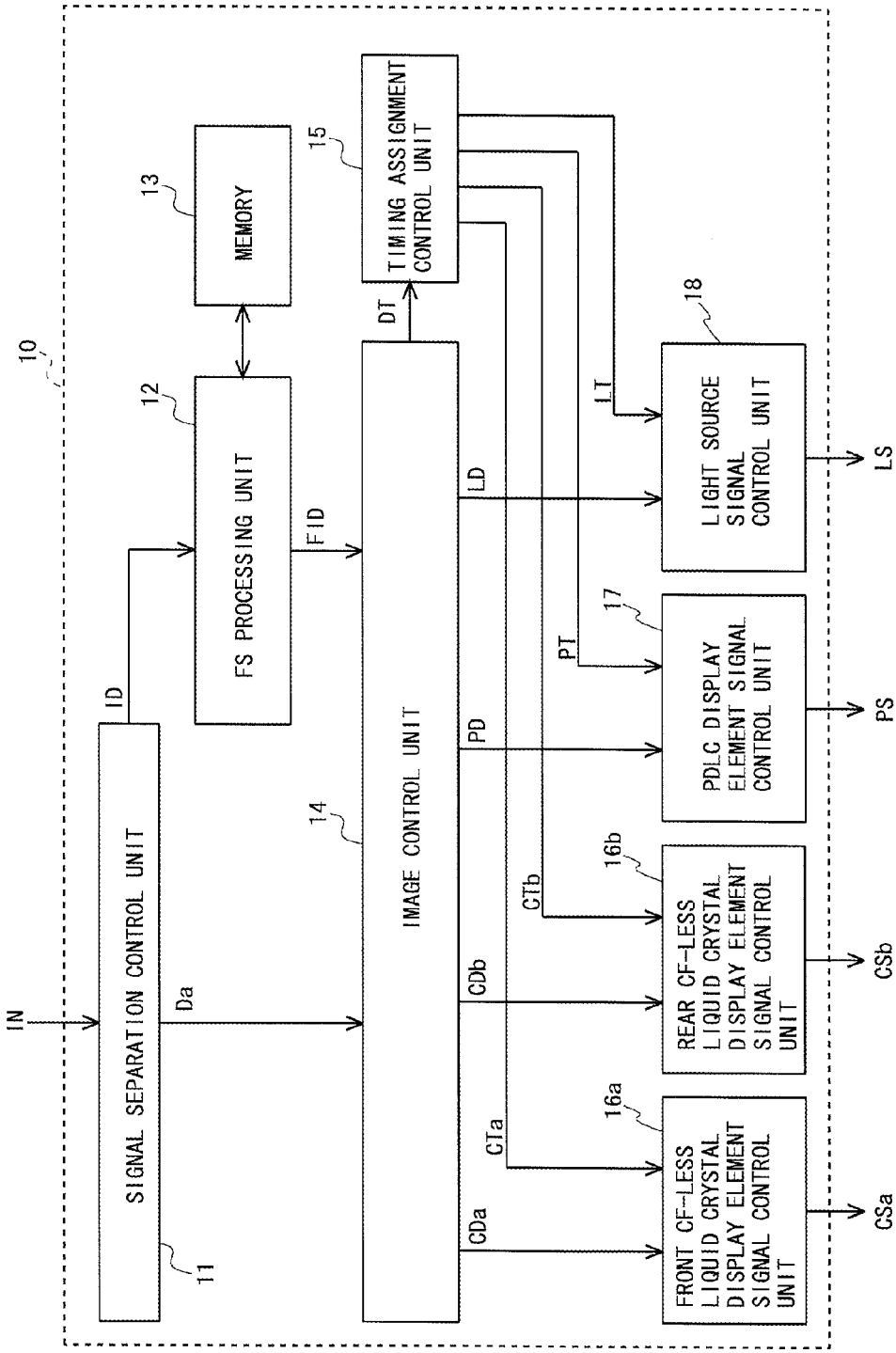
FIG. 6 is a block diagram showing a configuration of a signal processing circuit shown in FIG. 1.

FIG. 6 is a block diagram showing a configuration of the signal processing circuit 10 shown in FIG. 1. The signal processing circuit 10 includes a signal separation control unit 11, an FS processing unit (field sequential processing unit) 12, a memory 13, an image control unit 14, a timing assignment control unit 15, a front CF-less liquid crystal display element signal control unit 16a, a rear CF-less liquid crystal display element signal control unit 16b, a PDLC display element signal control unit 17, and a light source signal control unit 18.

The input signal IN in the present embodiment includes display-image position assigning data Da for assigning a display position of an image to be displayed, and an image data ID indicating an image to be displayed. The signal separation control unit 11 receives the input signal IN, and separates the input signal IN into the display-image position assigning data Da and the image data ID. The signal separation control unit 11 gives the display-image position assigning data Da to the image control unit 14, and gives the image data ID to the FS processing unit 12.

The FS processing unit 12 generates an FS image data (field sequential image data) FID for displaying the image in each sub-frame period, based on the received image data ID, and gives the generated FS image data FID to the image control unit 14. More specifically, when the FS processing unit 12 has received the image data ID having a frame rate of 60 fps, for example, the FS processing unit 12 converts the image data ID to an image data ID having a frame rate of 240 fps (performs frame rate conversion). The FS processing unit 12 generates the FS image data FID of a red color, a green color, and a blue color having a frame rate of 240 fps, based on the image data ID having the frame rate of 240 fps. In the following, the image that the image data ID indicates will be also referred to as a "frame image", and the image that the FS image data FID indicates will be also referred to as a "sub-frame image". It should be noted that the frame rate after frame rate conversion is not limited to 240 fps, and is desirably a higher-speed frame rate so far as a response speed of each display element can respond to the frame rate.

Further, in generating the FS image data FID, the FS processing unit 12 utilizes the information that the memory 13 holds. The information that the memory 13 holds shows a spreading rate and the like of each PDLC display element 61. In this way, the FS image data FID includes data according to the number of separation of the area (hereinafter, referred to as a "separation area") in which the state is independently controlled in the PDLC panel 60 and spreading of light from each separation area. In the following, the area of the CF-less liquid crystal panel 50 corresponding to (more specifically, opposing) the separation area of the PDLC panel 60 will be also referred to as a "separation area". The separation area of the PDLC panel 60 can be related to the blocks of the first light guide plate 73a. It should be noted that, in place of the memory 13, or together with the memory 13, there may be provided a register for setting information of a spreading rate and the like of each PDLC display element 61.

Based on the display-image position assigning data Da and the FS image data FID, the image control unit 14 generates front CF-less liquid crystal data CDa for controlling the front CF-less liquid crystal display element signal control unit 16a, rear CF-less liquid crystal data CDb for controlling the rear CF-less liquid crystal display element signal control unit 16b, PDLC data PD for controlling the PDLC display element signal control unit 17, light source data LD for controlling the light source signal control unit 18, and a drive timing control signal DT for adjusting a timing by synchronizing respective output signals of the front CF-less liquid crystal display element signal control unit 16a, the rear CF-less liquid crystal display element signal control unit 16b, the PDLC display element signal control unit 17, and the light source signal control unit 18. It should be noted that, in other words, the drive timing control signal DT is a signal for controlling an operation start time of each of the front CF-less liquid crystal panel 50a, the rear CF-less liquid crystal panel 50b, the PDLC panel 60, and the backlight unit 70 (hereinafter, referred to as "each module") so as to be able to synchronize each module. The image control unit 14 gives the drive timing control signal DT, the front CF-less liquid crystal data CDa, the rear CF-less liquid crystal data CDb, the PDLC data PD, and the light source data LD, to the timing assignment control unit 15, the front CF-less liquid crystal display element signal control unit 16a, the rear CF-less liquid crystal display element signal control unit 16b, the PDLC display element signal control unit 17, and the light source signal control unit 18, respectively. It should be noted that a detailed configuration of the image control unit 14 will be described later.

The timing assignment control unit 15 receives the drive timing control signal DT generated by the image control unit 14, and generates a front CF-less liquid crystal timing assignment signal CTa for assigning a drive timing of each CF-less liquid crystal display element 51 of the front CF-less liquid crystal panel 50a, a rear CF-less liquid crystal timing assignment signal CTb for assigning a drive timing of each CF-less liquid crystal display element 51 of the rear CF-less liquid crystal panel 50b, a PDLC timing assignment signal PT for assigning a drive timing of each PDLC display element 61, and a light source timing assignment signal LT for assigning a drive timing of each light source 72, based on the drive timing control signal DT. At the time of generating the front CF-less liquid crystal timing assignment signal CTa, the rear CF-less liquid crystal timing assignment signal CTb, the PDLC timing assignment signal PT, and the light source timing assignment signal LT, the timing assignment control unit 15 can use the memory 13 provided at the outside of the timing assignment control unit 15 or a register not shown. The timing assignment control unit 15 gives the front CF-less liquid crystal timing assignment signal CTa, the rear CF-less liquid crystal timing assignment signal CTb, the PDLC timing assignment signal PT, and the light source timing assignment signal LT that have been generated, to the front CF-less liquid crystal display element signal control unit 16a, the rear CF-less liquid crystal display element signal control unit 16b, the PDLC display element signal control unit 17, and the light source signal control unit 18, respectively.

Based on the front CF-less liquid crystal data CDa and the front CF-less liquid crystal timing assignment signal CTa that have been received, the front CF-less liquid crystal display element signal control unit 16a generates the front CF-less liquid crystal display element signal CSa, and gives the front CF-less liquid crystal display element signal CSa to the front CF-less liquid crystal display element drive circuit 20a.

Based on the rear CF-less liquid crystal data CDb and the rear CF-less liquid crystal timing assignment signal CTb that have been received, the rear CF-less liquid crystal display element signal control unit 16b generates the rear CF-less liquid crystal display element signal CSb, and gives the rear CF-less liquid crystal display element signal CSb to the rear CF-less liquid crystal display element drive circuit 20b.

Based on the PDLC data PD and the PDLC timing assignment signal PT that have been received, the PDLC display element signal control unit 17 generates the PDLC display element signal PS, and gives the PDLC display element signal PS to the PDLC display element drive circuit 30.

Based on the light source data LD and the light source timing assignment signal LT that have been received, the light source signal control unit 18 generates the light source signal LS, and gives the light source signal LS to the light source drive circuit 40.

1.3 Image Control Unit

Figure 7:
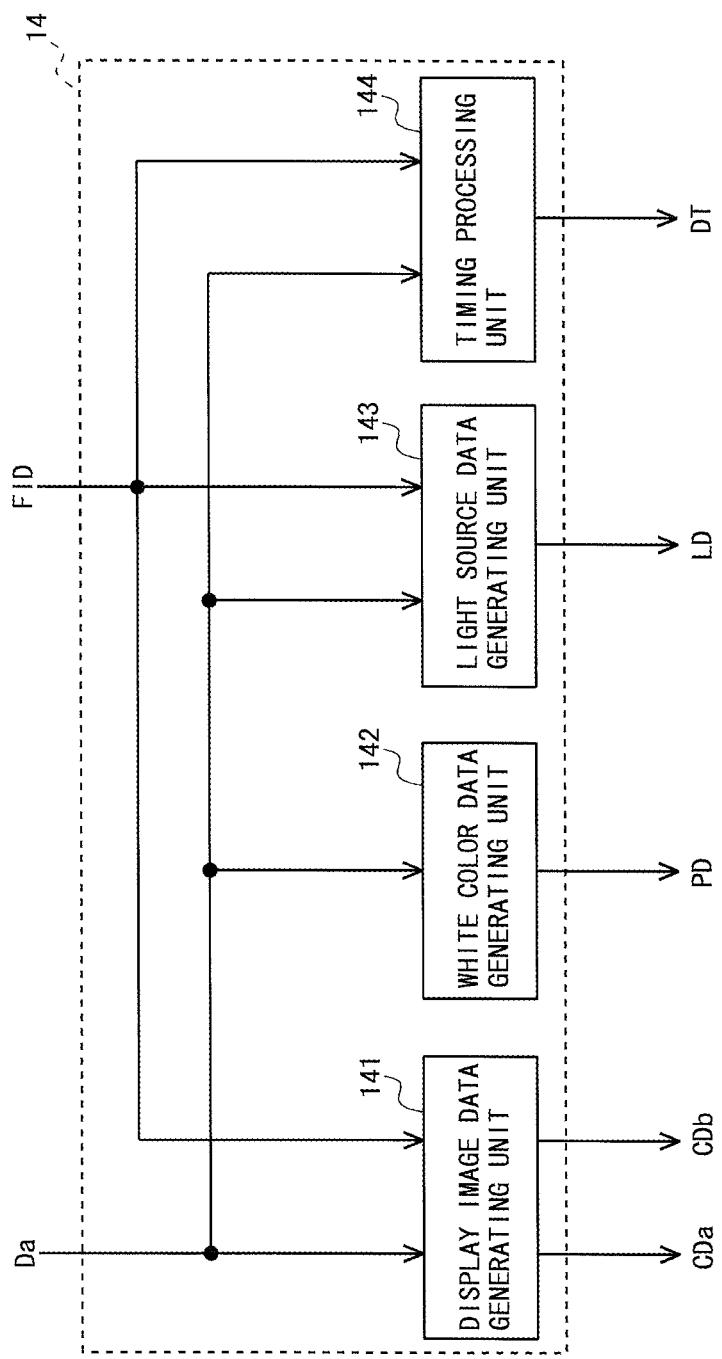
FIG. 7 is a block diagram showing a configuration of an image control unit shown in FIG. 6.

FIG. 7 is a block diagram showing a configuration of the image control unit 14 shown in FIG. 6. The image control unit 14 includes a display image data generating unit 141, a white color data generating unit 142, a light source data generating unit 143, and a timing processing unit 144.

The display image data generating unit 141 receives the display-image position assigning data Da and the FS image data FID, and generates, based on the received data, the front CF-less liquid crystal data CDa and the rear CF-less liquid crystal data CDb as display image data corresponding to the display image. Based on the front CF-less liquid crystal data CDa, the front CF-less liquid crystal display element signal control unit 16a can set a transmission factor of each of the CF-less liquid crystal display elements 51 in the front CF-less liquid crystal panel 50a. Based on the rear CF-less liquid crystal data CDb, the rear CF-less liquid crystal display element signal control unit 16b can set a transmission factor of each of the CF-less liquid crystal display elements 51 in the rear CF-less liquid crystal panel 50b. It is desirable that the front CF-less liquid crystal data CDa and the rear CF-less liquid crystal data CDb are generated such that the image display position match in the front CF-less liquid crystal panel 50a and the rear CF-less liquid crystal panel 50b. However, the present invention is not limited to this. The image shown by the rear CF-less liquid crystal data CDb is, for example, the image reversed (left and right reversed, in the present embodiment) from those of the image shown by the front CF-less liquid crystal data CDa, when seen from one of the front surface side and the rear surface side. However, the present invention is not limited to this.

The white color data generating unit 142 receives the display-image position assigning data Da, and based on this, generates the PDLC data PD as white color data in order to set a part of or the whole PDLC panel 60 in a white color (the spreading state). The PDLC display element signal control unit 17 can set the state of the PDLC panel 60, according to the position of the display image, based on the PDLC data PD. More specifically, at the position corresponding to the display image, the PDLC panel 60 becomes in the spreading state. However, the state may be set uniformly in the whole PDLC panel 60. In this case, it is not necessary to give the display-image position assigning data Da to the white color data generating unit 142. Further, it is not necessary to give the PDLC timing assignment signal PT to the PDLC display element signal control unit 17.

The light source data generating unit 143 receives the display-image position assigning data Da and the FS image data FID, and generates the light source data LD, based on the received data. The light source signal control unit 18 can set lighting time of the light emitting element of each color and the like, based on the light source data LD. The light source signal control unit 18 controls the light source drive circuit 40 such that the backlight unit 70 applies the light source light individually to each separation area of the PDLC panel 60. Further, the light source signal control unit 18 may assign the light emitting element to be lit according to the position of the display image, based on the light source data LD. It should be noted that, when the light source signal control unit 18 does not need to assign the light emitting element to be lit according to the position of the display image, the display-image position assigning data Da does not need to be given to the light source data generating unit 143.

The timing processing unit 144 receives the display-image position assigning data Da and the FS image data FID, and generates the drive timing control signal DT, based on the received data. More specifically, the timing processing unit 144, generates the drive timing control signal DT based on a desired relationship between the start time of the scan drive of the CF-less liquid crystal panel 50 and the PDLC panel 60 and the lighting start time of the light emitting element, the start time of the scan drive and the lighting start time being obtained from the display-image position assigning data Da and the FS image data FID.

1.4 Arrangement of Panel and Light Guide Plate

Figure 8:
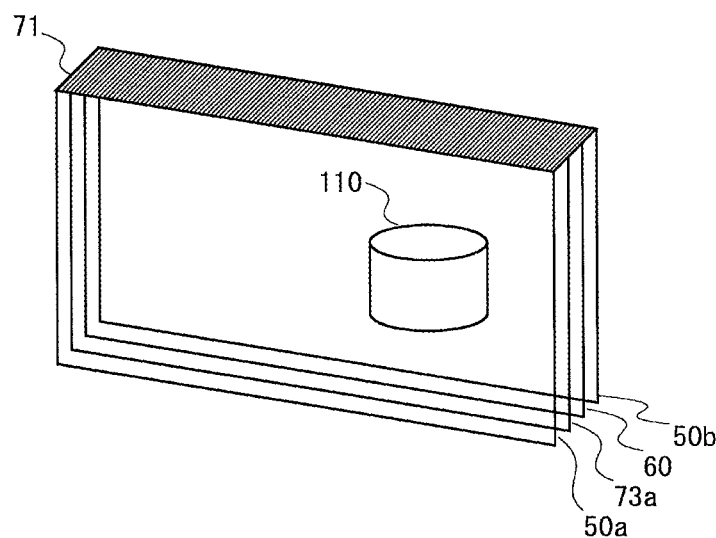
FIG. 8 is an oblique perspective view for explaining the arrangement of the front CF-less liquid crystal panel, the rear CF-less liquid crystal panel, the PDLC panel, and the first light guide plate according to the first embodiment.

FIG. 8 is an oblique perspective view for explaining the arrangement of the front CF-less liquid crystal panel 50a, the rear CF-less liquid crystal panel 50b, the PDLC panel 60, and the first light guide plate 73a according to the present embodiment. A front side of the paper surface of FIG. 8 will be referred to as a front surface, and the reverse side will be referred to as a rear surface (this will be similarly applied to the oblique perspective view described later). As shown in FIG. 8, from a side of the front CF-less liquid crystal panel 50a, there are sequentially arranged the first light guide plate 73a, the PDLC panel 60, and the rear CF-less liquid crystal panel 50b. That is, the first light guide plate 73a is positioned on the rear surface of the front CF-less liquid crystal panel 50a, the PDLC panel 60 is positioned on the rear surface of the first light guide plate 73a, and the rear CF-less liquid crystal panel 50b is positioned on the rear surface of the PDLC panel 60. The light-guide plate light source unit 71 is arranged on the upper end part (the upper side of the paper surface) of the first light guide plate 73a. In this way, according to the present embodiment, the front CF-less liquid crystal panel 50a and the rear CF-less liquid crystal panel 50b are arranged at the front surface side and the rear surface side (both main surface sides) of the PDLC panel 60 respectively. It should be noted that the position of the light-guide plate light source unit 71 is not limited to the example shown here, and may be arranged at least at any of the lower end part (the lower side of the paper surface), the right end part (the right side of the paper surface), and the left end part (the left side of the paper surface) of the first light guide plate 73a.

Figure 9:
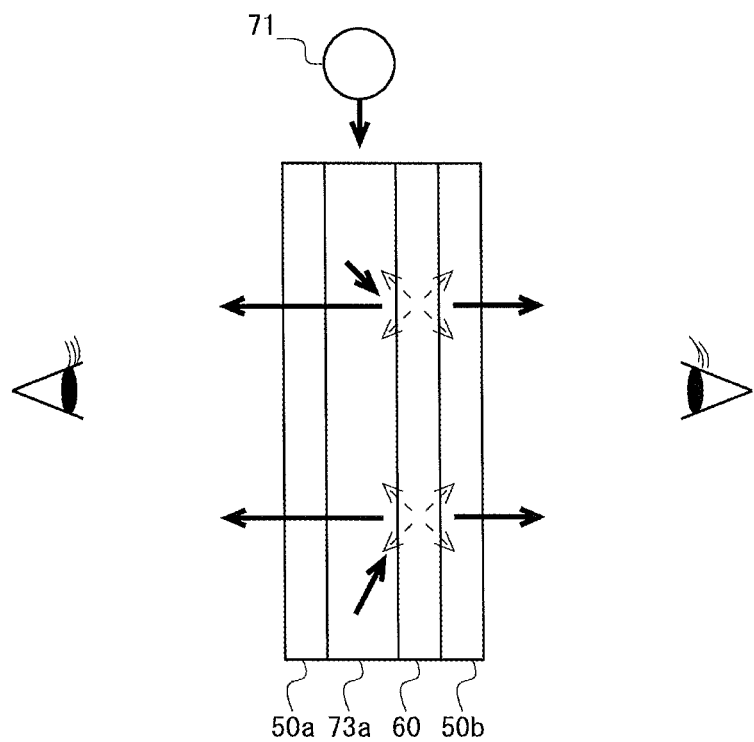
FIG. 9 is a sectional view of one pixel component of the front CF-less liquid crystal panel, the rear CF-less liquid crystal panel, the PDLC panel, and the first light guide plate shown in FIG. 8.

FIG. 9 is a sectional view of one pixel component of the front CF-less liquid crystal panel 50a, the rear CF-less liquid crystal panel 50b, the PDLC panel 60, and the first light guide plate 73a shown in FIG. 8. It should be noted that the one pixel component in this case is one pixel component based on the CF-less liquid crystal panel (the CF-less liquid crystal display element 51). The number of pixels of the CF-less liquid crystal panel 50 and the number of pixels of the PDLC panel 60 are not necessarily required to be consistent with each other. An air layer and the like may be provided between the front CF-less liquid crystal panel 50a and the first light guide plate 73a, between the first light guide plate 73a and the PDLC panel 60, and between the PDLC panel 60 and the rear CF-less liquid crystal panel 50b. In FIG. 9, the left side of the paper surface is a front surface, and the right side of the paper surface is a rear surface (this will be similarly applied to the sectional view described later). In the following description, the one pixel shown in FIG. 9 will be also referred to as a "focused pixel" for convenience of description.

First, a case where the focused pixel constitutes an image (image displaying time) will be described. It should be noted that, for convenience of description, it is assumed that at the image displaying time, the CF-less liquid crystal display element 51 of the front CF-less liquid crystal panel 50a corresponding to the focused pixel (hereinafter, referred to as a "front CF-less liquid crystal display element") and the CF-less liquid crystal display element 51 of the rear CF-less liquid crystal panel 50b corresponding to the focused pixel (hereinafter, referred to as a "rear CF-less liquid crystal display element") constitute the image on the front CF-less liquid crystal panel 50 (hereinafter, referred to as a "front surface image") and the image on the rear CF-less liquid crystal panel 50b (hereinafter, referred to as a "rear surface image"), respectively. However, it should be noted that there are a case where the front CF-less liquid crystal display element corresponding to the focused pixel constitutes the front surface image, and the rear CF-less liquid crystal display element corresponding to the focused pixel does not constitute the rear surface image, and a case where the front CF-less liquid crystal display element corresponding to the focused pixel does not constitute the front surface image, and the rear CF-less liquid crystal display element corresponding to the focused pixel constitutes the rear surface image.

At the image displaying time, a voltage is not applied to the PDLC display element 61, and the PDLC display element 61 is in the spreading state. At this time, the light source light emitted by the light-guide plate light source unit 71 is guided by the first light guide plate 73a, and is emitted to a separation area of the PDLC panel 60 including the focused pixel (hereinafter, referred to as a "focused separation area". It should be noted that the separation area of the CF-less liquid crystal panel 50 including the focused pixel is also similarly referred to as a "focused separation area") and the focused separation area of the front CF-less liquid crystal panel 50a. More specifically, the light source light is emitted from the light-guide plate light source unit 71 to the block corresponding to the focused separation area (hereinafter, referred to as a "focused block"), and the light source light guided by the focused block is emitted to the respective focused separation areas of the front CF-less liquid crystal panel 50a and the PDLC panel 60. Therefore, the light source light incident on the PDLC display element 61 is spread. An approximately vertical component facing the front CF-less liquid crystal display element 51a (hereinafter, referred to as a "front direction vertical component") out of the spread light source light is transmitted through the first light guide plate 73a and is emitted to the front CF-less liquid crystal display element 51a. An approximately vertical component facing a rear CF-less liquid crystal display element 51b (hereinafter, referred to as a "rear direction vertical component") out of the spread light source light is emitted to the rear CF-less liquid crystal display element 51b. In the following, for convenience of description, the light source light emitted to the rear surface side of the first light guide plate 73a will be referred to as "rear emission light source light", and the light source light emitted to the front surface side of the first light guide plate 73a will be referred to as "front emission light source light".

In this way, at the image displaying time, the light irradiating unit 90 including the PDLC panel 60 and the backlight unit 70 applies light including the front emission light source light and the front direction vertical component of the spread rear emission light source light to the front CF-less liquid crystal panel 50a (the front CF-less liquid crystal display element), and applies light including the rear direction vertical component of the spread rear emission light source light to the rear CF-less liquid crystal panel 50b (the rear CF-less liquid crystal display element).

Next, a case where the focused pixel does not constitute an image (image non-displaying time) will be described. There are two kinds of cases where the image is non-displayed: a case where the image is non-displayed in a whole surface of the CF-less liquid crystal panel 50 (hereinafter, referred to as a "whole surface non-displaying time"); and a case where the focused pixel does not constitute the image but there are other pixels that constitute the image (hereinafter referred to as a "partially non-displaying time"). It should be noted that, for convenience of description, it is assumed that at the whole surface non-displaying time, none of the front surface image and the rear surface image is displayed. However, it should be noted that there is a case where only one of the front surface image and the rear surface image is displayed, and the other is not displayed. Further, for convenience of description, it is assumed that the front CF-less liquid crystal display element and the rear CF-less liquid crystal display element corresponding to the focused pixel do not constitute the front surface image and the rear surface image, respectively. However, as described above, it should be noted that there are a case where the front CF-less liquid crystal display element corresponding to the focused pixel constitute the front surface image, and the rear CF-less liquid crystal display element corresponding to the focused pixel does not constitute the rear surface image, and a case where the front CF-less liquid crystal display element corresponding to the focused pixel does not constitute the front surface image, and the rear CF-less liquid crystal display element corresponding to the focused pixel constitutes the rear surface image.

Out of the whole surface non-displaying time and the partially non-displaying time, the whole surface non-displaying time will be first described. In the present embodiment, it is assumed that, in a portion that does not display the image, the CF-less liquid crystal display element 51 has been set in a relatively high transmission factor to enable to transmit the background. It should be noted that, when it is not necessary to transmit the background, in the portion that does not display the image, the transmission factor of the CF-less liquid crystal display element 51 may be set in a relatively low value (that is, black display). In the portion that does not display the image, the PDLC display element 61 may be set to the spreading state or the intermediate state. Accordingly, the level of the transmittance of the background can be adjusted, and the background may be allowed to be lightly transmitted, for example. In the portion that displays the image, the background may be allowed to be slightly transmitted within a range where the picture quality is not dropped by setting the PDLC display element 61 in the intermediate state. In this way, in the case of utilizing the intermediate state of the PDLC display element 61 (the PDLC panel 60), various display can be performed.

At the whole surface non-displaying time, a voltage is applied to the PDLC display element 61, and the PDLC display element 61 is in the transmittance state. Further, from the light-guide plate light source unit 71, the light source light is not emitted to any block of the first light guide plate 73*a*. Therefore, to the front CF-less liquid crystal display element, background light from the rear surface side which has been transmitted through the rear CF-less liquid crystal display element, the PDLC display element 61, and the first light guide plate 73*a* is applied. Further, to the rear CF-less liquid crystal display element, background light from the front surface side which has been transmitted through the front CF-less liquid crystal display element, the first light guide plate 73*a*, and the PDLC display element 61 is applied. Accordingly, the background is transmitted at both the front surface side and the rear surface side.

At the partially non-displaying time, the PDLC display element 61 is in the transmittance state in a similar manner to that at the whole surface non-displaying time. On the other hand, unlike at the whole surface non-displaying time, the light source light is not emitted from the light-guide plate light source unit 71 to the focused block, and the light source light is emitted from the light-guide plate light source unit 71 to other blocks. In this way, to the front CF-less liquid crystal display element in the separation area in which image display is not performed, the background light from the rear surface side which has been transmitted through the rear CF-less liquid crystal display element, the PDLC display element 61, and the first light guide plate 73*a* is applied. To the front CF-less liquid crystal display element in the separation area in which image display is performed, light including the front emission light source light and a front direction vertical component of the spread rear emission light source light is applied. To the rear CF-less liquid crystal display element in the separation area in which image display is not performed, the background light from the front surface side which has been transmitted through the front CF-less liquid crystal display element, the first light guide plate 73*a*, and the PDLC display element 61 is applied. To the rear CF-less liquid crystal display element in the separation area in which image display is performed, light including the rear direction vertical component of the spread rear emission light source light is applied. Therefore, it is possible to simultaneously perform image display and background transmittance, and also appropriately mix in one screen a part where image display is performed and a part where background transmittance is performed.

There are broadly two kinds of light guide plates that are for the front light and for the back light. In both two kinds, light source light is emitted to both the front surface side and the rear surface side. Therefore, the first light guide plate 73*a* employed in the above configuration may be any of the light guide plate for the front light and the light guide plate for the back light. It should be noted that the light guide plate for the front light has much rear emission light source light and has little front emission light source light, as compared with the light guide plate for the back light. The configuration of the light guide plate for the front light is disclosed in Japanese Patent Application Laid-Open No. 2006-106614, for example.

1.5 Operation

Next, the operation for displaying a color image in the present embodiment will be described. In the following, in the drive of the FS system (hereinafter, referred to as "FS drive") for sequentially displaying images of a red color, a green color, and a blue color, a case of displaying the image of a red color will be mainly described as an example. However, the present invention is not limited to this. It should be noted that, in the FS drive, images of any color of a plurality of colors may be sequentially displayed, such as sequentially displaying the images of a red color, a green color, a green color, and a blue color. The present invention is also applied to the case of displaying an image including any two colors out of three colors of a red color, a green color, and a blue color, or including all colors. The present invention is applied to not only the FS drive of displaying color images by sequentially displaying the images of a red color, a green color, and a blue color, but also to other FS drive such as FS drive of sequentially displaying images of cyan (C), magenta (M), and yellow (Y), for example, and FS drive in which color states are mixed in the screen by being combined with local dimming drive.

It should be noted that, in the case where full color display is not necessary, images may be displayed in the order of a white color, a white color, a white color, and a white color, or in the order of a red color, a red color, a red color, and a red color. In this case, the light source 72 does not need to be in a plurality of colors. Further, in this case, one frame period is not necessarily required to be separated into a plurality of sub-frame periods. By this configuration, power efficiency of the light-guide plate light source unit 71 can be improved.

The "image of a red color" in the present specification will be defined. The "image of a red color" indicates a red color maximum luminance image. In the FS drive in which one frame includes three sub-frames of red, green, and blue, the "image of a red color" is the image in which data of a maximum transmittance amount of light of a red color as red color data, and data of a minimum transmittance amount of light of a green color and a blue color as green color data and blue color data are given to the CF-less liquid crystal panel 50. In the following, data in which a transmittance amount of light of each color becomes maximum will be referred to as "transmittance data", and data in which a transmittance amount of light of each color becomes minimum will be referred to as "shield data".

Figure 10:
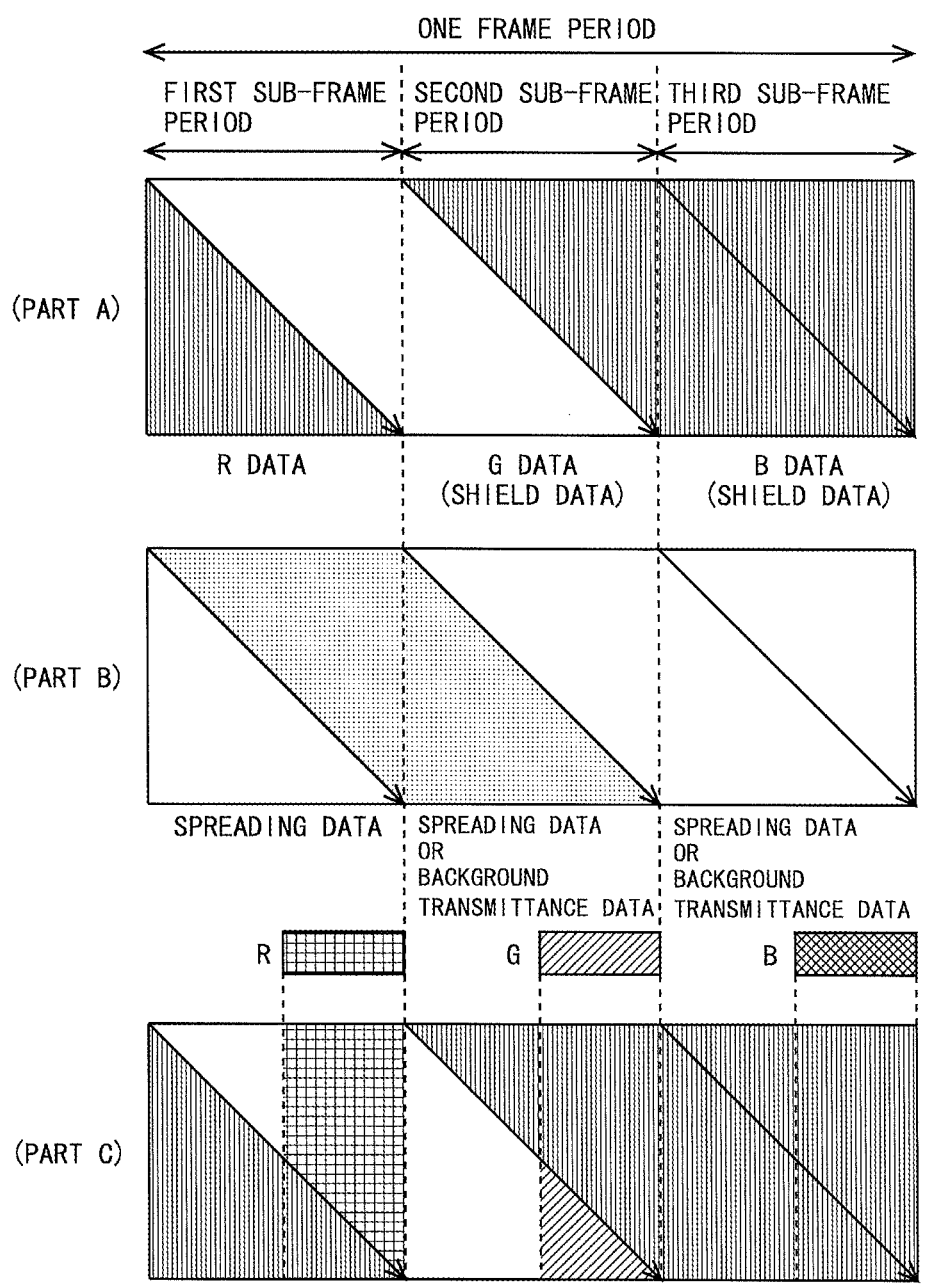
FIG. 10 is a view for explaining the operation in the case of displaying an image of a red color in the first embodiment. It should be noted that a part A shows a timing of giving red color data to the CF-less liquid crystal panel, a part B shows a timing of giving white color data to the PDLC panel, and a part C shows a lighting start time of turning on the light emitting element of each color and lighting time.

FIG. 10 is a view for explaining the operation in the case of displaying an image of a red color in the present embodiment. More specifically, the part A in FIG. 10 shows a timing of giving red color data to the CF-less liquid crystal panel 50, the part B in FIG. 10 shows a timing of giving white color data to the PDLC panel 60, and the part C in FIG. 10 shows a lighting start time of turning on the light emitting element of each color and lighting time. There are two kinds of white color data to be given to the PDLC panel 60. One is the spreading data that makes the PDLC panel 60 in the spreading state, and the other is the background transmittance data that makes the PDLC panel 60 in the transmittance state.

In the first sub-frame period, as shown in the part A in FIG. 10, from the start time, scan drive of the CF-less liquid crystal panel 50 is performed from the upper end of the screen toward the lower end of the screen, and transmittance data is sequentially given to each pixel as red color data. Moreover, as shown in the part B of FIG. 10, from the start time of the first sub-frame period, scan drive of the PDLC panel 60 is performed from the upper end of the screen toward the lower end of the screen synchronously with the CF-less liquid crystal panel 50, and spreading data is sequentially given to each pixel as white color data. Further, as shown in the part C in FIG. 10, a light emitting element 72r of a red color is turned on when a predetermined period (for example, a ½ period of the first sub-frame period) has passed after the start time of the first sub-frame period, and the light emitting element 72r of a red color is turned off at the end time of the first sub-frame period.

In the second sub-frame period, as shown in the part A in FIG. 10, from the start time, scan drive of the CF-less liquid crystal panel 50 is performed from the upper end of the screen toward the lower end of the screen, and shield data is sequentially given to each pixel as green color data. Moreover, as shown in the part B in FIG. 10, from the start time of the second sub-frame period, scan drive of the PDLC panel 60 is performed from the upper end of the screen toward the lower end of the screen synchronously with the CF-less liquid crystal panel 50, and spreading data is sequentially given to each pixel as white color data. Further, as shown in the part C in FIG. 10, the light emitting element 72g of a green color is turned on when a predetermined period (for example, a ½ period of the second sub-frame period) has passed after the start time of the second sub-frame period, and the light emitting element 72g of a green color is turned off at the end time of the second sub-frame period.

In the third sub-frame period, as shown in the part A in FIG. 10, from the start time, scan drive of the CF-less liquid crystal panel 50 is performed from the upper end of the screen toward the lower end of the screen, and shield data is sequentially given to each pixel as blue color data. Moreover, as shown in the part B in FIG. 10, from the start time of the third sub-frame period, scan drive of the PDLC panel 60 is performed from the upper end of the screen toward the lower end of the screen synchronously with the CF-less liquid crystal panel 50, and spreading data is sequentially given to each pixel as white color data. Further, as shown in the part C in FIG. 10, the light emitting element 72b of a blue color is turned on when a predetermined period (for example, a ½ period of the third sub-frame period) has passed after the start time of the third sub-frame period, and the light emitting element 72b of a blue color is turned off at the end time of the third sub-frame period.

In the manner as described above, the image of a red color is displayed on the screen. The timing of each scan drive and the lighting timing of each light emitting element are not particularly limited. Further, as shown in the part C in FIG. 10, a green color is slightly mixed in the screen lower part (the lower half portion), generating color unevenness. However, we do not see this as a problem in this case. In the case of displaying the image of a red color on the whole surface as shown in the parts A to C in FIG. 10, the PDLC panel 60 may be provided with background transmittance data in place of the spreading data in the second sub-frame period and the third sub-frame period. The spreading data may be always given to the PDLC panel 60 in each sub-frame period without synchronizing the scan drive of the PDLC panel 60 with the scan drive of the CF-less liquid crystal panel 50.

Figure 11:
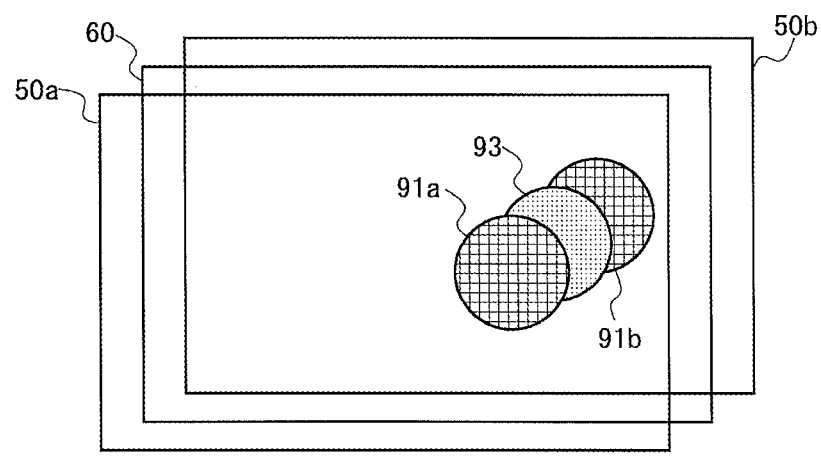
FIG. 11 is a view for explaining superposition of the front CF-less liquid crystal panel, the rear CF-less liquid crystal panel, and the PDLC panel.

FIG. 11 is a view for explaining superposition of the front CF-less liquid crystal panel 50a, the rear CF-less liquid crystal panel 50b, and the PDLC panel 60. In FIG. 11, the first light guide plate 73a is omitted from the drawing for the sake of convenience. For convenience of description, it is assumed here that images are displayed at the same positions in the front CF-less liquid crystal panel 50a and the rear CF-less liquid crystal panel 50b. When the number of pixels of the PDLC panel 60 is set equal to or larger than the number of pixels of the CF-less liquid crystal panel 50, as shown in FIG. 11, a part which is set to the spreading state in the PDLC panel 60 (hereinafter, referred to as a "spreading state part 93") can be set, in accordance with the image display part 91 in the CF-less liquid crystal panel 50 (in the drawing, the image display part in the front CF-less liquid crystal panel 50a is expressed by a reference character 91a, and the image display part in the rear CF-less liquid crystal panel 50b is expressed by a reference character 91b). In this case, in parts other than the image display part 91 of the screen, the background may be allowed to be transmitted. It should be noted that, even when the number of pixels of the PDLC panel 60 is smaller than the number of pixels of the CF-less liquid crystal panel 50, the background can be allowed to be transmitted in a part of the screen when the number of pixels of the PDLC panel 60 is plural. The pixels in the PDLC panel 60 are not necessarily required to be arranged in a matrix shape. By setting the pixel arrangement of the PDLC panel 60 according to the shape of the image to be displayed in the CF-less liquid crystal panel 50, even when the number of pixels of the PDLC panel 60 is smaller than the number of pixels of the CF-less liquid crystal panel 50, various states (the spreading state, the transmittance state, and the intermediate state) of the PDLC panel 60 can be more appropriately applied to the image display. The spreading state and the transmittance state may be switched in the whole PDLC panel 60 by adopting a configuration in which the number of pixels of the PDLC panel 60 is one. In the case where the images are displayed at mutually different positions in the front CF-less liquid crystal panel 50a and the rear CF-less liquid crystal panel 50b, there may be set the spreading state part 93 according to the image of the front CF-less liquid crystal panel 50a and the spreading state part 93 according to the image of the rear CF-less liquid crystal panel 50b.

Figure 12:
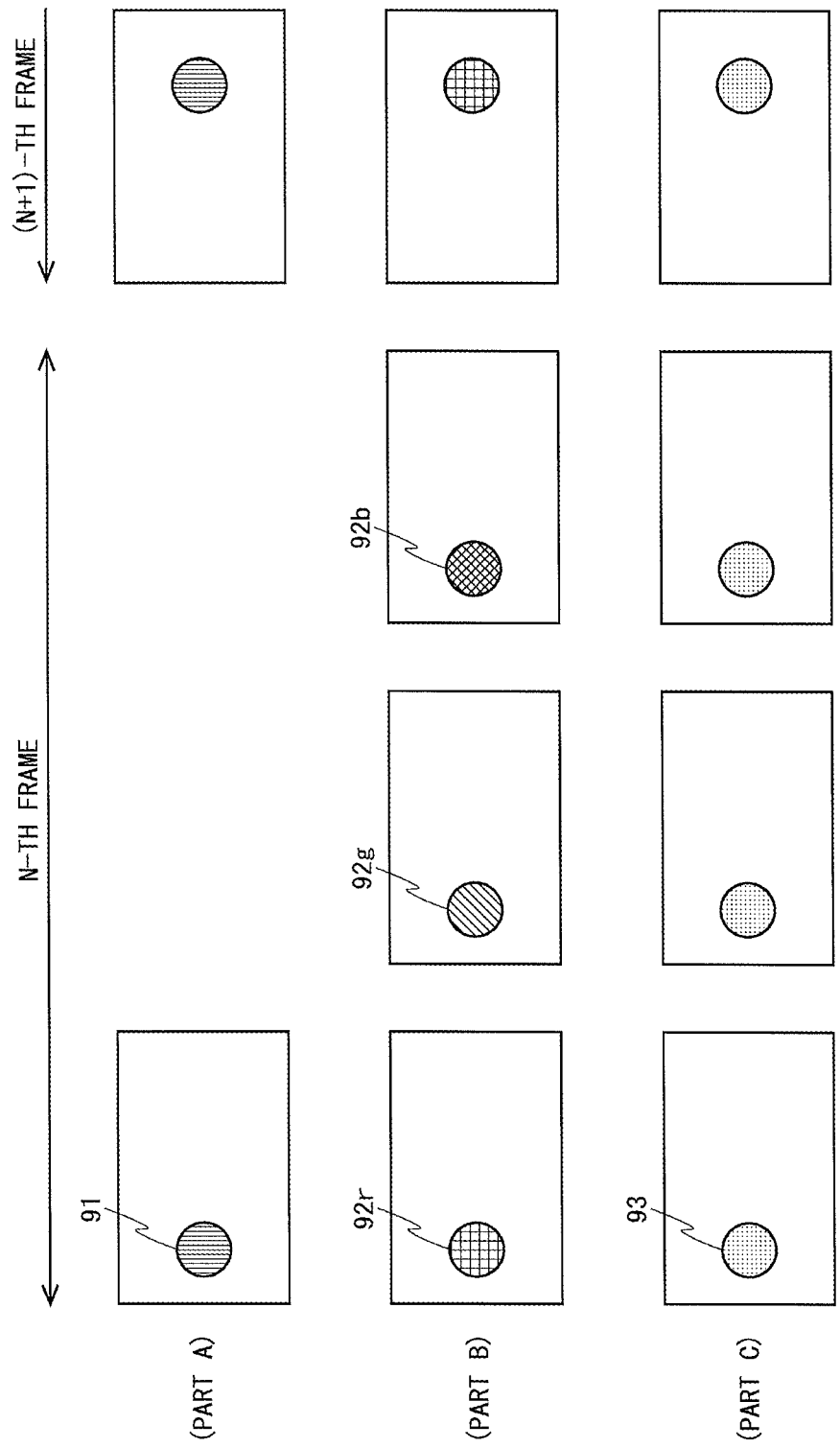
FIG. 12 is a view for explaining the operation in each sub-frame period in the first embodiment. It should be noted that the part A shows a frame image, the part B shows a sub-frame image, and the part C shows a spreading state part.

FIG. 12 is a view for explaining the operation in each sub-frame period in the present embodiment. More specifically, the part A in FIG. 12 shows a frame image, the part B in FIG. 12 shows a sub-frame image, and the part C in FIG. 12 shows a spreading state part. As shown in the parts A to C in FIG. 12, display parts 92r, 92g, and 92b of the sub-frame images of N-th frame (N is a natural number) are at the same positions as those of the image display part 91 of the frame image, and the spreading state part 93 is set by matching these parts. It should be noted that this is similarly applied to an (N+1)-th frame.

1.6 Effects

According to the present embodiment, in the FS system image display device 1, the light source light emitted by the light-guide plate light source unit 71 is applied to the PDLC panel 60 via the first light guide plate 73a. The front CF-less liquid crystal panel 50a and the rear CF-less liquid crystal panel 50b control the transmission factor of the spreading light. Therefore, images are formed independently in the front CF-less liquid crystal panel 50a and the rear CF-less liquid crystal panel 50b. Accordingly, it is possible to perform image display appropriate for observers positioned respectively at both sides sandwiching the front CF-less liquid crystal panel 50a, the rear CF-less liquid crystal panel 50b, and the PDLC panel 60 as panels contributing to image display. Further, black display can be performed by shielding the spreading light by the CF-less liquid crystal panel 50. Because the image to be displayed is formed by not the light source unit 100, but by the CF-less liquid crystal panel 50, restriction of the installation position of the light source unit 100 can be relaxed. When the PDLC panel 60 is in the transmittance state, the background light can be transmitted. By employing the FS system, color image display in high resolution and in high utilization efficiency of light can be performed.

According to the present embodiment, the PDLC panel 60 includes a plurality of PDLC display elements 61, and each of the PDLC display elements 61 can be switched between the spreading state and the transmittance state. Therefore, a part to be set to the spreading state and a part to be set to the transmittance state can be set in the PDLC panel 60 in accordance with the display position of the image. Accordingly, image display and background transmittance can be performed simultaneously.

According to the present embodiment, because the first light guide plate 73a formed into blocks is used, in the PDLC panel 60, the light source light is applied to a part that should be set to the spreading state, and the light source light is not applied to a part that should be set to the transmittance state. Therefore, it is possible to appropriately mix in one screen a part where image display is performed and a part where background transmittance is performed. Further, because the light source light can be applied to each separation area by the first light guide plate 73a formed into blocks, it is possible to perform what is called area active drive (also referred to as local dimming drive) for adjusting light intensity of the light source light in each separation area. By the area active drive like this, it is possible to suppress what is called color breakup that can easily occur at the time of switching the screen of different color components at a fast speed, like in the FS drive. Further, because the light source light can be emitted from the block in accordance with the scan directions of the CF-less liquid crystal panel 50 and the PDLC panel 60, the above color unevenness can be suppressed, as compared with the case of emitting the light source light uniformly to the whole surface of the PDLC panel 60. In this case, it is desirable to arrange the light-guide plate light source unit 71 at one end or at both ends of the first light guide plate 73a in the extension direction of the scanning line. Further, at this time, it is not necessarily required to conform the scan of the light source light to the scan direction of the PDLC panel 60. By conforming the scan of the light source light to the scan direction of the CF-less liquid crystal panel 50, the above color unevenness can be suppressed.

Further, according to the present embodiment, because the PDLC display element 61 is set to the spreading state synchronously with the CF-less liquid crystal display element 51, a part to be set to the spreading state and a part to be set to the transmittance state in the PDLC panel 60 are set following the images displayed in the CF-less liquid crystal panel 50. Therefore, in the video display and the like, the spreading light from the PDLC panel 60 can be securely applied to the CF-less liquid crystal panel 50. Accordingly, picture quality at a video displaying time and the like can be improved.

Further, according to the present embodiment, by utilizing the intermediate state of the PDLC display element 61 (the PDLC panel 60), various display can be performed.

Further, according to the present embodiment, the FS drive can be securely performed by using the signal control circuit 10 including the FS processing unit 12, the image control unit 14, the CF-less liquid crystal display element signal control unit 16, the PDLC display element signal control unit 17, and the light source signal control unit 18.

According to the present embodiment, because the display-image position assigning data Da is included in the input signal IN, it is possible to securely reflect a display position of the image intended in the generation origin of the input signal IN.

According to the present embodiment, by using the front CF-less liquid crystal timing assignment signal CTa, the rear CF-less liquid crystal timing assignment signal CTb, the PDLC timing assignment signal PT, and the light source timing assignment signal LT which are generated based on the drive timing control signal DT, it is possible to securely control the drive of each of the front CF-less liquid crystal display elements, each of the rear CF-less liquid crystal display elements, each of the PDLC display elements 61, and each of the light sources 72. By separating the timing assignment control unit 15 from the image control unit 14 and also by using the memory 13 or the register, it becomes easy to individually adjust the operation start time of each module as needed.

It should be noted that, in the present embodiment, in the case where the spreading effect to a reflection direction (referred to as a direction of reflecting the incident light) by the PDLC panel 60 is higher than the spreading effect to a transmittance direction (referred to as a direction of transmitting the incident light), the rear emission light source light of the first light guide plate 73a is effectively utilized in the front surface image display. More specifically, the front direction vertical component of the spread rear emission light source light becomes large. Therefore, luminance of the front surface image can be improved. In the case where the spreading effect to the transmittance direction by the PDLC panel 60 is higher than the spreading effect to the reflection direction, the rear emission light source light of the first light guide plate 73a is effectively utilized in the rear surface image display. More specifically, the rear direction vertical component of the spread rear emission light source light becomes large. Therefore, luminance of the rear surface image can be improved.

It should be noted that, in the above description, as an example that each of the light sources 72 controls the light intensity of each color, the mode of controlling the turn on state/turn off state for each color has been described. However, the present invention is not limited to this. For example, the configuration may be such that each of the light sources 72 control the turn on state/the turn off state for each color and also control the light intensity of the turn on state for each color. Accordingly, the white balance can be adjusted at a portion where the image is displayed. Further, the light intensity of a color which is not necessary as the image can be made small (or zero).

1.7 First Modification

Figure 13:
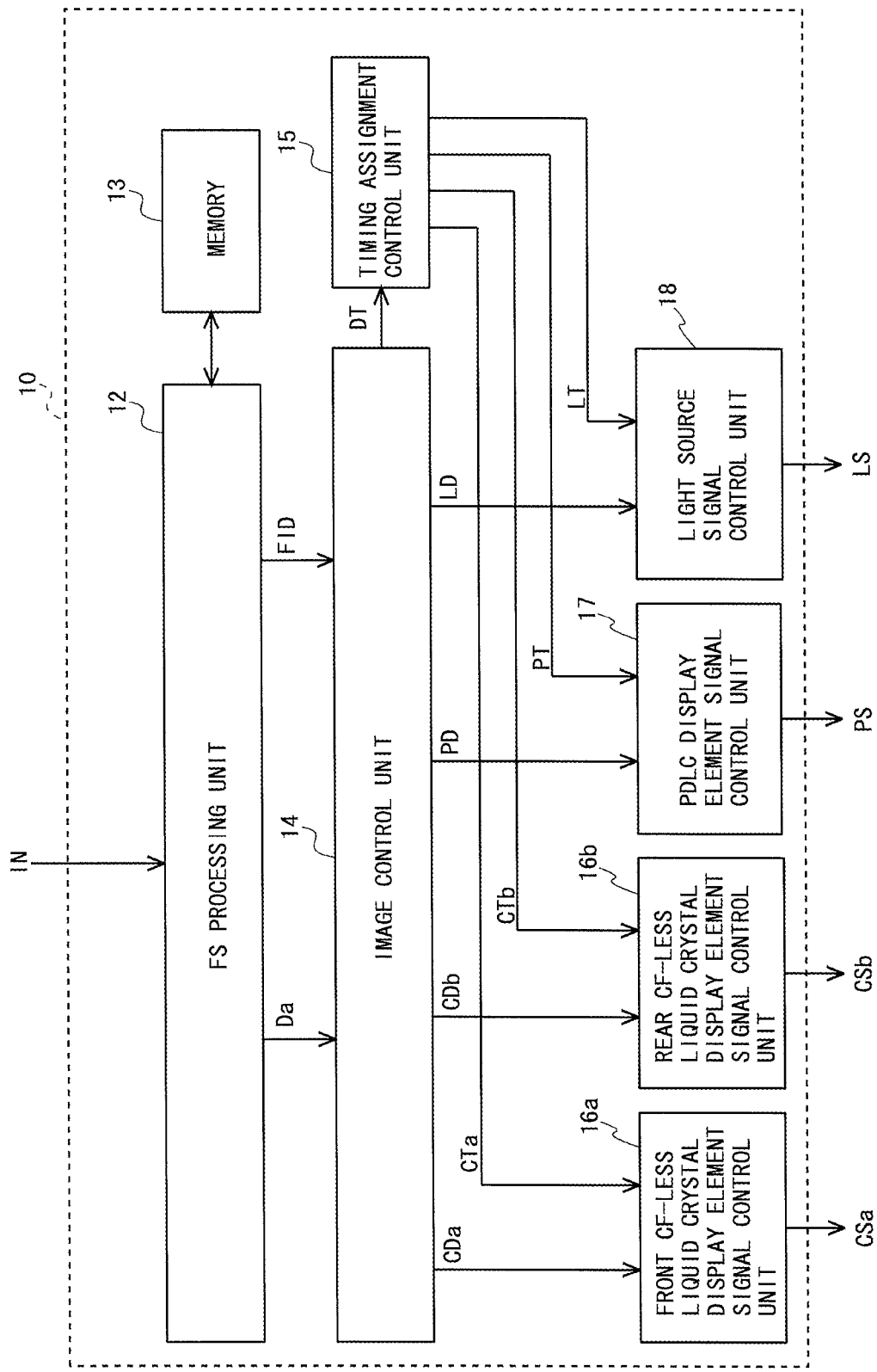
FIG. 13 is a block diagram showing a configuration of a signal processing circuit according to the first modification of the first embodiment.

FIG. 13 is a block diagram showing a configuration of the signal processing circuit 10 according to the first modification of the first embodiment. The signal processing circuit 10 according to the present modification does not include the signal separation control unit 11, unlike the signal processing circuit 10 according to the first embodiment. The FS processing unit 12 according to the present modification generates the display-image position assigning data Da and the FS image data FID based on the input signal IN, and gives them to the image control unit 14. It should be noted that the input signal IN according to the present modification includes the image data ID.

The FS processing unit 12 can perform a processing of assigning a position in the screen at which the background light is not allowed to be transmitted (hereinafter, referred to as a "first processing") by determining in real time the display position of the image by a frame interpolation processing and the like, simultaneously with the processing for performing the FS drive (such as generation of the FS image data FID), for example. Further, the FS processing unit 12 can perform a processing of assigning a position in the screen at which the background light is not allowed to be transmitted (hereinafter, referred to as a "second processing") by setting a display position of the image by using the memory 13 provided at the outside of the FS processing unit 12 or a register not shown and the like, simultaneously with the processing for performing the FS drive, for example. In this case, the memory 13 holds information showing the display position of the image.

As the first processing, there is the following processing, for example. At the time of outputting data in which three primary color signal values included in the input signal IN (the image data ID) are equal to each other (that is, data desired to be transmitted or data that does no require color display) in a certain pixel (hereinafter, referred to as a "corresponding pixel"), when each data in a certain range of the corresponding pixel is the data in which three primary color signal values are equal to each other like in the corresponding pixel, the corresponding pixel is determined as a non-display position of the image. According to the first processing, it is possible to set the display position of the image in real time, and set the state of each of the PDLC display elements 61 according to the display position without including the display-image position assigning data Da in the input signal IN. It should be noted that, in the first processing, the configuration may be such that, at the time of outputting the data in which three primary color signal values included in the input signal IN are similar to each other, when each data in a certain range of the corresponding pixel is the data in which three primary color signal values are similar to each other like the corresponding pixel, the corresponding pixel is determined as the non-display position of the image.

As for the second processing, for example, by assigning a predetermined region in the screen, as a region in which the background is not desired to be transmitted, it is possible to display the image in the predetermined region determined in advance and set the state of each PDLC display element 61 according to the position of the predetermined region, without including the display-image position assigning data Da in the input signal IN.

1.8 Second Modification

Figure 14:
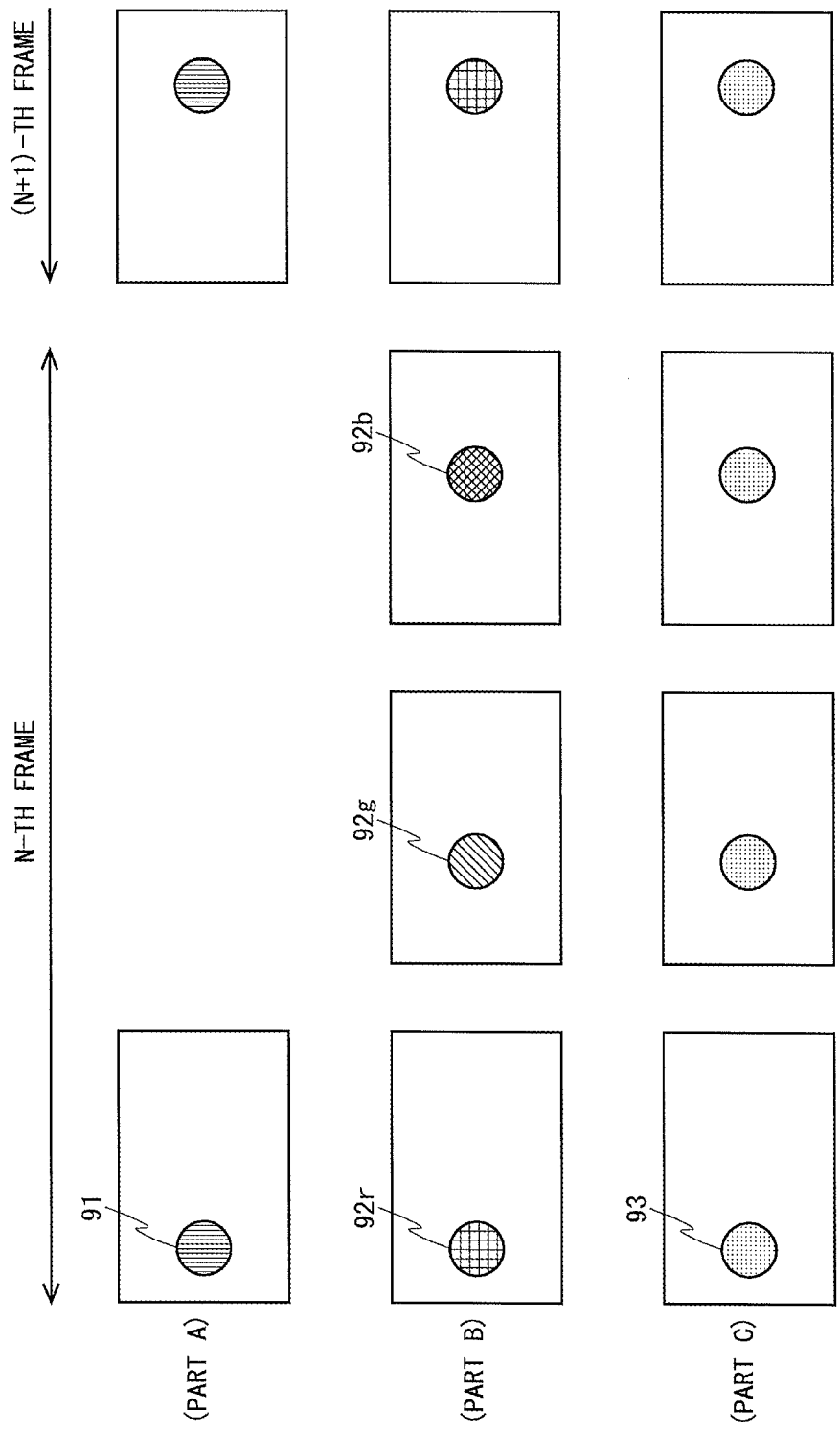
FIG. 14 is a view for explaining the operation in each sub-frame period according to the second modification of the first embodiment. It should be noted that the part A shows a frame image, the part B shows a sub-frame image, and the part C shows a spreading state part.

FIG. 14 is a view for explaining the operation in each sub-frame period according to the second modification of the first embodiment. More specifically, the part A in FIG. 14 shows a frame image, the part B in FIG. 14 shows a sub-frame image, and the part C in FIG. 14 shows a spreading state part. The FS processing unit 12 according to the present modification performs a frame interpolation processing, based on the image data ID or the input signal IN. The configuration of the signal processing circuit 10 (the FS processing unit 12) in the present modification may be any of the configuration in the first embodiment and the configuration in the first modification. However, it is desirable to employ the configuration in the first modification in which a display position of the image can be determined in real time. Hereinafter, in the present modification, description will be made on the assumption that the configuration in the first modification is employed as the configuration of the signal processing circuit 10.

The FS processing unit 12 performs frame interpolation utilizing sub-frame periods at the time of generating the FS image data FID based on the image data ID included in the input signal IN. For example, the FS processing unit 12 uses, as images for the frame interpolation, the second sub-frame image (the sub-frame image including the display part 92g) and the third sub-frame image (the sub-frame image including the display part 92b) in the N-th frame. Therefore, as shown in the part B in FIG. 14, the display parts 92r, 92g, and 92b smoothly move.

According to the present modification, because the frame interpolation utilizing the sub-frame periods is performed, smooth video display can be performed.

1.9 Third Modification

Figure 15:
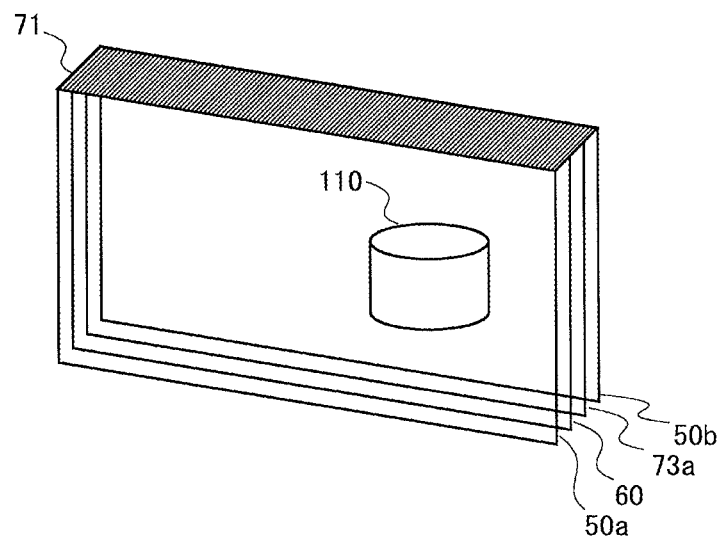
FIG. 15 is an oblique perspective view for explaining the arrangement of the front CF-less liquid crystal panel, the rear CF-less liquid crystal panel, and the first light guide plate according to the third modification of the first embodiment.

FIG. 15 is an oblique perspective view for explaining the arrangement of the front CF-less liquid crystal panel 50a, the rear CF-less liquid crystal panel 50b, and the first light guide plate 73a according to the third modification of the first embodiment. In the present modification, from a side of the front CF-less liquid crystal panel 50a, the PDLC panel 60, the first light guide plate 73a, and the rear CF-less liquid crystal panel 50b are arranged sequentially. That is, the PDLC panel 60 is positioned on the rear surface of the front CF-less liquid crystal panel 50*a*, the first light guide plate 73*a* is positioned on the rear surface of the PDLC panel 60, and the rear CF-less liquid crystal panel 50*b* is positioned on the rear surface of the first light guide plate 73*a*.

Figure 16:
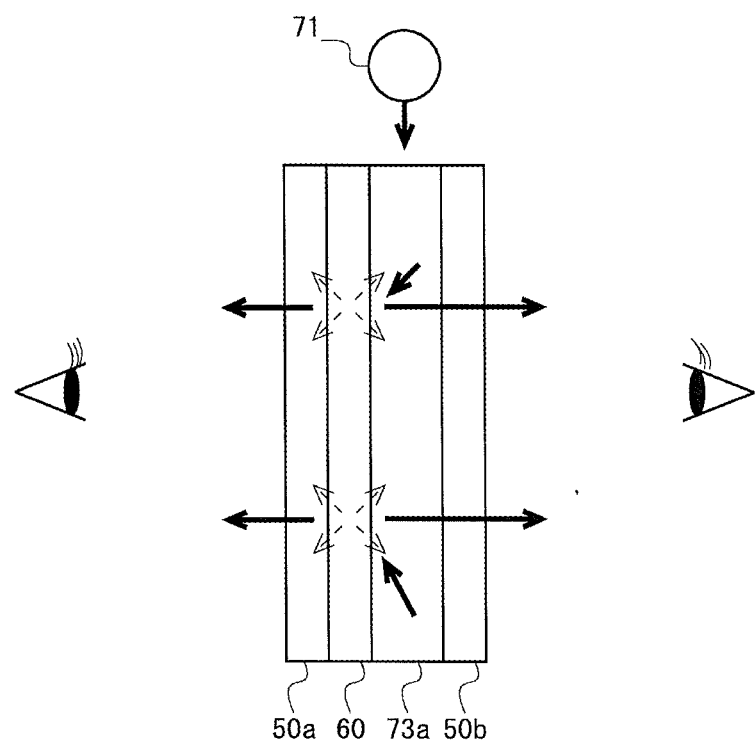
FIG. 16 is a sectional view of one pixel component of the front CF-less liquid crystal panel, the rear CF-less liquid crystal panel, the PDLC panel, and the first light guide plate shown in FIG. 15.

FIG. 16 is a sectional view of one pixel component of the front CF-less liquid crystal panel 50*a*, the rear CF-less liquid crystal panel 50*b*, the PDLC panel 60, and the first light guide plate 73*a* shown in FIG. 15. At the image displaying time, a voltage is not applied to the PDLC display element 61, and the PDLC display element 61 is in the spreading state. At this time, the light source light emitted by the light-guide plate light source unit 71 is guided by the first light guide plate 73*a*, and is emitted to respective focused separation areas of the PDLC panel 60 and the rear CF-less liquid crystal panel 50*b*. More specifically, the light source light is emitted from the light-guide plate light source unit 71 to the focused block. The light source light guided by the focused block is emitted to the respective focused separation areas of the PDLC panel 60 and the rear CF-less liquid crystal panel 50*b*. Therefore, the light source light incident on the PDLC display element 61 is spread. The front direction vertical component of the spread light source light is emitted to the front CF-less liquid crystal display element 51*a*. Further, the rear direction vertical component of the spread light source light is transmitted through the first light guide plate 73*a*, and is emitted to the rear CF-less liquid crystal display element 51*b*.

In this way, at the image displaying time, the light irradiating unit 90 including the PDLC panel 60 and the backlight unit 70 applies light including the front direction vertical component of the spread front emission light source light to the front CF-less liquid crystal panel 50*a* (the front CF-less liquid crystal display element), and applies light including the rear emission light source light and the rear direction vertical component of the spread front emission light source light to the rear CF-less liquid crystal panel 50*b* (the rear CF-less liquid crystal display element).

At the whole surface non-displaying time, a voltage is applied to the PDLC display element 61, and the PDLC display element 61 is in the transmittance state. Further, from the light-guide plate light source unit 71, the light source light is not emitted to any block of the first light guide plate 73*a*. Therefore, the background light from the rear surface side which has been transmitted through the rear CF-less liquid crystal display element, the first light guide plate 73*a*, and the PDLC display element 61 is applied to the front CF-less liquid crystal display element. Further, background light from the front surface side which has been transmitted through the front CF-less liquid crystal display element, the PDLC display element 61, and the first light guide plate 73*a* is applied to the rear CF-less liquid crystal display element. Accordingly, the background is transmitted at both the front surface side and the rear surface side.

At the partially non-displaying time, the PDLC display element 61 is in the transmittance state in a similar manner to that at the whole surface non-displaying time. On the other hand, unlike at the whole surface non-displaying time, the light source light is not emitted from the light-guide plate light source unit 71 to the focused block, and the light source light is emitted from the light-guide plate light source unit 71 to other blocks. In this way, to the front CF-less liquid crystal display element in the separation area in which image display is not performed, the background light from the rear surface side which has been transmitted through the rear CF-less liquid crystal display element, the first light guide plate 73*a*, and the PDLC display element 61 is applied. To the front CF-less liquid crystal display element in the separation area in which image display is performed, light including a front direction vertical component of the spread front emission light source light is applied. To the rear CF-less liquid crystal display element in the separation area in which image display is not performed, the background light from the front surface side which has been transmitted through the front CF-less liquid crystal display element, the PDLC display element 61, and the first light guide plate 73*a* is applied. To the rear CF-less liquid crystal display element in the separation area in which image display is performed, light including the rear emission light source light and the rear direction vertical component of the spread front emission light source light is applied. Therefore, it is possible to simultaneously perform image display and background transmittance, and also appropriately mix in one screen a part where image display is performed and a part where background transmittance is performed.

In the present modification, from a side of the front CF-less liquid crystal panel 50*a*, the PDLC panel 60, the first light guide plate 73*a*, and the rear CF-less liquid crystal panel 50*b* are sequentially arranged. Thus, effects similar to those in the first embodiment can be obtained.

It should be noted that, in the present embodiment, in the case where the spreading effect to the reflection direction by the PDLC panel 60 is higher than the spreading effect to the transmittance direction, the front emission light source light of the first light guide plate 73*a* is effectively utilized in the rear surface image display. More specifically, the rear direction vertical component of the spread front emission light source light becomes large. Therefore, luminance of the rear surface image can be improved. In the case where the spreading effect to the transmittance direction by the PDLC panel 60 is higher than the spreading effect to the spread direction, the front emission light source light of the first light guide plate 73*a* is effectively utilized in the front surface image display. More specifically, the front direction vertical component of the spread front emission light source light becomes large. Therefore, luminance of the front surface image can be improved.

1.10 Fourth Modification

Figure 17:
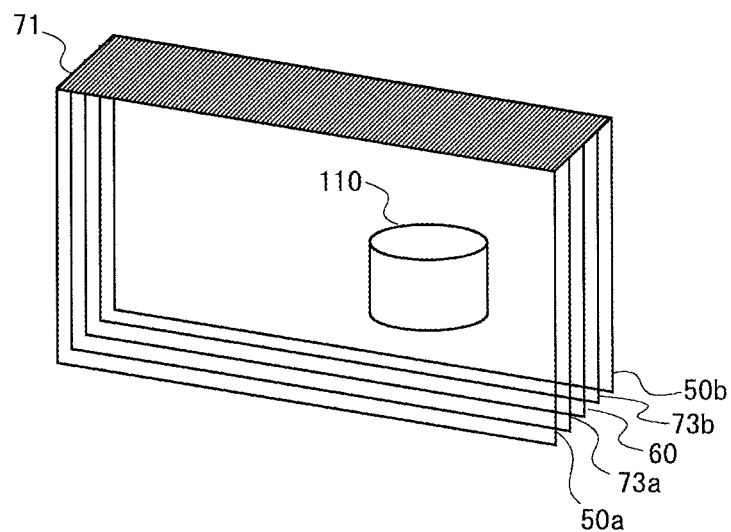
FIG. 17 is an oblique perspective view for explaining the arrangement of the front CF-less liquid crystal panel, the rear CF-less liquid crystal panel, the PDLC panel, and the first and second light guide plates according to the fourth modification of the first embodiment.

FIG. 17 is an oblique perspective view for explaining the arrangement of the front CF-less liquid crystal panel 50*a*, the rear CF-less liquid crystal panel 50*b*, the PDLC panel 60, and the first and second light guide plates 73*a* and 73*b*. Properties of the first and second light guide plates 73*a* and 73*b* may be mutually the same or mutually different. However, the transmission factor of the second light guide plate 73*b* is set relatively high, similarly to the transmission factor of the first light guide plate 73*a*. Further, the second light guide plate 73*b* is formed into a plurality of blocks arrayed in one row, in a similar manner to that of the first light guide plate 73*a*. In the following, for convenience of description, similarly to the first light guide plate 73*a*, the light source light emitted to the rear surface side of the second light guide plate 73*b* will be also referred to as "rear emission light source light", and the light source light emitted to the front surface side of the second light guide plate 73*b* will be also referred to as "front emission light source light". In the present modification, from a side of the front CF-less liquid crystal panel 50*a*, the first light guide plate 73*a*, PDLC panel 60, the second light guide plate 73*b*, and the rear CF-less liquid crystal panel 50*b* are sequentially arranged. That is, the first light guide plate 73*a* is positioned on the rear surface of the front CF-less liquid crystal panel 50*a*, the PDLC panel 60 is positioned on the rear surface of the first light guide plate 73a, the second light guide plate 73b is positioned on the rear surface of the PDLC panel 60, and the rear CF-less liquid crystal panel 50b is positioned on the rear surface of the second light guide plate 73b.

Figure 18:
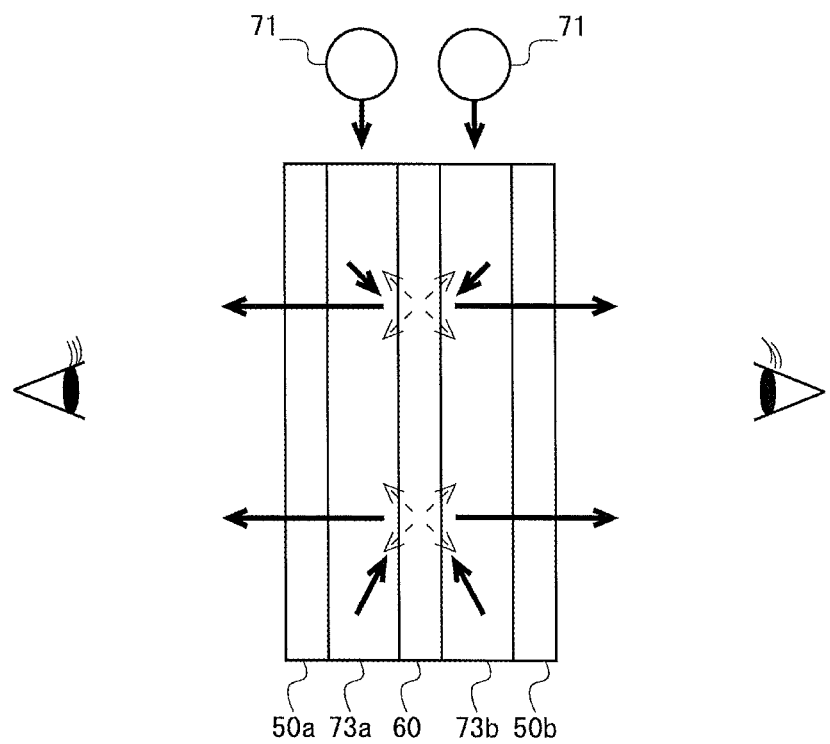
FIG. 18 is a sectional view of one pixel component of the front CF-less liquid crystal panel, the rear CF-less liquid crystal panel, the PDLC panel, and the first and second light guide plates shown in FIG. 17.

FIG. 18 is a sectional view of one pixel component of the front CF-less liquid crystal panel 50a, the rear CF-less liquid crystal panel 50b, the PDLC panel 60, and the first and second light guide plates 73a and 73b shown in FIG. 17. At the image displaying time, a voltage is not applied to the PDLC display element 61, and the PDLC display element 61 is in the spreading state. At this time, the light source light emitted by the light-guide plate light source unit 71 is guided by the first and second light guide plates 73a and 73b, and is emitted to respective focused separation areas of the CF-less liquid crystal panel 50 and the PDLC panel 60. More specifically, the light source light is emitted from the light-guide plate light source unit 71 to the focused blocks of the first and second light guide plates 73a and 73b. The light source light guided by the first light guide plate 73a is emitted to respective focused separation areas of the front CF-less liquid crystal panel 50a and the PDLC panel 60. The light source light guided by the second light guide plate 73b is emitted to respective focused separation areas of the rear CF-less liquid crystal panel 50b and the PDLC panel 60. Therefore, the light source light incident on the PDLC display element 61 is spread. The front direction vertical component of the spread light source light is transmitted through the first light guide plate 73a, and is emitted to the front CF-less liquid crystal display element 51a. The rear direction vertical component of the spread light source light is transmitted through the second light guide plate 73b, and is emitted to the rear CF-less liquid crystal display element 51b.

In this way, at the image displaying time, the light irradiating unit 90 including the PDLC panel 60 and the backlight unit 70 applies light including the front emission light source light of the first light guide plate 73a and the front direction vertical component of the spread rear emission light source light of the first light guide plate 73a to the front CF-less liquid crystal panel 50a (the front CF-less liquid crystal display element), and applies light including the rear emission light source light of the second light guide plate 73b and the rear direction vertical component of the spread front emission light source light of the second light guide plate 73b to the rear CF-less liquid crystal panel 50b (the rear CF-less liquid crystal display element).

At the whole surface non-displaying time, a voltage is applied to the PDLC display element 61, and the PDLC display element 61 is in the transmittance state. Further, from the light-guide plate light source unit 71, the light source light is not emitted to any block of the first light guide plate 73a and any block of the second light guide plate 73b. Therefore, the background light from the rear surface side which has been transmitted through the rear CF-less liquid crystal display element, the second light guide plate 73a, the PDLC display element 61, and the first light guide plate 73a is applied to the front CF-less liquid crystal display element. Further, to the rear CF-less liquid crystal display element, background light from the front surface side which has been transmitted through the front CF-less liquid crystal display element, the first light guide plate 73a, the PDLC display element 61, and the second light guide plate 73b is applied. Accordingly, the background is transmitted both at the front surface side and the rear surface side.

At the partially non-displaying time, the PDLC display element 61 is in the transmittance state in a similar manner to that at the whole surface non-displaying time. On the other hand, unlike at the whole surface non-displaying time, the light source light is not emitted from the light-guide plate light source unit 71 to the focused block, and the light source light is emitted from the light-guide plate light source unit 71 to other blocks. In this way, to the front CF-less liquid crystal display element in the separation area in which image display is not performed, the background light from the rear surface side which has been transmitted through the rear CF-less liquid crystal display element, the second light guide plate 73b, the PDLC display element 61, and the first light guide plate 73a is applied. To the front CF-less liquid crystal display element in the separation area in which image display is performed, light including the front emission light source light of the first light guide plate 73a and a front direction vertical component of the spread rear emission light source light of the first light guide plate 73a is applied. To the rear CF-less liquid crystal display element in the separation area in which image display is not performed, the background light from the front surface side which has been transmitted through the front CF-less liquid crystal display element, the first light guide plate 73a, the PDLC display element 61, and the second light guide plate 73b is applied. To the rear CF-less liquid crystal display element in the separation area in which image display is performed, light including the rear emission light source light of the second light guide plate 73b, and a rear direction vertical component of the spread front emission light source light of the second light guide plate 73b is applied. Therefore, it is possible to simultaneously perform image display and background transmittance, and also appropriately mix in one screen a part where image display is performed and a part where background transmittance is performed.

In the present modification, from a side of the front CF-less liquid crystal panel 50a, the first light guide plate 73a, PDLC panel 60, the second light guide plate 73b, and the rear CF-less liquid crystal panel 50b are sequentially arranged. Thus, effects similar to those in the first embodiment can be obtained. Further, according to the present modification, the rear emission light source light and the front emission light source light emitted from the first and second light guide plates 73a and 73b, respectively, are spread by the PDLC panel 60. The front direction vertical component of the rear emission light source light is applied to the front CF-less liquid crystal panel 50a, and the rear direction vertical component of the front emission light source light is applied to the rear CF-less liquid crystal panel 50b. Therefore, luminance of the display image can be improved, regardless of a high-and-low relation of the spreading effect to the reflection direction and the spreading effect to the transmittance direction by the PDLC panel 60.

2. Second Embodiment 2.1 Arrangement of Panel and Light Source Unit

Figure 19:
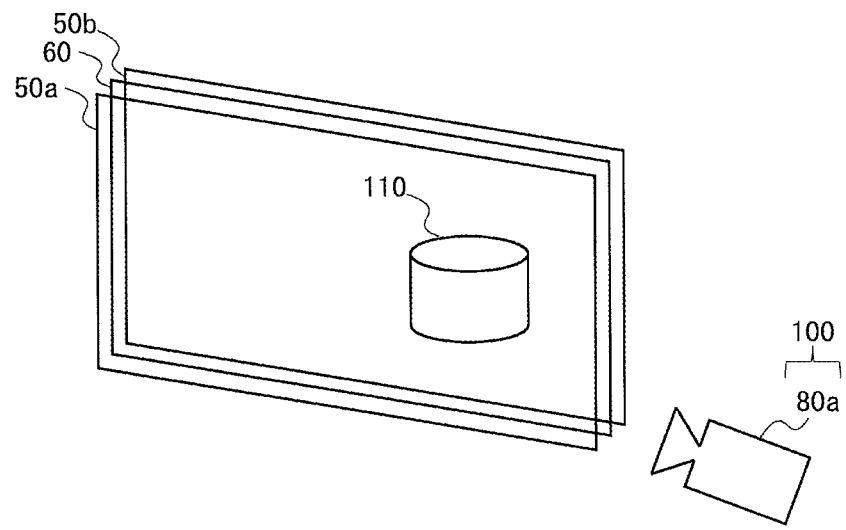
FIG. 19 is an oblique perspective view for explaining the arrangement of the front CF-less liquid crystal panel, the rear CF-less liquid crystal panel, the PDLC panel, and the PDLC light source unit according to the second embodiment of the present invention.

FIG. 19 is an oblique perspective view for explaining the arrangement of the front CF-less liquid crystal panel 50a, the rear CF-less liquid crystal panel 50b, the PDLC panel 60, and the first PDLC light source unit 80a according to the second embodiment of the present invention. Out of the components of the present embodiment, the same elements as those in the first embodiment will be attached with the same reference characters and their description will be suitably omitted. In the present embodiment, the PDLC panel 60 and the first PDLC light source unit 80a constitute the light irradiating unit 90. In the present embodiment, the first PDLC light source unit 80a constitutes the light source unit 100. The first PDLC light source unit 80a corresponds to a first second-display panel light source unit. As shown in FIG. 19, from a side of the front CF-less liquid crystal panel 50a side, the PDLC panel 60 and the rear CF-less liquid crystal panel 50b are sequentially arranged. That is, the PDLC panel 60 is positioned on the rear surface of the front CF-less liquid crystal panel 50a, and the rear CF-less liquid crystal panel 50b is positioned on the rear surface of the PDLC panel 60. It should be noted that the first PDLC light source unit 80a may be positioned at any of the upper end side (the upper side of the paper surface), the lower end side (the lower side of the paper surface), the left end side (the left side of the paper surface), and the right end side (the right side of the paper surface) of the CF-less liquid crystal panel 50 and the PDLC panel 60, or may be positioned at a plurality of or all end surfaces.

Figure 20:
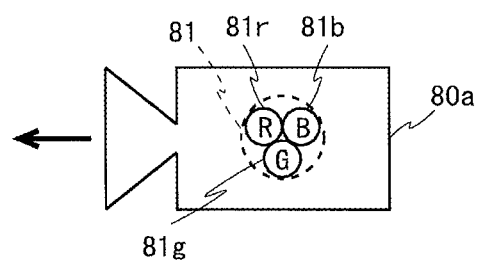
FIG. 20 is a view showing a configuration of the PDLC light source unit shown in FIG. 19.

FIG. 20 is a view showing a configuration of the first PDLC light source unit 80a shown in FIG. 19. The first PDLC light source unit 80a includes a plurality of light sources 81 each including one light emitting element 81r, one light emitting element 81g, and one light emitting element 81b that have a red color, a green color, and a blue color, respectively. The configuration of the light source 81 is basically similar to the configuration of the light source 72, and can be variously changed. The first PDLC light source unit 80a may be in the configuration having devices such as a DMD and an LCOS, and a lens and a color wheel added to various light emitting elements, like a projector. It is desirable that the first PDLC light source unit 80a has directivity at a level at which the light source light can be applied to a part of the PDLC panel 60. However, the first PDLC light source unit 80a may not have such directivity. The first PDLC light source unit 80a is driven by the light source drive circuit 40, in a similar manner to that of the backlight unit 70 in the first embodiment. It should be noted that the information that the memory 13 holds in the present embodiment is a spread amount of light to be applied to each of the PDLC display elements 61, or a focal distance of the first PDLC light source unit 80a (the light source unit 100) and the like. Such information is used when the FS processing unit 12 generates the FS image data FID.

Figure 21:
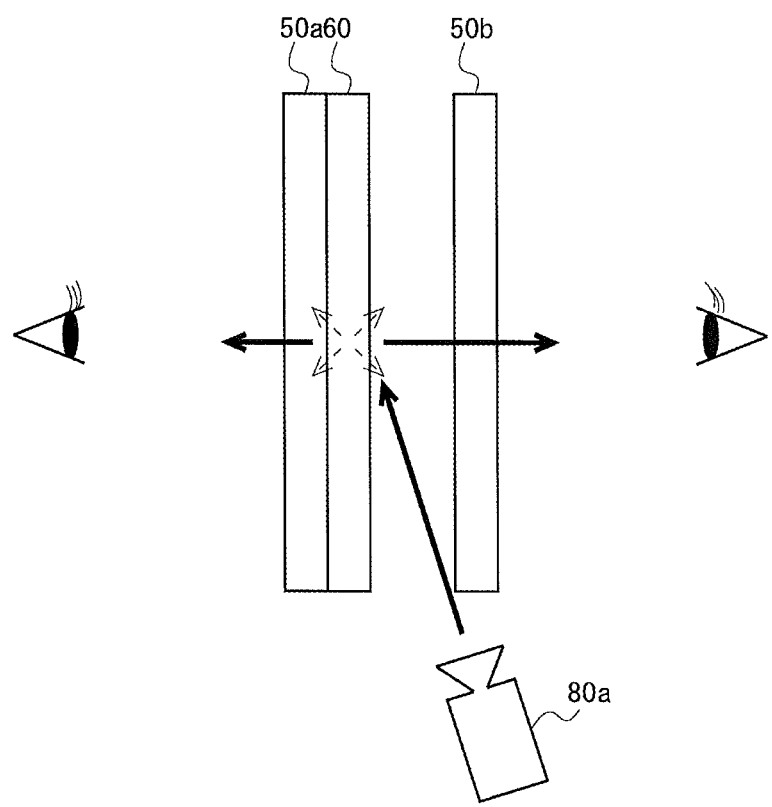
FIG. 21 is a sectional view of one pixel component of the front CF-less liquid crystal panel, the rear CF-less liquid crystal panel, and the PDLC panel shown in FIG. 19.

FIG. 21 is a sectional view of one pixel component of the front CF-less liquid crystal panel 50a, the rear CF-less liquid crystal panel 50b, and the PDLC panel 60 shown in FIG. 19. As shown in FIG. 21, the first PDLC light source unit 80a according to the present embodiment applies the light source light to the rear surface (one main surface) of the PDLC panel 60. Because the rear CF-less liquid crystal panel 50b is positioned on the rear surface side of the PDLC panel 60, in order to make the light source light incident on the rear surface of the PDLC panel 60, it is desirable to provide an air layer and the like between the PDLC panel 60 and the rear CF-less liquid crystal panel 50b.

At the image displaying time, a voltage is not applied to the PDLC display element 61, and the PDLC display element 61 is in the spreading state. At this time, the first PDLC light source unit 80a applies the light source light to the focused separation area of the PDLC panel 60. Therefore, the light source light incident on the PDLC display element 61 is spread. The front direction vertical component of the spread light source light is emitted to the front CF-less liquid crystal panel 50a, and the rear direction vertical component of the spread light source light is emitted to the rear CF-less liquid crystal panel 50b. In this way, at the image displaying time, the light irradiating unit 90 including the PDLC panel 60 and the first PDLC light source unit 80a applies the light including the front direction vertical component of the spread light source light to the front CF-less liquid crystal panel 50a (the front CF-less liquid crystal display element), and applies the light including the rear direction vertical component of the spread light source light to the rear CF-less liquid crystal panel 50b (the rear CF-less liquid crystal display element).

At the whole surface non-displaying time, a voltage is applied to the PDLC display element 61, and the PDLC display element 61 is in the transmittance state. Further, light source light is not applied from the first PDLC light source unit 80a to any separation area of the PDLC panel 60. Accordingly, the background light from the rear surface side which has been transmitted through the rear CF-less liquid crystal display element and the PDLC display element 61 is applied to the front CF-less liquid crystal display element. Further, to the rear CF-less liquid crystal display element, background light from the front surface side which has been transmitted through the front CF-less liquid crystal display element and the PDLC display element 61 is applied.

At the partially non-displaying time, the PDLC display element 61 is in the transmittance state in a similar manner to that at the whole surface non-displaying time. On the other hand, unlike at the whole surface non-displaying time, the light source light is not emitted from the first PDLC light source unit 80a to the focused separation area, and the light source light is emitted from the first PDLC light source unit 80a to other separation areas. In this way, to the front CF-less liquid crystal display element in the separation area in which image display is not performed, the background light from the rear surface side which has been transmitted through the rear CF-less liquid crystal display element and the PDLC display element 61 is applied. To the front CF-less liquid crystal display element in the separation area in which image display is performed, light including the front direction vertical component of the spread light source light is applied. To the rear CF-less liquid crystal display element in the separation area in which image display is not performed, the background light from the front surface side which has been transmitted through the front CF-less liquid crystal display element and the PDLC display element 61 is applied. To the rear CF-less liquid crystal display element in the separation area in which image display is performed, light including the rear direction vertical component of the spread light source light is applied. Therefore, it is possible to simultaneously perform image display and background transmittance, and also appropriately mix in one screen a part where image display is performed and a part where background transmittance is performed. However, in the case where the first PDLC light source unit 80a does not have directivity at a level at which light can be applied to a part of the PDLC panel 60, applying light for each separation area is not performed, but the light source light is applied to the whole surface of the PDLC panel 60, for example.

2.2 Effects

According to the present embodiment, the PDLC panel 60 in the spreading state spreads the light source light emitted by the first PDLC light source unit 80a. The front CF-less liquid crystal panel 50a and the rear CF-less liquid crystal panel 50b control the transmission factor of the spreading light. As a result, images are formed independently in the front CF-less liquid crystal panel 50a and the rear CF-less liquid crystal panel 50b. In this way, effects similar to those in the first embodiment can be obtained.

According to the present embodiment, in the case where the first PDLC light source unit 80*a* has directivity at a level at which light can be applied to a part of the PDLC panel 60 as described above, it is possible to arrange such that the light source light is applied to a part that should be set to the spreading state and the light source light is not applied to a part that should be set to the transmittance state in the PDLC panel 60. Therefore, it is possible to appropriately mix in one screen a part where image display is performed and a part where background transmittance is performed. Further, because the light source light can be applied for each separation area by the first PDLC light source unit 80*a*, it is possible to perform the area active drive in a similar manner to that in the first embodiment. By the area active drive like this, it is possible to suppress what is called color breakup that can easily occur at the time of switching the screen having different color components at a fast speed, like in the FS drive. Further, because the light source light can be emitted from the block in accordance with the scan directions of the CF-less liquid crystal panel 50 and the PDLC panel 60, the above color unevenness can be suppressed, as compared with the case of emitting the light source light uniformly to the whole surface of the PDLC panel 60. At this time, it is not necessarily required to conform the scan of the light source light to the scan direction of the PDLC panel 60. By conforming the scan of the light source light to the scan direction of the CF-less liquid crystal panel 50, the above color unevenness can be suppressed.

In the case where the spreading effect to the reflection direction by the PDLC panel 60 is higher than the spreading effect to the transmittance direction, the spread light source light is effectively utilized in the rear surface image display. More specifically, the rear direction vertical component of the spread light source light becomes large. Therefore, luminance of the rear surface image can be improved. In the case where the spreading effect to the transmittance direction by the PDLC panel 60 is higher than the spreading effect to the reflection direction, the spread light source light is effectively utilized in the front surface image display. More specifically, the front direction vertical component of the spread light source light becomes large. Therefore, luminance of the front surface image can be improved.

2.3 First Modification

Figure 22:
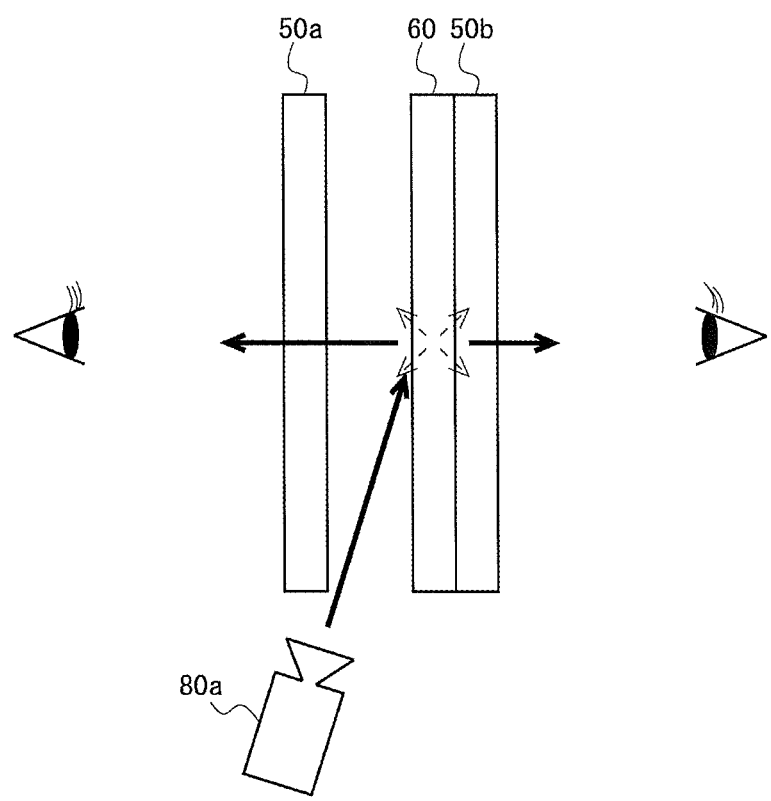
FIG. 22 is a sectional view of one pixel component of the front CF-less liquid crystal panel, the rear CF-less liquid crystal panel, and the PDLC panel according to a first modification of the second embodiment.

FIG. 22 is a sectional view of one pixel component of the front CF-less liquid crystal panel 50*a*, the rear CF-less liquid crystal panel 50*b*, and the PDLC panel 60 according to the first modification of the second embodiment. As shown in FIG. 22, the first PDLC light source unit 80*a* according to the present modification applies the light source light to the front surface (one main surface) of the PDLC panel 60. Because the front CF-less liquid crystal panel 50*a* is positioned on the front surface side of the PDLC panel 60, in order to make the light source light incident on the front surface of the PDLC panel 60, it is desirable to provide an air layer and the like between the PDLC panel 60 and the front CF-less liquid crystal panel 50*a*.

According to the present embodiment, by applying the light source light to the front surface of the PDLC panel 60, effects similar to those in the second embodiment can be obtained. It should be noted that, in the case where the spreading effect to the reflection direction by the PDLC panel 60 is higher than the spreading effect to the transmittance direction, the spread light source light is effectively utilized in the front surface image display. More specifically, the front direction vertical component of the spread light source light becomes large. Therefore, luminance of the front surface image can be improved. In the case where the spreading effect to the transmittance direction by the PDLC panel 60 is higher than the spreading effect to the reflection direction, the spread light source light is effectively utilized in the rear surface image display. More specifically, the rear direction vertical component of the spread light source light becomes large. Therefore, luminance of the rear surface image can be improved.

2.4 Second Modification

Figure 23:
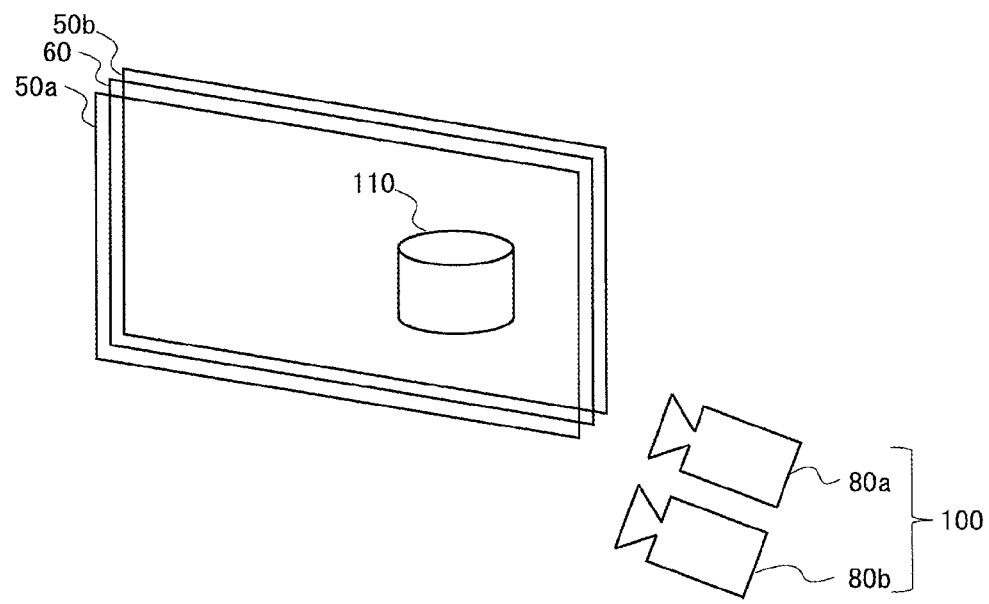
FIG. 23 is an oblique perspective view for explaining the arrangement of the front CF-less liquid crystal panel, the rear CF-less liquid crystal panel, the PDLC panel, and the first and second PDLC light source units according to the second modification of the second embodiment.

FIG. 23 is an oblique perspective view for explaining the arrangement of the front CF-less liquid crystal panel 50*a*, the rear CF-less liquid crystal panel 50*b*, the PDLC panel 60, and the first and second PDLC light source units 80*a* and 80*b* according to the second modification of the second embodiment. The present modification is the addition of the second PDLC light source unit 80*b* to the second embodiment. The second PDLC light source unit 80*b* has a configuration similar to that of the first PDLC light source unit 80*a*. The second PDLC light source unit 80*b* corresponds to a second second-display panel light source unit. In the present embodiment, the first and second PDLC light source units 80*a* and 80*b* constitute the light source unit 100.

Figure 24:
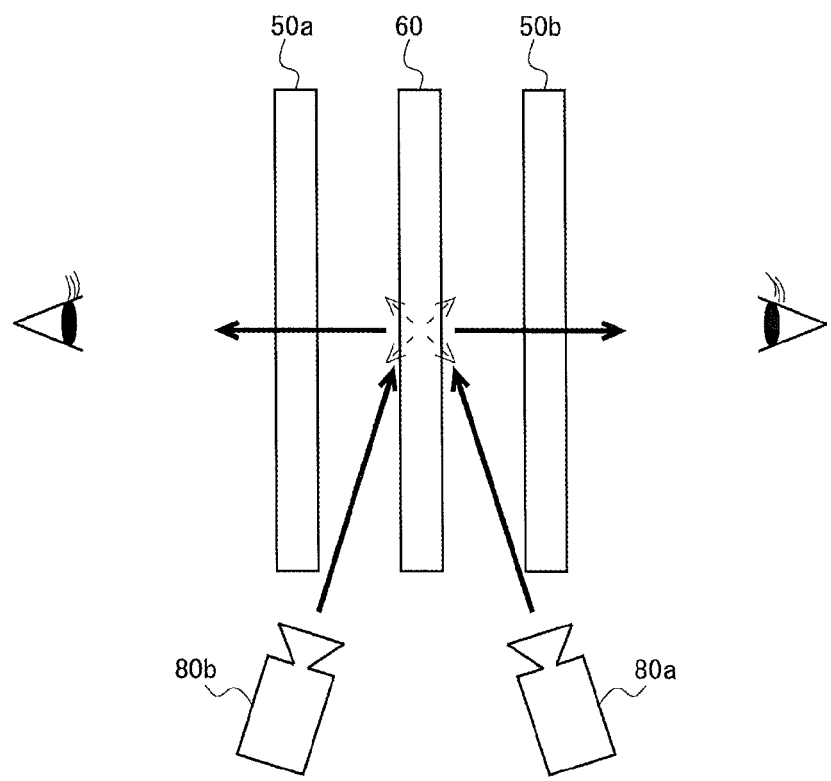
FIG. 24 is a sectional view of one pixel component of the front CF-less liquid crystal panel, the rear CF-less liquid crystal panel, and the PDLC panel shown in FIG. 23.

FIG. 24 is a sectional view of one pixel component of the front CF-less liquid crystal panel 50*a*, the rear CF-less liquid crystal panel 50*b*, and the PDLC panel 60 shown in FIG. 23. As shown in FIG. 24, the first and second PDLC light source units 80*a* and 80*b* apply the light source light to the rear surface and the front surface (both main surfaces) of the PDLC panel 60, respectively. In order to make the light source light of the first PDLC light source unit 80*a* incident on the rear surface of the PDLC panel 60, it is desirable to provide an air layer and the like between the PDLC panel 60 and the rear CF-less liquid crystal panel 50*b*. Similarly, in order to make the light source light of the second PDLC light source unit 80*b* incident on the front surface of the PDLC panel 60, it is desirable to provide an air layer and the like between the PDLC panel 60 and the front CF-less liquid crystal panel 50*a*.

According to the present modification, because the light source light is applied to both the front surface and the rear surface of the PDLC panel 60, luminance of the display image can be improved, regardless of a high-and-low relation of the spreading effect to the reflection direction and the spreading effect to the transmittance direction by the PDLC panel 60.

3. Third Embodiment

3.1 Arrangement of Panel, Light Source Unit, and Light Guide Plate

Figure 25:
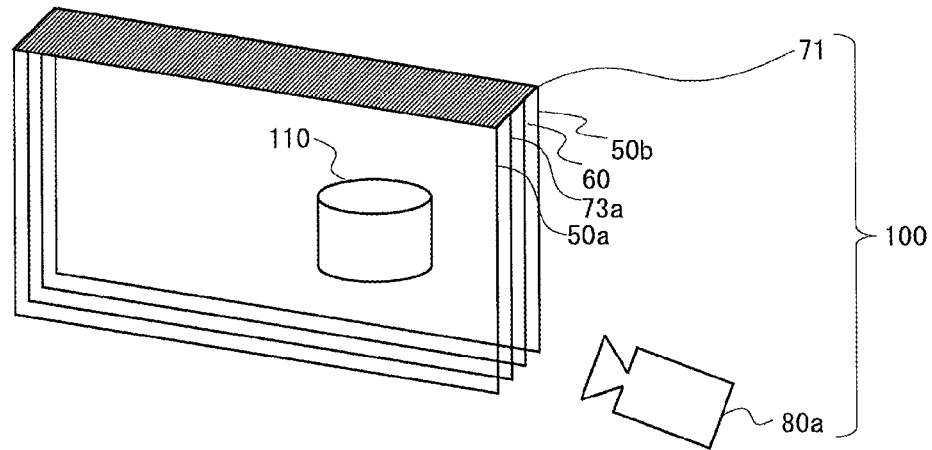
FIG. 25 is an oblique perspective view for explaining the arrangement of the front CF-less liquid crystal panel, the rear CF-less liquid crystal panel, the PDLC panel, the PDLC light source unit, and the first light guide plate according to the third embodiment of the present invention.

FIG. 25 is an oblique perspective view for explaining the arrangement of the front CF-less liquid crystal panel 50*a*, the rear CF-less liquid crystal panel 50*b*, the PDLC panel 60, the first PDLC light source unit 80*a*, and the first light guide plate 73*a* according to the third embodiment of the present invention. Out of the components of the present embodiment, the same elements as those in the first embodiment or the second embodiment will be attached with the same reference characters and their description will be suitably omitted. According to the present embodiment, the first PDLC light source unit 80*a* in the second embodiment is also used in order to improve luminance of a part for performing the image display, in the first embodiment. The arrangement of the front CF-less liquid crystal panel 50*a*, the rear CF-less liquid crystal panel 50*b*, the PDLC panel 60, the first light guide plate 73*a*, and the light-guide plate light source unit 71 according to the present embodiment is similar to that in the first embodiment. Further, the arrangement of the first PDLC light source unit 80*a* in the present embodiment is similar to that in the second embodiment. In the present embodiment, the first PDLC light source unit 80*a* and the light-guide plate light source unit 71 configure the light source unit 100. The first PDLC light source unit 80*a* and the light-guide plate light source unit 71 are synchronously driven by the light source drive circuit 40.

Figure 26:
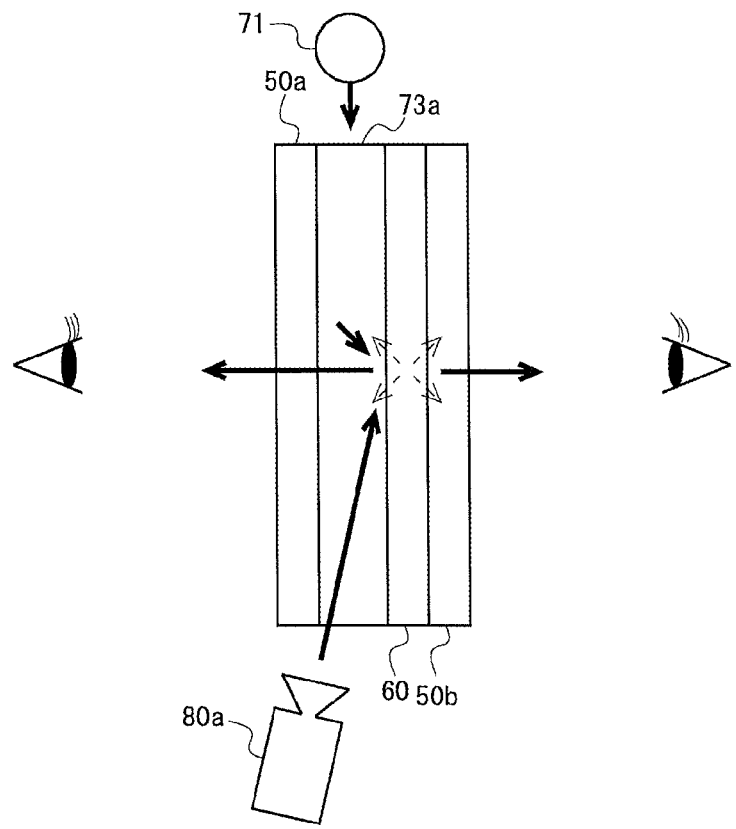
FIG. 26 is a sectional view of one pixel component of the front CF-less liquid crystal panel, the rear CF-less liquid crystal panel, the PDLC panel, and the first light guide plate shown in FIG. 25.

FIG. 26 is a sectional view of one pixel component of the front CF-less liquid crystal panel 50*a*, the rear CF-less liquid crystal panel 50*b*, the PDLC panel 60, and the first light guide plate 73*a* shown in FIG. 25. The first PDLC light source unit 80*a* according to the present embodiment applies the light source light to the front surface of the PDLC panel 60. It should be noted that the light source light of the first PDLC light source unit 80*a* may be applied to the front surface of the PDLC panel 60 via the first light guide plate 73*a*, or may be directly applied to the front surface of the PDLC panel 60 by providing an air layer and the like between the first light guide plate 73*a* and the PDLC panel 60. More specifically, the first PDLC light source unit 80*a* applies the light source light from the front surface to the PDLC display element 61 in the separation area in which image display is performed, at the image displaying time or at the partially non-displaying time. Therefore, in the present embodiment, the front direction vertical component of the spread light source light of the first PDLC light source unit 80*a* is added to the light in the first embodiment, which is to be applied to the front CF-less liquid crystal display element in the separation area in which image display is performed. The rear direction vertical component of the spread light source light of the first PDLC light source unit 80*a* is added to the light to be applied to the rear CF-less liquid crystal display element in the separation area in which image display is performed. It should be noted that other basic configurations and operations are similar to those in the first embodiment or the second embodiment, and therefore, their description will be omitted.

3.2 Effects

According to the present embodiment, by also using the first PDLC light source unit 80*a* in the configuration in the first embodiment, the front direction vertical component of the spread light source light of the first PDLC light source unit 80*a* is added to the light to be applied to the front CF-less liquid crystal display element in the separation area in which image display is performed. Therefore, luminance of the front surface image can be improved. Further, the rear direction vertical component of the spread light source light of the first PDLC light source unit 80*a* is added to the light to be applied to the rear CF-less liquid crystal display element in the separation area in which image display is performed. Accordingly, luminance of the rear surface image can be improved.

3.3 First Modification

Figure 27:
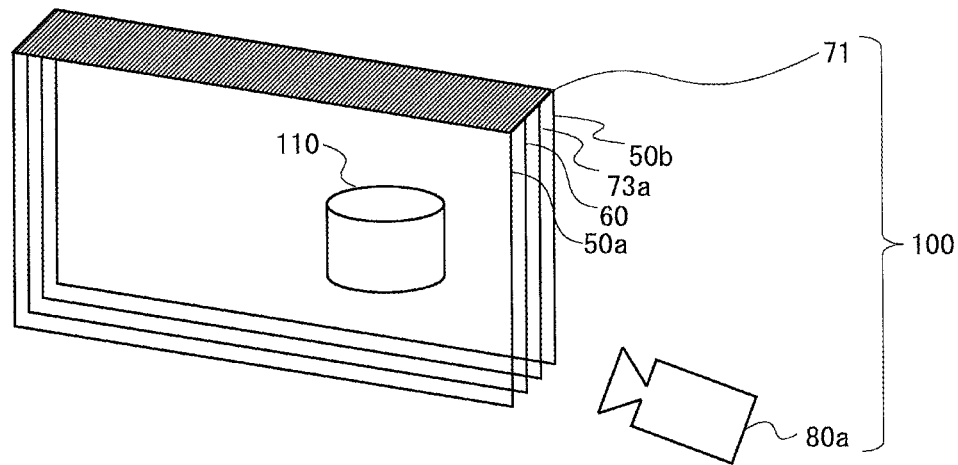
FIG. 27 is an oblique perspective view for explaining the arrangement of the front CF-less liquid crystal panel, the rear CF-less liquid crystal panel, the PDLC panel, the first PDLC light source unit, and the first light guide plate according to the first modification of the third embodiment.

FIG. 27 is an oblique perspective view for explaining the arrangement of the front CF-less liquid crystal panel 50*a*, the rear CF-less liquid crystal panel 50*b*, the PDLC panel 60, the first PDLC light source unit 80*a*, and the first light guide plate 73*a* according to the first modification of the third embodiment. According to the present modification, the first PDLC light source unit 80*a* in the second embodiment is also used in order to improve luminance of a part for performing the image display, in the third modification of the first embodiment. The arrangement of the front CF-less liquid crystal panel 50*a*, the rear CF-less liquid crystal panel 50*b*, the PDLC panel 60, the first light guide plate 73*a*, and the light-guide plate light source unit 71 according to the present modification is similar to that in the third modification of the first embodiment.

Figure 28:
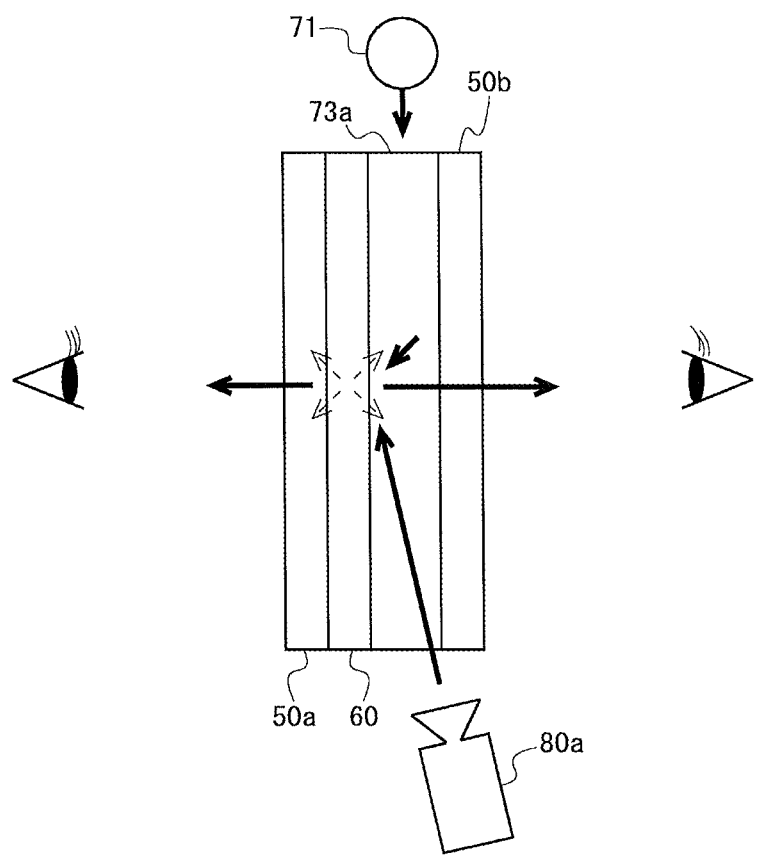
FIG. 28 is a sectional view of one pixel component of the front CF-less liquid crystal panel, the rear CF-less liquid crystal panel, the PDLC panel, and the first light guide plate shown in FIG. 27.

FIG. 28 is a sectional view of one pixel component of the front CF-less liquid crystal panel 50*a*, the rear CF-less liquid crystal panel 50*b*, the PDLC panel 60, and the first light guide plate 73*a* shown in FIG. 27. The first PDLC light source unit 80*a* according to the present embodiment applies the light source light to the rear surface of the PDLC panel 60. It should be noted that the light source light of the first PDLC light source unit 80*a* may be applied to the rear surface of the PDLC panel 60 via the first light guide plate 73*a*, or may be directly applied to the rear surface of the PDLC panel 60 by providing an air layer and the like between the first light guide plate 73*a* and the PDLC panel 60. More specifically, the first PDLC light source unit 80*a* applies the light source light from the rear surface to the PDLC display element 61 in the separation area in which image display is performed, at the image displaying time or at the partially non-displaying time. Therefore, in the present embodiment, the front direction vertical component of the spread light source light of the first PDLC light source unit 80*a* is added to the light in the third modification of the first embodiment, which is to be applied to the front CF-less liquid crystal display element in the separation area in which image display is performed. The rear direction vertical component of the spread light source light of the first PDLC light source unit 80*a* is added to the light to be applied to the rear CF-less liquid crystal display element in the separation area in which image display is performed. It should be noted that other basic configurations and operations are similar to those in the third modification of the first embodiment or the second embodiment, and therefore, their description will be omitted.

According to the present modification, by also using the first PDLC light source unit 80*a* in the configuration according to the third modification of the first embodiment, the front direction vertical component of the spread light source light of the first PDLC light source unit 80*a* is added to the light to be applied to the front CF-less liquid crystal display element in the separation area in which image display is performed. Therefore, luminance of the front surface image can be improved. Further, the rear direction vertical component of the spread light source light of the first PDLC light source unit 80*a* is added to the light to be applied to the rear CF-less liquid crystal display element in the separation area in which image display is performed. Accordingly, luminance of the rear surface image can be improved.

3.4 Second Modification

Figure 29:
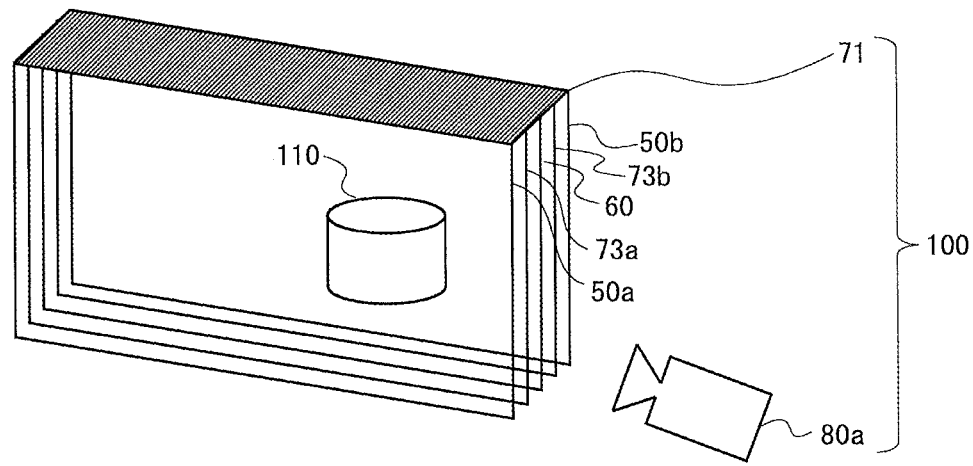
FIG. 29 is an oblique perspective view for explaining the arrangement of the front CF-less liquid crystal panel, the rear CF-less liquid crystal panel, the PDLC panel, the first PDLC light source unit, and the first and second light guide plates according to the second modification of the third embodiment.

FIG. 29 is an oblique perspective view for explaining the arrangement of the front CF-less liquid crystal panel 50*a*, the rear CF-less liquid crystal panel 50*b*, the PDLC panel 60, the first PDLC light source unit 80*a*, and the first and second light guide plates 73*a* and 73*b* according to the second modification of the third embodiment. According to the present modification, the first PDLC light source unit 80*a* in the second embodiment is also used in order to improve luminance of a part for performing the image display, in the fourth modification of the first embodiment. The arrangement of the front CF-less liquid crystal panel 50a, the rear CF-less liquid crystal panel 50b, the PDLC panel 60, the first and second light guide plates 73a, and the light-guide plate light source unit 71 according to the present modification is similar to that according to the fourth modification of the first embodiment.

Figure 30:
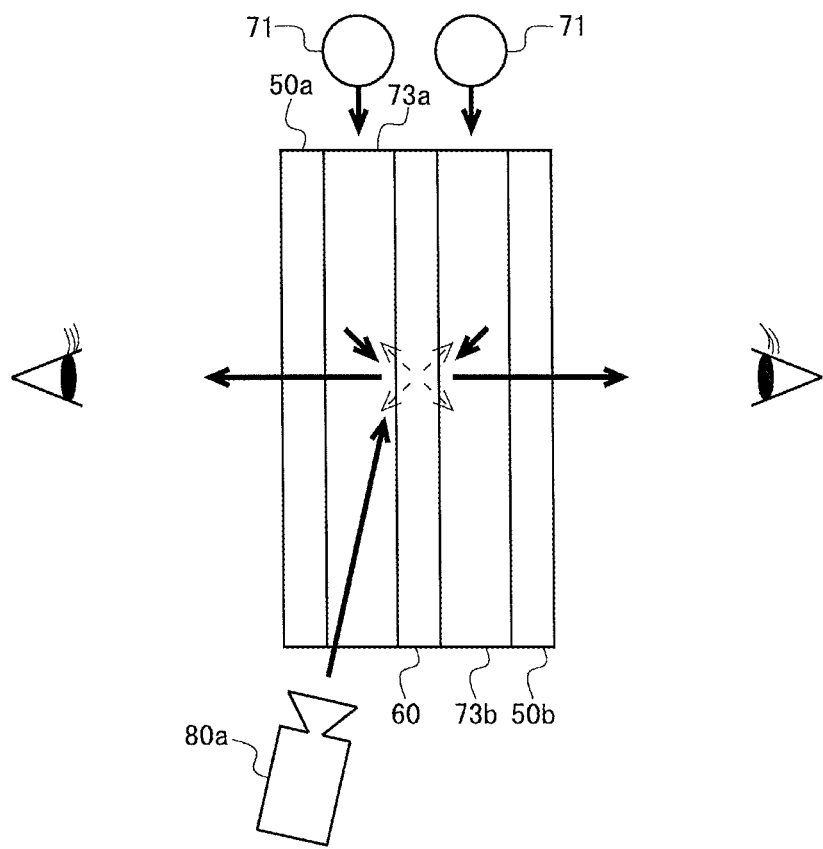
FIG. 30 is a sectional view of one pixel component of the front CF-less liquid crystal panel, the rear CF-less liquid crystal panel, the first PDLC panel, and the first and second light guide plates shown in FIG. 29.

FIG. 30 is a sectional view of one pixel component of the front CF-less liquid crystal panel 50a, the rear CF-less liquid crystal panel 50b, the PDLC panel 60, and the first and second light guide plates 73a and 73b shown in FIG. 29. The first PDLC light source unit 80a according to the present embodiment applies the light source light to the front surface of the PDLC panel 60. It should be noted that the light source light of the first PDLC light source unit 80a may be applied to the front surface of the PDLC panel 60 via the first light guide plate 73a, or may be directly applied to the front surface of the PDLC panel 60 by providing an air layer and the like between the first light guide plate 73a and the PDLC panel 60. More specifically, the first PDLC light source unit 80a applies the light source light from the front surface to the PDLC display element 61 in the separation area in which image display is performed, at the image displaying time or at the partially non-displaying time. Therefore, in the present embodiment, the front direction vertical component of the spread light source light of the first PDLC light source unit 80a is added to the light in the fourth modification of the first embodiment, which is to be applied to the front CF-less liquid crystal display element in the separation area in which image display is performed. The rear direction vertical component of the spread light source light of the first PDLC light source unit 80a is added to the light to be applied to the rear CF-less liquid crystal display element in the separation area in which image display is performed. It should be noted that other basic configurations and operations are similar to those according to the fourth modification of the first embodiment or the second embodiment, and therefore, their description will be omitted.

According to the present modification, by also using the first PDLC light source unit 80a in the configuration according to the fourth modification of the first embodiment, the front direction vertical component of the spread light source light of the first PDLC light source unit 80a is added to the light to be applied to the front CF-less liquid crystal display element in the separation area in which image display is performed. Therefore, luminance of the front surface image can be improved. Further, the rear direction vertical component of the spread light source light of the first PDLC light source unit 80a is added to the light to be applied to the rear CF-less liquid crystal display element in the separation area in which image display is performed. Accordingly, luminance of the rear surface image can be improved.

4. Fourth Embodiment 4.1 Color Unevenness

Figure 31:
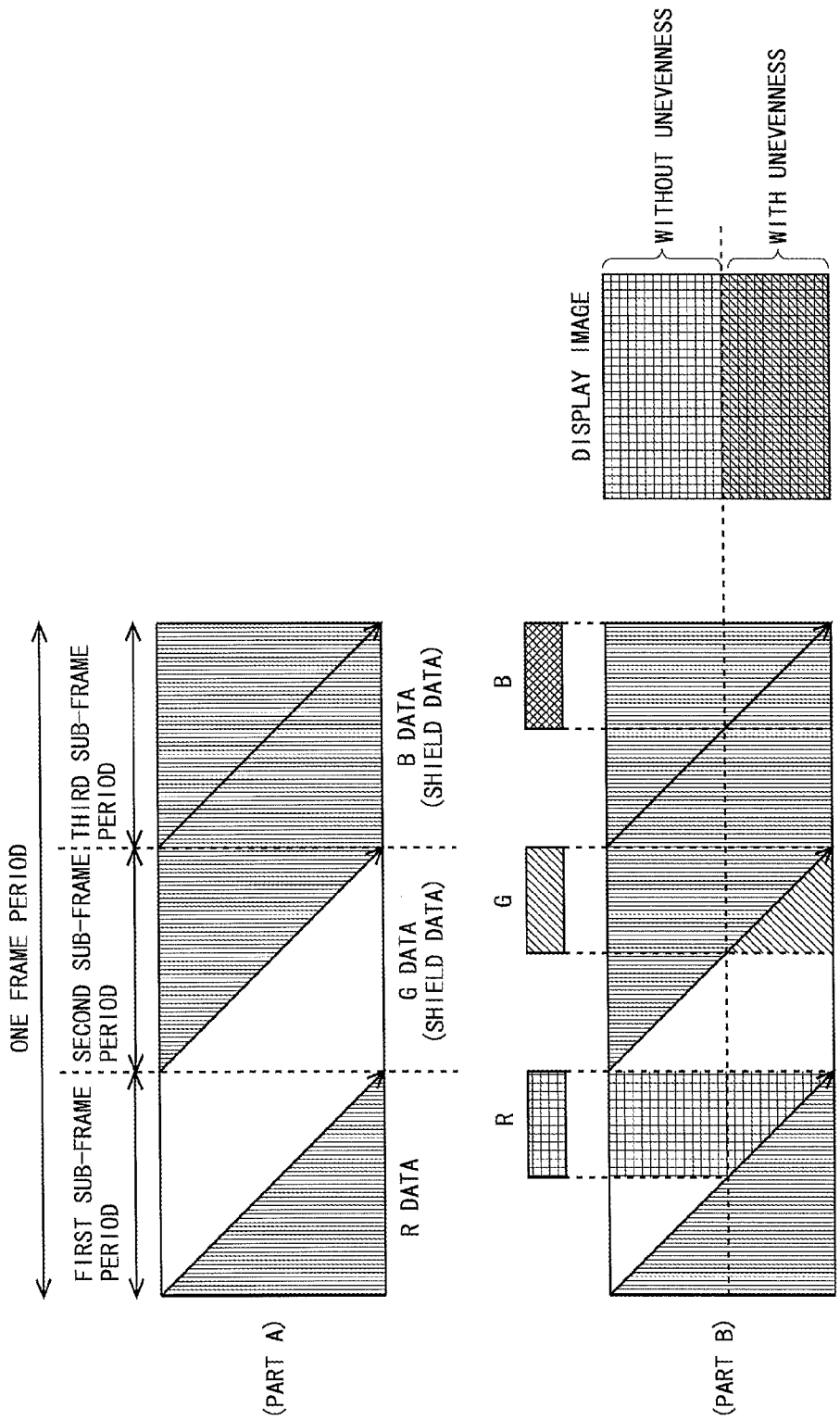
FIG. 31 is a view for explaining color unevenness. It should be noted that the part A shows a timing of giving red color data to the CF-less liquid crystal panel, and the part B shows a lighting start time of turning on the light emitting element of each color and lighting time.

The fourth embodiment of the present invention solves the above color unevenness that occurs in the case of not performing the scan drive of the light source, in accordance with the scan direction of the CF-less liquid crystal panel 50. The color unevenness will be further described here. It should be noted that, in the description of items to which color unevenness is relevant in the present embodiment, the description concerning the drive of the PDLC panel 60 will be sometimes omitted for the sake of convenience. FIG. 31 is a view for explaining color unevenness. More specifically, the part A in FIG. 31 shows a timing of giving red color data to the CF-less liquid crystal panel 50, and the part B in FIG. 31 shows lighting start time of turning on the light emitting element of each color and lighting time. The part A in FIG. 31 is similar to the part A in FIG. 10. The part B of FIG. 31 is addition of a schematic display image to the part C in FIG. 10.

The operation in each sub-frame period is as described above, and therefore, description of the operation will be omitted. As shown in the part B in FIG. 31, an image of a red color without color unevenness is displayed in the upper half portion of the screen, and an image with color unevenness having a green color mixed with the red color is displayed in the lower half portion of the screen.

4.2 Signal Control Circuit

Figure 32:
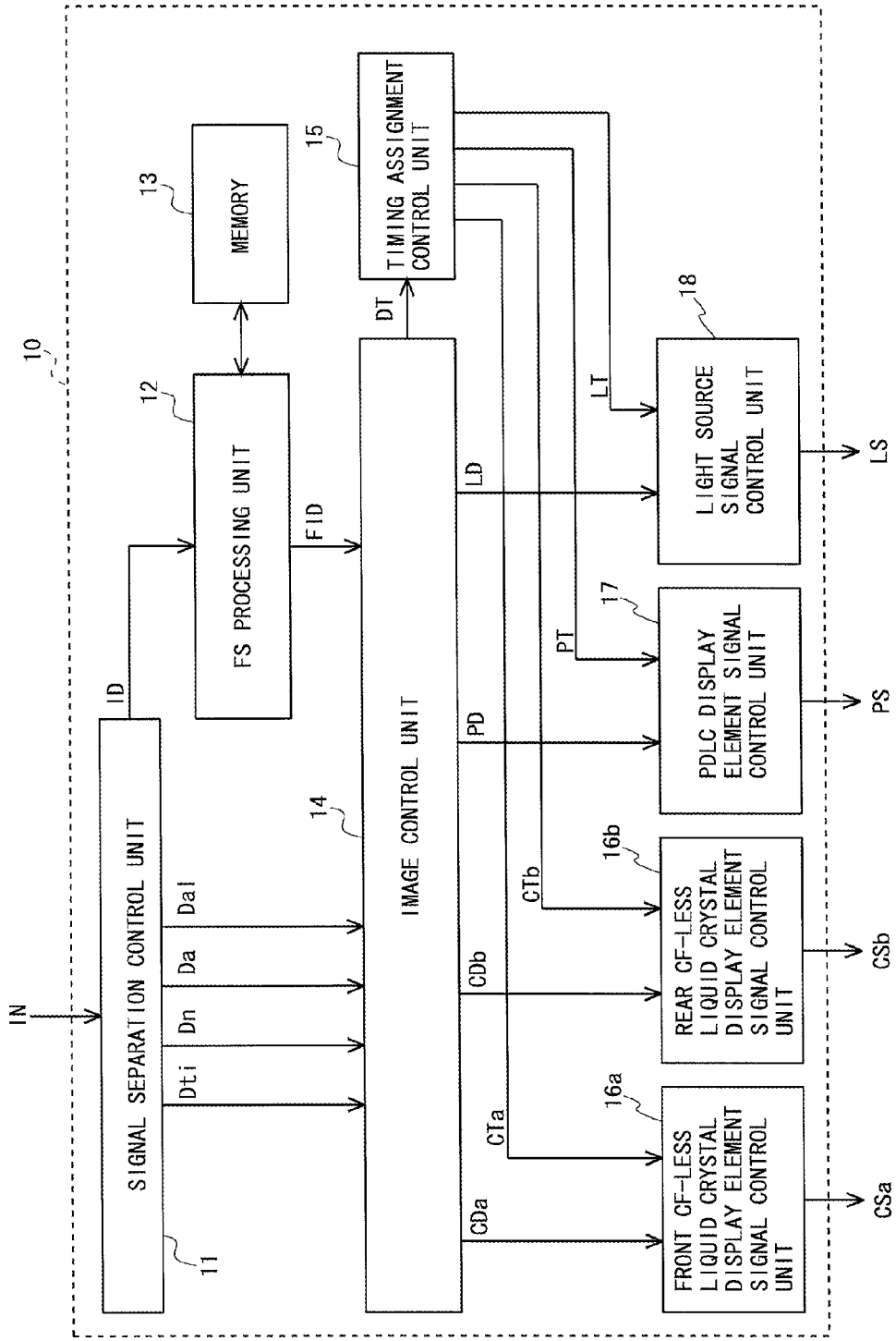
FIG. 32 is a block diagram showing a configuration of a signal processing circuit in the fourth embodiment of the present invention.

FIG. 32 is a block diagram showing a configuration of the signal processing circuit 10 according to the present embodiment. It should be noted that, out of the components of the present embodiment, the same elements as those in the first to third embodiments will be attached with the same reference characters and their description will be suitably omitted. The basic configuration of the signal processing circuit 10 according to the present embodiment is similar to that in the first embodiment. The input signal IN according to the present embodiment includes image data ID, display-image position assigning data Da, display start line assignment data Dal, non-display start line assignment data Dn, and response time data Dti indicating a liquid crystal response time TI of the CF-less liquid crystal panel 50.

The display start line assignment data Dal is data for assigning a start position (hereinafter, referred to as a "display start line", and expressed by a reference character Xa) on the screen of a display area in which an image of a desired color without color unevenness is displayed, by adjusting lighting time of the light emitting element of each color, and at least any of the scan drive start time of the CF-less liquid crystal display element 51 and the light on time of the light emitting element of each color. The non-display start line assignment data Dn is data for assigning a start position (hereinafter, referred to as a "non-display start line", and expressed by a reference character Xn) on the screen of a non-display area in which the image of a desired color is not displayed, by making color data equal for each sub-frame period and for each pixel.

The signal separation control unit 11 separates the input signal IN into the image data ID, the display-image position assigning data Da, the display start line assignment data Dal, the non-display start line assignment data Dn, and response time data Dti, gives the image data ID to the FS processing unit 12, and gives the display-image position assigning data Da, the display start line assignment data Dal, the non-display start line assignment data Dn, and the response time data Dti to the image control unit 14.

The image control unit 14 generates the front CF-less liquid crystal data CDa, the rear CF-less liquid crystal data CDb, the PDLC data PD, the light source data LD, and the drive timing control signal DT, based on the display-image position assigning data Da, the display start line assignment data Dal, the non-display start line assignment data Dn, the response time data Dti, and the FS image data FID.

4.3 Image Control Unit

Figure 33:
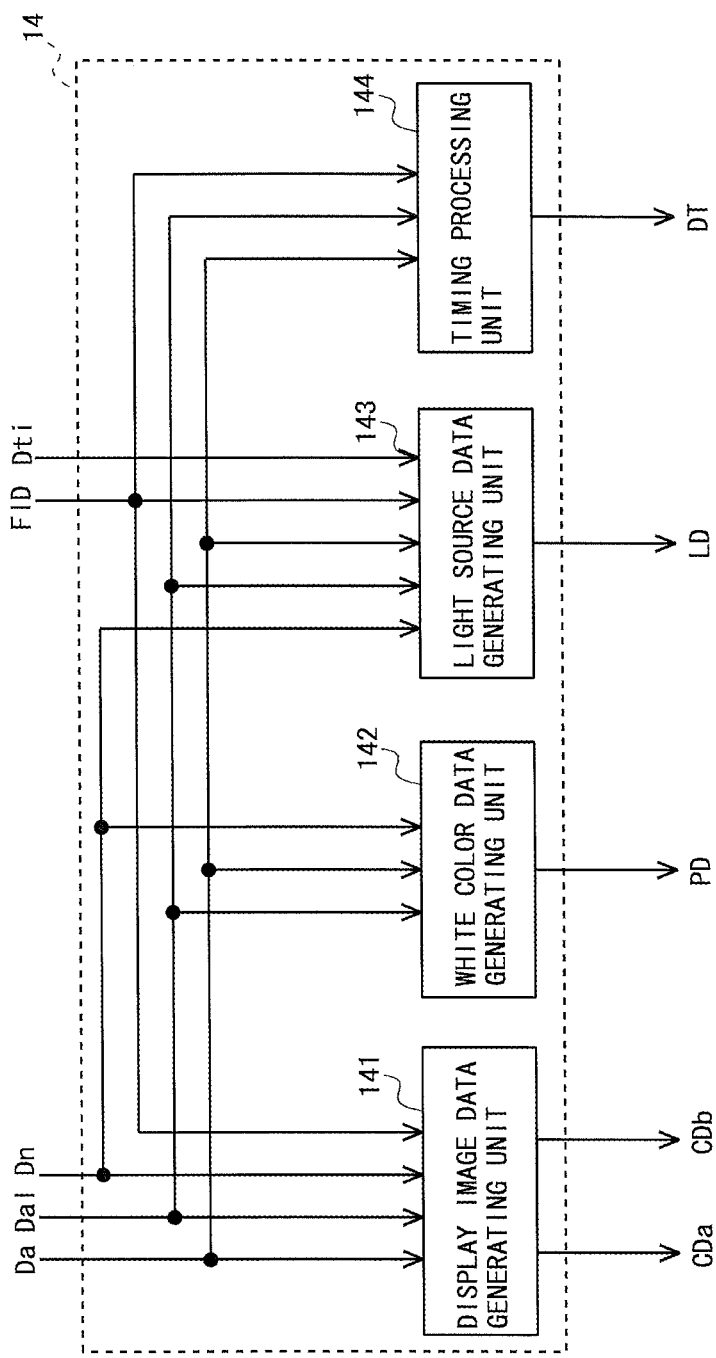
FIG. 33 is a block diagram showing a configuration of the image control unit shown in FIG. 32.

FIG. 33 is a block diagram showing a configuration of the image control unit 14 shown in FIG. 32. The basic configuration of the image control unit 14 according to the present embodiment is similar to that in the first embodiment. The display image data generating unit 141 receives the display-image position assigning data Da, the display start line assignment data Dal, the non-display start line assignment data Dn, and the FS image data FID, and generates the CF-less liquid crystal data CD, based on the received data. It should be noted that the CF-less liquid crystal data CD according to the present embodiment includes image data (color data) for display area and image data (color data) for non-display area. The white color data generating unit 142 receives the display-image position assigning data Da, the display start line assignment data Dal, and the non-display start line assignment data Dn, and generates the PDLC data PD, based on the received data. The light source data generating unit 143 receives the display-image position assigning data Da, the display start line assignment data Dal, the non-display start line assignment data Dn, the response time data Dti, and the FS image data FID, and generates the light source data LD, based on the received data. The light source data generating unit 143 generates light source lighting time data Dtb described later, and gives the light source lighting time data Dtb to the timing processing unit 144. The timing processing unit 144 receives the display-image position assigning data Da, the display start line assignment data Dal, the FS image data FID, and the light source lighting time data Dtb, and generates the drive timing control signal DT, based on the received data.

The operation of the light source data generating unit 143 according to the present embodiment will be further described. The light source data generating unit 143 obtains maximum light source lighting time Tbm as a period for turning on the light emitting element of each color such that luminance becomes maximum in a state without color unevenness, by the next equation (1), (2), or (3), by using at least the display start line assignment data Dal, the non-display start line assignment data Dn, and the response time data Dti.

$$Tbm=T-Tl-[T*(Xn-Xa)]/X \quad (1)$$

$$Tbm=T \quad (2)$$

$$Tbm=T-Tl-[T*(X+Xn-Xa)]/X \quad (3)$$

In this case, T expresses one sub-frame period, and x expresses a total number of lines (a total number of scanning lines) of the CF-less liquid crystal panel 50.

Which one of the equations (1), (2), and (3) should be used is determined by a large/small relation of the display start line Xa and the non-display start line Xn. Specifically, when Xa<Xn, the equation (1) is used. When Xa=Xn, the equation (2) is used. When Xa>Xn, the equation (3) is used. The light source lighting time Tb as a period for turning on the light emitting element can be changed between the maximum light source lighting time Tbm and 0. It should be noted that, in order to obtain higher luminance, it is desirable that the light source lighting time Tb is set to a value nearer the maximum light source lighting time Tbm. The light source data LD output by the light source data generating unit 143 includes the light source lighting time Tb. It should be noted that the light source data LD may include the maximum light source lighting time Tbm in place of the light source lighting time Tb. The light source data generating unit 143 gives the light source lighting time data Dtb indicating the light source lighting time Tb, to the timing processing unit 144.

The operation of the timing processing unit 144 according to the present embodiment will be further described. The timing processing unit 144 obtains the lighting drive adjusting time Td as a period for determining how early the light emitting element of each color should be turned on or how late the light emitting element of each color should be turned off from the scan drive start time of the CF-less liquid crystal display element 51, by the next equation (4), by using at least the display start line assignment data Dal and the light source lighting time data Dtb. The lighting drive adjusting time Td is, in other words, a period for adjusting the lighting start time of the light emitting element of each color.

$$Td=T-Tb+(T*Xa/X) \quad (4)$$

The timing processing unit 144 generates the drive timing control signal DT, based on the lighting drive adjusting time Td obtained by equation (4), and outputs the drive timing control signal DT. It should be noted that, in place of adjusting the lighting start time of the light emitting element of each color, the start time of the scan drive of the CF-less liquid crystal display element 51 may be adjusted. Alternatively, both the lighting start time of the light emitting element of each color and the start time of the scan drive of the CF-less liquid crystal display element 51 may be adjusted. The maximum light source lighting time Tbm and the lighting drive adjusting time Td expressed by the above equations (1) to (4) assume the case of displaying maximum luminance in the state without color unevenness. However, in the case of allowing a certain degree of color unevenness, the maximum light source lighting time Tbm and the lighting drive adjusting time Td may be increased or reduced by their allowance amount. In the present embodiment, the drive timing control signal DT corresponds to a light-source drive timing control signal.

Under the above setting, by sequentially turning on the light emitting elements of respective colors of the backlight unit 70 and/or the first PDLC light source unit 80a synchronously with the drive of the CF-less liquid crystal panel 50, a display area in which the image without color unevenness is displayed can be provided at a desired position on the screen.

4.4 Operation

Figure 34:
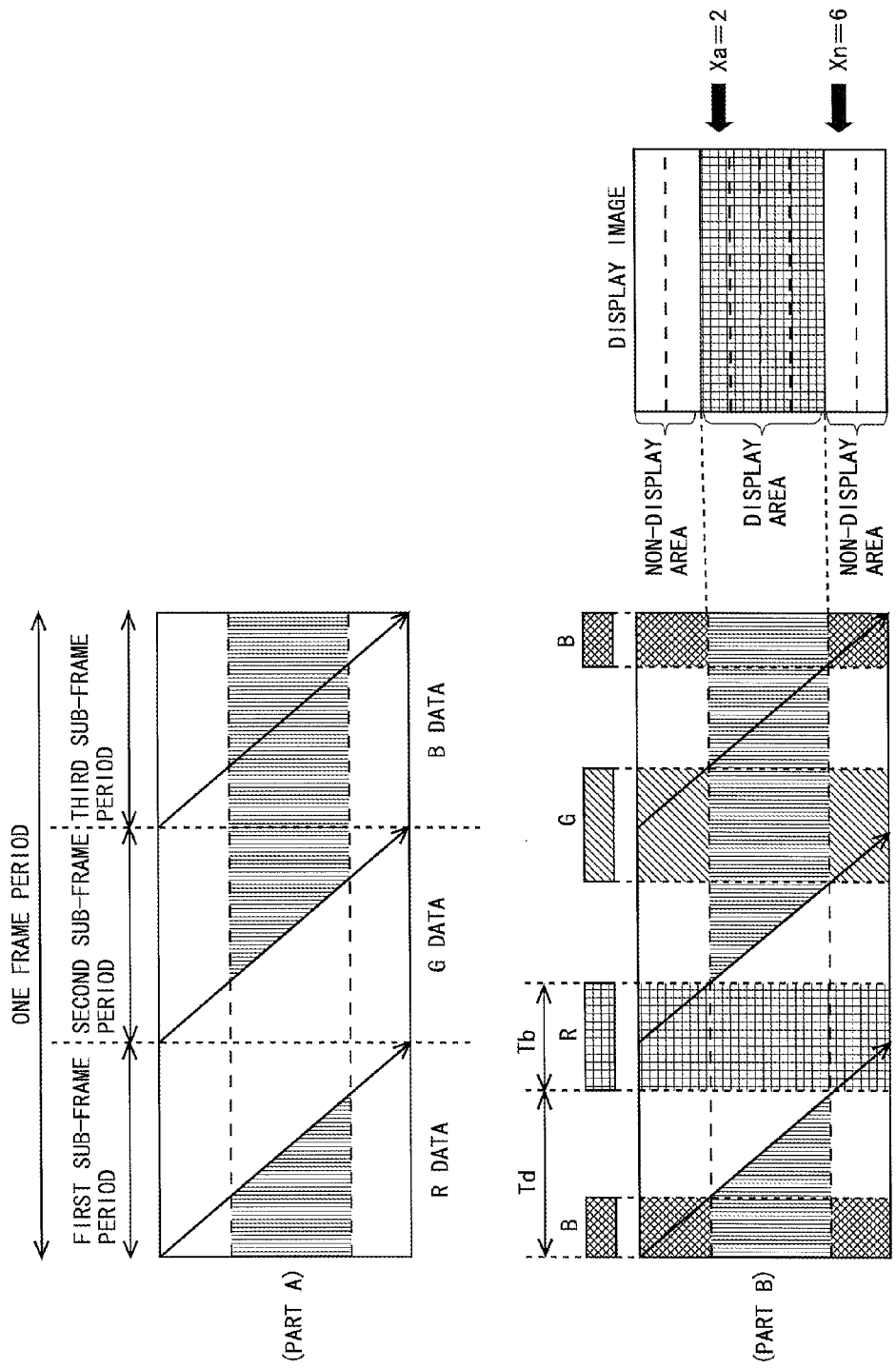
FIG. 34 is a view for explaining the operation in the case of displaying an image of a red color in a display area in the fourth embodiment. It should be noted that the part A shows a timing of giving red color data to the CF-less liquid crystal panel, and the part B shows a lighting start time of turning on the light emitting element of each color and lighting time.

FIG. 34 is a view for explaining the operation in the case of displaying an image of a red color in a display area in the present embodiment. More specifically, the part A in FIG. 34 shows a timing of giving red color data to the CF-less liquid crystal panel 50, and the part B in FIG. 34 shows lighting start time of turning on the light emitting element of each color and lighting time. Description will be made by assuming that the liquid crystal response time TI of the CF-less liquid crystal panel 50 is zero. It should be noted that, in the description of the display image in the part B in FIG. 34 (this is also similar in the part B in FIG. 35, the part B in FIG. 36, and the part B in FIG. 37), when the CF-less liquid crystal panel 50 is the liquid crystal panel having horizontal 1920× vertical 1080 pixels, for example, 1080 lines should be also described. However, in the following, for the sake of convenience, description will be made by assuming that the CF-less liquid crystal panel 50 is configured by total eight lines from the top zero-th line to the bottom seventh line. The area attached with a lattice pattern expresses a display area in which the image of a red color is displayed, and the area not attached with the lattice pattern expresses non-display areas in the state of transmitting the background color at the maximum.

As shown in the part B in FIG. 34, the display start line Xa is positioned in the higher line than the non-display start line Xn, and also the display start line Xa is not zero. Specifically, it is assumed that the display start line Xa is the second line, and the non-display start line Xn is the sixth line. In this case, the second to fifth lines become display areas, and the zero-th and the first lines and the sixth and seventh lines become non-display areas. Therefore, the display image data generating unit 141 generates the front CF-less liquid crystal data CDa and the rear CF-less liquid crystal data CDb including the image data for realizing the display area and the non-display area. It should be noted that, in the present embodiment, it is desirable that the number of pixels of the PDLC panel 60 is plural, and that the PDLC data PD which the white color data generating unit 142 generates based on the display-image position assigning data Da, the display start line assignment data Dal, and the non-display start line assignment data Dn sets the PDLC display element 61 corresponding to the display area to the spreading state and sets the PDLC display element 61 corresponding to the non-display area to the transmittance state. However, in the present embodiment, the mode of uniformly setting the state of the PDLC panel 60 by the total is not excluded.

Scan drive is started at each start time of the first to third sub-frame periods. By the scan drive, in the first sub-frame period, transmittance data is given as red color data to the second to fifth lines, and transmittance data is also given as red color data to the zero-th and first lines and the sixth and seventh lines. In the second sub-frame period, shield data is given as green color data to the second to fifth lines, and transmittance data is given as green color data to the zero-th and first lines and the sixth and seventh lines. In the third sub-frame period, shield data is given as blue color data to the second to fifth lines, and transmittance data is given as blue color data to the zero-th and first lines and the sixth and seventh lines.

Further, in each of the first to third sub-frame periods, a light emitting element of a corresponding color is turned on at a time later by the lighting drive adjusting time Td than the scan drive start time of corresponding color data, and the light emitting element is turned off after the light source lighting time Tb has been passed. Therefore, the light emitting element 72r (81r) having a red color is set to the turn on state from the latter half of the first sub-frame period to the first half of the second sub-frame period, the light emitting element 72g (81g) having a green color is set to the turn on state from the latter half of the second sub-frame period to the first half of the third sub-frame period, and the light emitting element 72b (81b) having a blue color is set to the turn on state from the latter half of the third sub-frame period to the first half of the first sub-frame period of the next frame period.

The light of a red color is transmitted through the second to fifth lines to which transmittance data has been given as red color data, and is also transmitted through the zero-th and first lines and the sixth and seventh lines to which transmittance data has been given as red color data. However, the light of a green color and a blue color is shielded such that the transmittance amount becomes minimum in the second to fifth lines, and is transmitted at the maximum in the zero-th and first lines and the sixth and seventh lines. As a result, in the second to fifth lines, because only the light of a red color is transmitted, an image corresponding to the red color data is displayed. On the other hand, in the zero-th and first lines and the sixth and seventh lines, light of each color is transmitted for the same period, that is, by the same light amount. Accordingly, the zero-th and first lines and the sixth and seventh lines become non-display areas for transmitting the background color at the maximum. In this way, a display area in which the image of a red color is displayed is formed at the center of the screen, and a non-display area in the state of transmitting the background color at the maximum is formed so as to sandwich the display area from above and from below. It should be noted that, in the case of setting the whole PDLC panel 60 to the spreading state at the image displaying time by setting the number of pixels of the PDLC panel 60 to one, the non-display area becomes in white color display.

According to the present embodiment, the light source lighting time and the drive timing control signal DT are controlled, in correspondence to the period in which color data necessary for displaying the image of a desired color is to be given to the display area. Therefore, a display area in which the image of a desired color having suppressed the occurrence of color unevenness can be set at a desired position of the CF-less liquid crystal panel 50.

According to the present embodiment, color data given to the non-display area in each sub-frame period becomes the same data for each pixel of the non-display area. Therefore, the non-display area becomes an area in which occurrence of color unevenness is suppressed. When the number of pixels of the PDLC panel 60 is set a plurality, the background can be displayed in the non-display area, for example.

It should be noted that, as the configuration of the signal control circuit 10 according to the present embodiment, not only the configuration in the first embodiment, but also the configuration according to the first modification of the first embodiment may be employed. As the arrangement of the CF-less liquid crystal panel 50 and the light irradiating unit 90 according to the present embodiment, any of the first to third embodiments and the modifications thereof may be employed. In the present embodiment, the frame interpolation processing according to the second modification of the first embodiment may be performed.

4.6 First Modification

Figure 35:
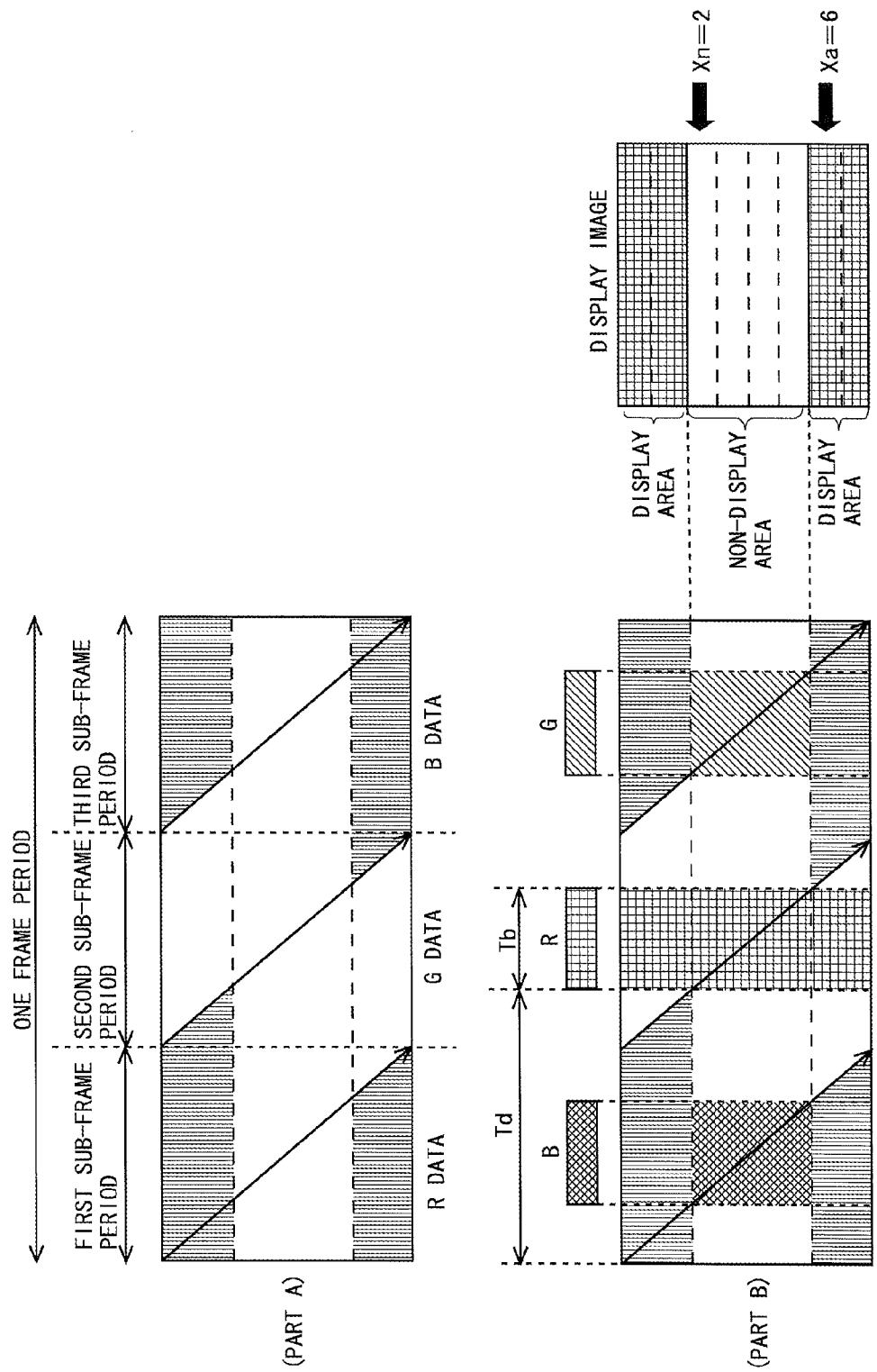
FIG. 35 is a view for explaining the operation in the case of displaying an image of a red color in a display area according to the first modification of the fourth embodiment. It should be noted that the part A shows a timing of giving red color data to the CF-less liquid crystal panel, and the part B shows a lighting start time of turning on the light emitting element of each color and lighting time.

FIG. 35 is a view for explaining the operation in the case of displaying an image of a red color in a display area according to the first modification of the fourth embodiment. More specifically, the part A in FIG. 35 shows a timing of giving red color data to the CF-less liquid crystal panel 50, and the part B in FIG. 35 shows lighting start time of turning on the light emitting element of each color and lighting time. As shown in the part B in FIG. 35, the display start line Xa is positioned in the lower line than the non-display start line Xn, and also the non-display start line Xn is not zero. Specifically, it is assumed that the display start line Xa is the sixth line, and the non-display start line Xn is the second line. In this case, the zero-th and first lines and the sixth and seventh lines become display areas, and the second to fifth lines become non-display areas. Therefore, the display image data generating unit 141 generates the front CF-less liquid crystal data CDa and the rear CF-less liquid crystal data CDb including the image data for realizing such a display area and such a non-display area. Further, the display image data generating unit 141 generates the image data to be displayed in the zero-th and first lines, by delaying by one sub-frame period.

Scan drive is started at each start time of the first to third sub-frame periods. By the scan drive, in the first sub-frame period, transmittance data is given as red color data to the second to fifth lines and the sixth and seventh lines. Transmittance data as the red color data to be given to the zero-th and first lines is given in the second sub-frame period by delaying by one sub-frame period. In the second sub-frame period, transmittance data is given as green color data to the second to fifth lines, and shield data is given as green color data to the sixth and seventh lines. Shield data as the green color data to be given to the zero-th and first lines is given in the third sub-frame period by delaying by one sub-frame period. In the third sub-frame period, transmittance data is given as blue color data to the second to fifth lines, and shield data is given as blue color data to the sixth and seventh lines. Shield data as the blue color data to be given to the zero-th and first lines is given in the first sub-frame period in the next frame period.

Further, in each of the first to third sub-frame periods, a light emitting element of a corresponding color is turned on at a time later by the lighting drive adjusting time Td than the scan drive start time of corresponding color data, and the light emitting element is turned off after the light source lighting time Tb has been passed. Therefore, the light emitting element 72r (81r) having a red color is turned on by being delayed by the lighting drive adjusting time Td from the start time of the first sub-frame period, the light emitting element 72g (81g) having a green color is turned on by being delayed by the lighting drive adjusting time Td from the start time of the second sub-frame period, and the light emitting element 72b (81b) having a blue color is turned on by being delayed by the lighting drive adjusting time Td from the start time of the third sub-frame period.

The light of a red color is transmitted through the zero-th and first lines and sixth and seventh lines to which transmittance data has been given as red color data, and is also transmitted through the second to fifth lines to which transmittance data has been given as red color data. However, the light of a green color and a blue color is shielded such that the transmittance amount becomes minimum in the zero-th and first lines and sixth and seventh lines, and is transmitted at the maximum in the second to fifth lines. As a result, in the zero-th and first lines and the sixth and seventh lines, because only the light of a red color is transmitted, an image corresponding to the red color data is displayed. On the other hand, in the second to fifth lines, light of each color is transmitted for the same period, that is, by the same light amount. Accordingly, the second to fifth lines become non-display areas for transmitting the background color at the maximum. In this way, a non-display area in the state of transmitting the background color at the maximum is formed in the center of the screen, and a display area in which the image of a red color is displayed is formed so as to sandwich the non-display area.

4.7 Second Modification

Figure 36:
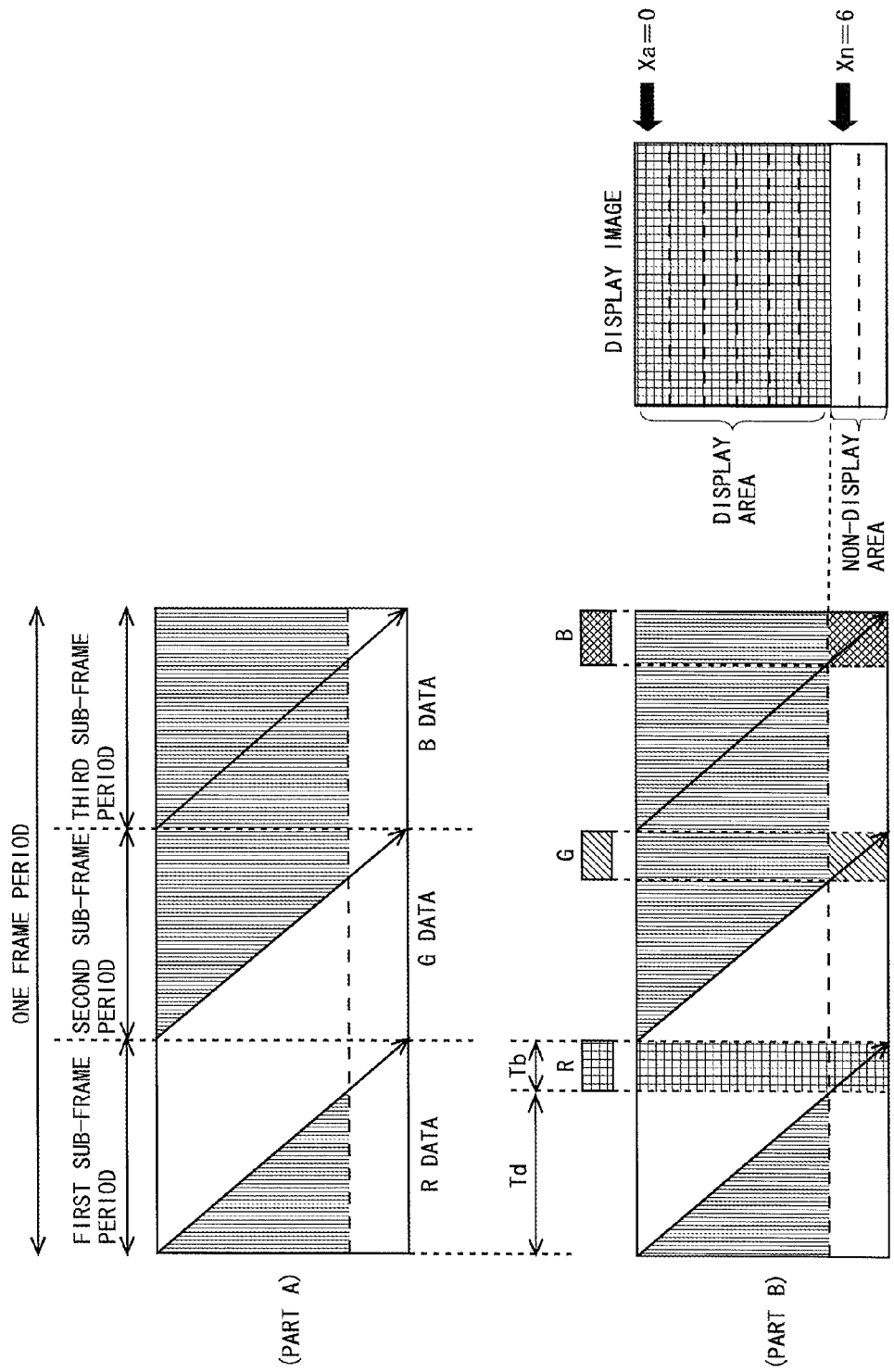
FIG. 36 is a view for explaining the operation in the case of displaying an image of a red color in a display area according to the second modification of the fourth embodiment. It should be noted that the part A shows a timing of giving red color data to the CF-less liquid crystal panel, and the part B shows a lighting start time of turning on the light emitting element of each color and lighting time.

FIG. 36 is a view for explaining the operation in the case of displaying an image of a red color in a display area according to the second modification of the fourth embodiment. More specifically, the part A in FIG. 36 shows a timing of giving red color data to the CF-less liquid crystal panel 50, and the part B in FIG. 36 shows lighting start time of turning on the light emitting element of each color and lighting time. As shown in the part B in FIG. 36, the display start line Xa is positioned in the upper line than the non-display start line Xn, and also the display start line Xa is zero. Specifically, it is assumed that the display start line Xa is the zero-th line, and the non-display start line Xn is the sixth line. In this case, the zero-th to fifth lines become display areas, and the sixth and seventh lines become non-display areas. Therefore, the display image data generating unit 141 generates the front CF-less liquid crystal data CDa and the rear CF-less liquid crystal data CDb including the image data for realizing such a display area and such a non-display area.

Scan drive is started at each start time of the first to third sub-frame periods. By the scan drive, in the first sub-frame period, transmittance data is given as red color data to the zero-th to fifth lines and the sixth and seventh lines. In the second sub-frame period, shield data is given as green color data to the zero-th to fifth lines, and transmittance data is given as green color data to the sixth and seventh lines. In the third sub-frame period, shield data is given as blue color data to the zero-th to fifth lines, and transmittance data is given as blue color data to the sixth and seventh lines.

Further, in each of the first to third sub-frame periods, a light emitting element of a corresponding color is turned on at a time later by the lighting drive adjusting time Td than the scan drive start time of corresponding color data, and the light emitting element is turned off after the light source lighting time Tb has been passed. Therefore, the light emitting element 72r (81r) having a red color is set to the turn on state from the latter half of the first sub-frame period to the end time thereof, the light emitting element 72g (81g) having a green color is set to the turn on state from the latter half of the second sub-frame period to the end time thereof, and the light emitting element 72b (81b) having a blue color is set to the turn on state from the latter half of the third sub-frame period to the end time thereof.

The light of a red color is transmitted through the zero-th to fifth lines to which transmittance data has been given as red color data, and is also transmitted through the sixth and seventh lines to which transmittance data has been given as red color data. However, the light of a green color and a blue color is shielded such that the transmittance amount becomes minimum in the zero-th to fifth lines, and is transmitted at the maximum in the sixth and seventh lines. As a result, in the zero-th to fifth lines, because only the light of a red color is transmitted, an image corresponding to the red color data is displayed. On the other hand, in the sixth and seventh lines, light of each color is transmitted for the same period, that is, by the same light amount. Accordingly, the sixth and seventh lines become non-display areas for transmitting the background color at the maximum. In this way, a display area in which the image of a red color is displayed is formed at the upper part of the screen, and a non-display area in the state of transmitting the background color at the maximum is formed at the lower part of the screen.

4.8 Third Modification

Figure 37:
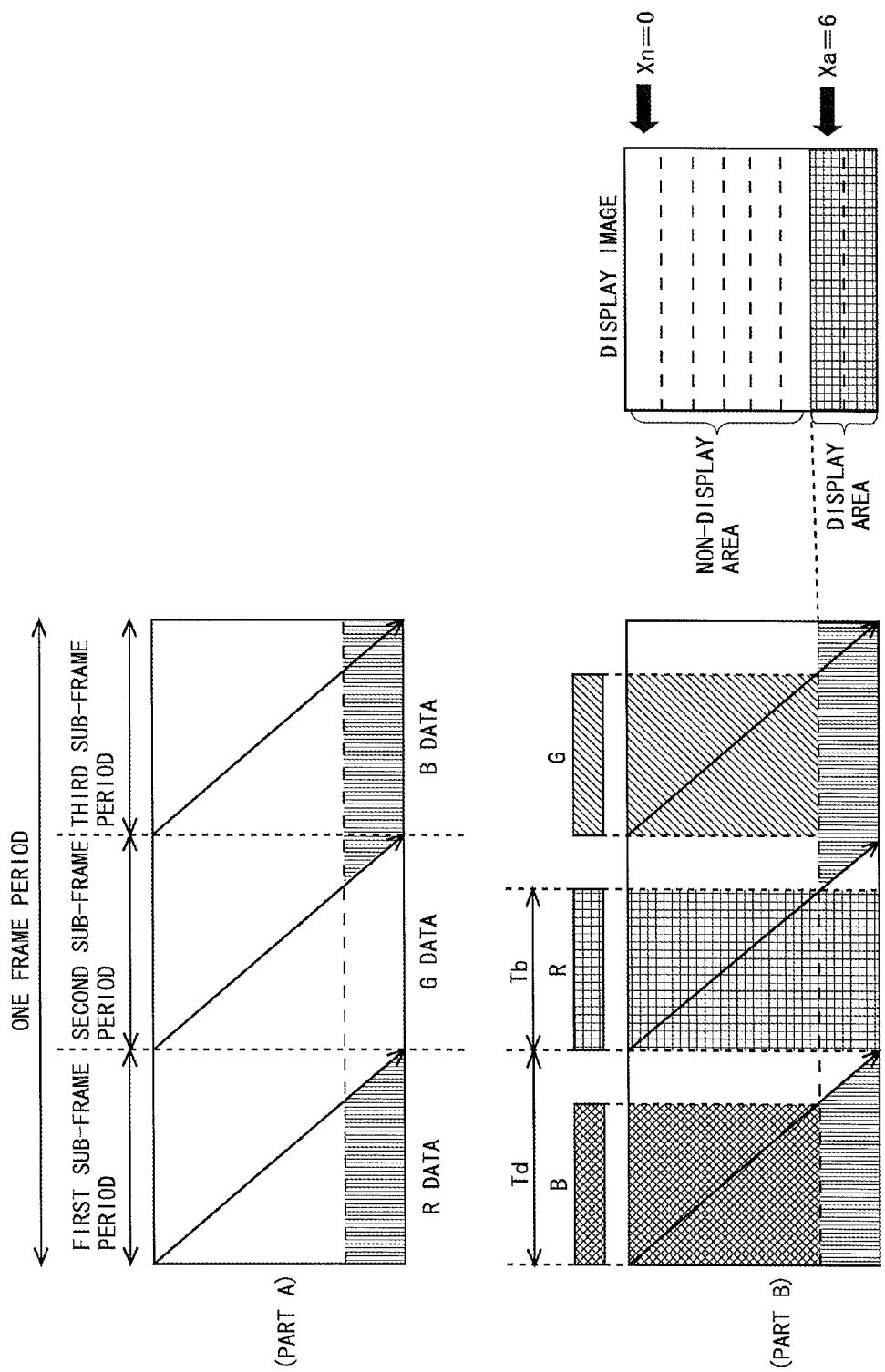
FIG. 37 is a view for explaining the operation in the case of displaying an image of a red color in a display area according to the third modification of the fourth embodiment. It should be noted that the part A shows a timing of giving red color data to the CF-less liquid crystal panel, and the part B shows a lighting start time of turning on the light emitting element of each color and lighting time.
Figure 38:
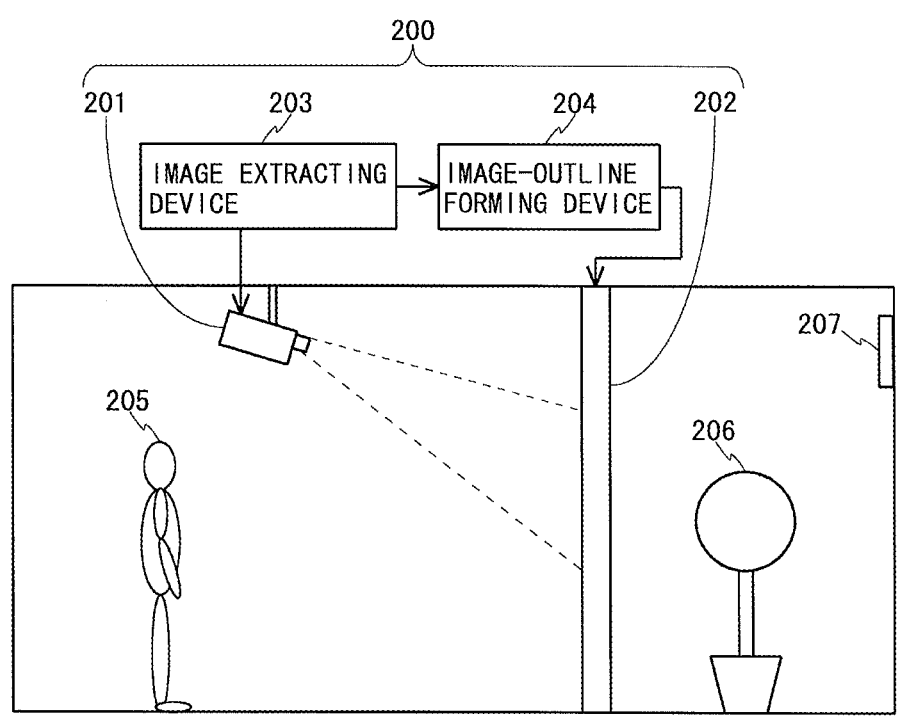
FIG. 38 is a view showing a configuration of the presence display device disclosed in Japanese Patent Application Laid-Open No. H5-191726.

FIG. 37 is a view for explaining the operation in the case of displaying an image of a red color in a display area according to the third modification of the fourth embodiment. More specifically, the part A in FIG. 37 shows a timing of giving red color data to the CF-less liquid crystal panel 50, and the part B in FIG. 37 shows lighting start time of turning on the light emitting element of each color and lighting time. As shown in the part B in FIG. 37, the display start line Xa is positioned in the lower line than the non-display start line Xn, and also the non-display start line Xn is zero. Specifically, it is assumed that the display start line Xa is the sixth line, and the non-display start line Xn is the zero-th line. In this case, the zero-th to fifth lines become non-display areas, and the sixth and seventh lines become display areas. Therefore, the display image data generating unit 141 generates the front CF-less liquid crystal data CDa and the rear CF-less liquid crystal data CDb including the image data for realizing such a display area and such a non-display area.

Scan drive is started at each start time of the first to third sub-frame periods. By the scan drive, in the first sub-frame period, transmittance data is given as red color data to the zero-th to fifth lines and the sixth and seventh lines. In the second sub-frame period, transmittance data is given as green color data to the zero-th to fifth lines, and shield data is given as green color data to the sixth and seventh lines. In the third sub-frame period, transmittance data is given as blue color data to the zero-th to fifth lines, and shield data is given as blue color data to the sixth and seventh lines.

Further, in each of the first to third sub-frame periods, a light emitting element of a corresponding color is turned on at a time later by the lighting drive adjusting time Td than the scan drive start time of corresponding color data, and the light emitting element is turned off after the light source lighting time Tb has been passed. Therefore, the light emitting element 72r (81r) having a red color is turned on at the start time of the second sub-frame period, and is turned off before the end time thereof. The light emitting element 72g (81g) of a green color is turned on at the start time of the third sub-frame period, and is turned off before the end time thereof. The light emitting element 72b (81b) having a blue color is turned on at the start time of the first sub-frame period of the next frame period, and is turned off before the end time thereof.

The light of a red color is transmitted through the zero-th to fifth lines to which transmittance data has been given as red color data, and is also transmitted through the sixth and seventh lines to which transmittance data has been given as red color data. However, the light of a green color and a blue color is shielded such that the transmittance amount becomes minimum in the sixth and seventh lines, and is transmitted at the maximum in the zero-th to seventh lines. As a result, in the sixth and seventh lines, because only the light of a red color is transmitted, an image corresponding to the red color data is displayed. On the other hand, in the zero-th to fifth lines, light of each color is transmitted for the same period, that is, by the same light amount. Accordingly, the zero-th to fifth lines become non-display areas for transmitting the background color at the maximum. In this way, a non-display area in the state of transmitting the background color at the maximum is formed at the upper part of the screen, and a display area in which the image of a red color is displayed is formed at the lower part of the screen.

5. Others

The present invention is not limited to the above embodiments, and can be implemented by various modifications within the range not deviating from the gist of the present invention. For example, in place of the CF-less liquid crystal panel 50, there may be employed other display devices capable of switching between transmittance display and shield display. As other display devices capable of switching between transmittance display and shield display, there are a display device utilizing the principle of electro-wetting, a display device utilizing an electrochromic compound, a display device utilizing an electronic migrating body, a display device utilizing a DMD (Digital Micromirror Device), and a display device utilizing a micro-shutter, for example. It should be noted that, in the other display devices, other than the CF-less liquid crystal panel 50, capable of switching between transmittance display and shield display, "shield display" includes the case of spreading light to only the light source side (the light guide plate side in the case of using the light guide plate).

In place of the PDLC panel 60, there may be employed other display devices capable of switching between transmittance display and spread display. As other display devices capable of switching between transmittance display and spread display, there are a display device utilizing the principle of electro-wetting, a display device utilizing an electrochromic compound, a display device utilizing an electronic migrating body, a display device utilizing a DMD, and a display device utilizing a micro-shutter, for example. It should be noted that, in the other display devices, other than the PDLC panel 60, capable of switching between transmittance display and spread display, "spread display" includes the case of spreading light to only the side to which light to be applied (including the background light) reaches. In place of the PDLC panel 60, there may be used a display device capable of switching between transmittance display and spread display of colored light (as described above, including the case of spreading light to only the side to which light to be applied (including the background light) reaches). In this case, the light source unit 100 is not necessary to be constituted to emit light of a plurality of colors, and may be constituted to emit light of a white color. In this case, light of a plurality of colors can be also applied to the CF-less liquid crystal panel 50 as the whole light irradiating unit 90.

In the first embodiment and the first modification thereof, it has been described that the timing assignment control unit 15 gives the front CF-less liquid crystal timing assignment signal CTa, the rear CF-less liquid crystal timing assignment signal CTb, the PDLC timing assignment signal PT, and the light source timing assignment signal LT, generated based on the drive timing control signal DT, to the front CF-less liquid crystal display element signal control unit 16a, the rear CF-less liquid crystal display element signal control unit 16b, the PDLC display element signal control unit 17, and the light source signal control unit 18, respectively. However, the present invention is not limited to this. The image control unit 14 may give a signal based on the drive timing control signal DT, to the front CF-less liquid crystal display element signal control unit 16a, the rear CF-less liquid crystal display element signal control unit 16b, the PDLC display element signal control unit 17, and the light source signal control unit 18, without providing the timing assignment control unit 15.

In the second and third embodiments and the modifications thereof, in order to improve utilization efficiency of the light source light of the first and second PDLC light source units 80a and 80b, there may be employed a mechanism for spreading the light source light (such as a box having each panel arranged on the front surface and the rear surface, and having the display item 110 arranged in the inside).

In the first and third embodiments, although it has been described that the area active drive is performed by using the light guide plate which is formed into blocks, the present invention is not limited to this. A normal light guide plate which is not formed into blocks as shown in FIG. 4 may be used. In this case, in order to allow the background to be more clearly transmitted at the time of setting the part not performing image display to the transmittance state at the front surface side, it is desirable to use a light guide plate with small front emission light source light and in high transmission factor. Further, in order to allow the background to be more clearly transmitted at the time of setting the part not performing image display to the transmittance state at the rear surface side, it is desirable to use a light guide plate with small rear emission light source light and in high transmission factor.

In the third embodiment, the first modification thereof, and the second modification thereof, the first PDLC light source unit 80a may be arranged to irradiate the rear surface of the PDLC panel 60, the front surface thereof, and the rear surface thereof. In the third embodiment and each modification thereof, the light source light may be applied to both main surfaces of the PDLC panel 60, by using the first and second PDLC light source units 80a and 80b, in a similar manner to that according to the second modification of the second embodiment. Thus, luminance of the display image can be improved.

In each of the above embodiments and the modifications thereof, in the case of not performing the emission of the light source light from the light source unit 100 in accordance with the scan directions of the CF-less liquid crystal panel 50 and the PDLC panel 60, the light source lighting time and the like of the light emitting element of each color may be controlled, in correspondence to the period in which color data necessary for displaying the image of a desired color is to be given to the display area of the CF-less liquid crystal panel 50. Accordingly, a display area in which the image of a desired color having suppressed the occurrence of color unevenness is displayed can be set at a desired position of the CF-less liquid crystal panel 50.

DESCRIPTION OF REFERENCE CHARACTERS

1: IMAGE DISPLAY DEVICE
10: SIGNAL PROCESSING CIRCUIT (SIGNAL PROCESSING UNIT)
11: SIGNAL SEPARATION CONTROL UNIT
12: FS PROCESSING UNIT
13: MEMORY
14: IMAGE CONTROL UNIT
15: TIMING ASSIGNMENT CONTROL UNIT
16a,16a: FRONT CF-LESS LIQUID CRYSTAL DISPLAY ELEMENT SIGNAL CONTROL UNIT, REAR CF-LESS LIQUID CRYSTAL DISPLAY ELEMENT SIGNAL CONTROL UNIT (FIRST DISPLAY CONTROL UNIT)
17: PDLC DISPLAY ELEMENT SIGNAL CONTROL UNIT (SECOND DISPLAY CONTROL UNIT)
18: LIGHT SOURCE SIGNAL CONTROL UNIT (LIGHT SOURCE CONTROL UNIT)
20a,20b: FRONT CF-LESS LIQUID CRYSTAL DISPLAY ELEMENT DRIVE CIRCUIT, REAR CF-LESS LIQUID CRYSTAL DISPLAY ELEMENT DRIVE CIRCUIT (FIRST DISPLAY DRIVE UNIT)
30: PDLC DISPLAY ELEMENT DRIVE CIRCUIT (SECOND DISPLAY DRIVE UNIT)
40: LIGHT SOURCE DRIVE CIRCUIT (LIGHT SOURCE DRIVE UNIT)
50a,50b: FRONT CF-LESS LIQUID CRYSTAL PANEL, REAR CF-LESS LIQUID CRYSTAL PANEL (FIRST DISPLAY PANEL)
51: CF-LESS LIQUID CRYSTAL DISPLAY ELEMENT (FIRST DISPLAY ELEMENT)
60: PDLC PANEL (SECOND DISPLAY PANEL)
61: PDLC DISPLAY ELEMENT (SECOND DISPLAY ELEMENT)
70: BACKLIGHT UNIT
71: LIGHT-GUIDE PLATE LIGHT SOURCE UNIT
72,81: LIGHT SOURCE
72r,72g,72b: LIGHT EMITTING ELEMENTS HAVING RED COLOR, GREEN COLOR, AND BLUE COLOR
73a, 73b: FIRST AND SECOND LIGHT GUIDE PLATES
81r,81g,81b: LIGHT EMITTING ELEMENTS HAVING RED COLOR, GREEN COLOR, AND BLUE COLOR
90: LIGHT IRRADIATING UNIT
100: LIGHT SOURCE UNIT
IN: INPUT SIGNAL
ID: IMAGE DATA
FID: FIELD SEQUENTIAL IMAGE DATA
Da: DISPLAY-IMAGE POSITION ASSIGNING DATA
Dal: DISPLAY START LINE ASSIGNMENT DATA
Dn: NON-DISPLAY START LINE ASSIGNMENT DATA
Din: RESPONSE TIME DATA
CDa,CDb: FRONT CF-LESS LIQUID CRYSTAL DATA, REAR CF-LESS LIQUID CRYSTAL DATA (FIRST DISPLAY DATA)
PD: PDLC DATA (SECOND DISPLAY DATA)
LD: LIGHT SOURCE DATA
DT: DRIVE TIMING CONTROL SIGNAL

The invention claimed is:

1. An image display device that separates one frame period of a given input signal into a plurality of sub-frame periods, and displays an image corresponding to any of a plurality of colors in each sub-frame period, the image display device comprising:
   two first display panels each comprising a plurality of first display elements arranged in a matrix shape; and
   a light irradiating unit that applies light of the plurality of colors to the two first display panels, wherein the light irradiating unit comprises:
   a light source unit; and
   a second display panel capable of switching between a spreading state of spreading incident light and a transmittance state of allowing incident light to be transmitted,
   the second display panel becomes in the spreading state at a time when the image is to be displayed, to spread light emitted by the light source unit, and
   the two first display panels are arranged at both main surface sides of the second display panel, respectively, and display the image by controlling a transmission factor of light spread by the second display panel.

2. The image display device according to claim 1, wherein the light irradiating unit further comprises a first light guide plate to guide incident light, and
   the light source unit comprises a light-guide plate light source unit comprising light emitting elements including the plurality of colors, and configured to apply light to the first light guide plate.

3. The image display device according to claim 2, wherein from a side of one of the two first display panels, the first light guide plate, the second display panel, and the other of the two first display panels are sequentially arranged.

4. The image display device according to claim 2, wherein the light irradiating unit further comprises a second light guide plate to guide incident light,
   the light-guide plate light source unit is configured to apply light to the first light guide plate and the second light guide plate, and
   from a side of one of the two first display panels, the first light guide plate, the second display panel, the second light guide plate, and the other of the two first display panels are sequentially arranged.

5. The image display device according to claim 2, wherein
the first light guide plate is formed into a plurality of blocks, and
the light-guide plate light source unit is configured to apply light to each block.

6. The image display device according to claim 1, wherein the light source unit comprises a first second-display panel light source unit comprising light emitting elements including the plurality of colors, to apply light to the second display panel.

7. The image display device according to claim 6, wherein
the first second-display panel light source unit is configured to apply light to one main surface of the second display panel.

8. The image display device according to claim 7, wherein
the light source unit comprises a second second-display panel light source unit comprising light emitting elements including the plurality of colors, to apply light to the second display panel, and
the first second-display panel light source unit and the second second-display panel light source unit are configured to apply light to both main surfaces of the second display panel, respectively.

9. The image display device according to claim 6, wherein the first second-display panel light source unit has directivity at a level at which light is applicable to a part of the second display panel.

10. The image display device according to claim 1, wherein
the second display panel comprises a plurality of second display elements each capable of switching between the spreading state and the transmittance state.

11. The image display device according to claim 10, wherein
each of the second display elements corresponds to any of the plurality of first display elements, and is configured to switch to a spreading state synchronously with a corresponding first display element, at a time when the image is to be displayed.

12. The image display device according to claim 1, further comprising:
a first display drive unit to drive the two first display panels;
a second display drive unit to drive the second display panel;
a light source drive unit to drive the light source unit; and
a signal processing unit to control the first display drive unit, the second display drive unit, and the light source drive unit, respectively, based on the input signal.

13. The image display device according to claim 12, wherein
the signal processing unit comprises:
a field sequential processing unit to generate, based on the input signal, field sequential image data for displaying an image in each sub-frame period;
an image control unit to generate first display data for controlling the first display drive unit, second display data for controlling the second display drive unit, and light source data for controlling the light source drive unit, based on display-image position assigning data for assigning a display position of an image to be displayed and the field sequential image data, each of which is obtained based on the input signal;
a first display control unit to control the first display drive unit based on the first display data;
a second display control unit to control the second display drive unit based on the second display data; and
a light source control unit to control the light source drive unit based on the light source data.

14. The image display device according to claim 13, wherein
the input signal comprises the display-image position assigning data and image data indicating an image to be displayed, and
the signal processing unit further comprises a signal separation control unit to separate the input signal into the display-image position assigning data and the image data, and to give the display-image position assigning data and the image data to the image control unit and the field sequential processing unit, respectively.

15. The image display device according to claim 13, wherein
the field sequential processing unit is further configured to generate the display-image position assigning data based on the input signal.

16. The image display device according to claim 12, wherein
the signal processing unit is configured to interpolate, in the sub-frame period, images to be displayed in each of continuous frame periods.

17. The image display device according to claim 12, wherein
each of the first display panels comprises a display area in which the image of a desired color is displayable by being provided with any color data out of the plurality of colors in each sub-frame period, and
the signal processing unit is configured to generate the color data based on the input signal, obtain light source lighting time for assigning lighting time of a light emitting element having a color indicated by the color data, and a light-source drive timing control signal for controlling at least any of a lighting start time of a light emitting element of the color and a scan start time for giving the color data to the display area, and control the light source lighting time and the light-source drive timing control signal, in accordance with a period in which color data necessary for displaying an image of the desired color is to be given to the display area, in each sub-frame period.

18. The image display device according to claim 17, wherein
each of the first display panels comprises a non-display area to which any color data out of the plurality of colors is given in each sub-frame period and in which the image is not displayed, and
color data given to the non-display area is the same data for each color and in each pixel of the non-display area.

19. The image display device according to claim 18, wherein
the signal processing unit further comprises:
a field sequential processing unit to generate, based on the input signal, field sequential image data for displaying an image in each sub-frame period;
an image control unit to generate first display data for controlling the first display drive unit, second display data for controlling the second display drive unit, and light source data for controlling the light source drive unit including the light source lighting time, based on display-image position assigning data for assigning a display position of an image to be displayed and the field sequential image data, each of which is obtained based on the input signal;

a first display control unit to control the first display drive unit, based on the first display data;

a second display control unit to control the second display drive unit, based on the second display data; and a light source control unit to control the light source drive unit, based on the light-source drive timing control signal and the light source data.

20. A drive method for an image display device including two first display panels each including a plurality of first display elements arranged in a matrix shape, and a light irradiating unit to apply light of a plurality of colors to the two first display panels and including a second display panel, separating one frame period of a given input signal into a plurality of sub-frame periods to display an image corresponding to any of the plurality of colors in each sub-frame period, the drive method comprising:

switching a state of the second display panel between a spreading state of spreading incident light and a transmittance state of allowing incident light to be transmitted; and making the image displayed in the two first display panels by controlling a transmission factor of light spread by the second display panel, wherein the light irradiating unit further includes a light source unit, wherein the two first display panels are arranged at both main surface sides of the second display panel, respectively, and wherein switching of the state of the second display panel includes switching the state of the second display panel to the spreading state at a time when the image is to be displayed, and spreading light emitted by the light source unit.

* * * * *